(12) United States Patent
Novin

(10) Patent No.: US 8,549,710 B2
(45) Date of Patent: Oct. 8, 2013

(54) HINGE ASSEMBLY WITH A MULTI-LAYER TORSION BAR SPRING

(75) Inventor: Eugene Novin, Blue Bell, PA (US)

(73) Assignee: Southco, Inc., Concordville, PA (US)

( * ) Notice: Subject to any disclaimer, the term of this patent is extended or adjusted under 35 U.S.C. 154(b) by 469 days.

(21) Appl. No.: 12/870,828

(22) Filed: Aug. 29, 2010

(65) Prior Publication Data
US 2011/0047750 A1 Mar. 3, 2011

Related U.S. Application Data

(60) Provisional application No. 61/238,206, filed on Aug. 30, 2009.

(51) Int. Cl.
*E05F 1/08* (2006.01)
(52) U.S. Cl.
USPC ............................................. 16/308
(58) Field of Classification Search
USPC .................. 16/308, 298, 299, 75, DIG. 36
See application file for complete search history.

(56) References Cited

U.S. PATENT DOCUMENTS

| | | | | |
|---|---|---|---|---|
| 2,395,456 A | * | 2/1946 | Bunker | 16/308 |
| 3,098,645 A | | 7/1963 | Owens | |
| 3,238,900 A | | 3/1966 | Janus | |
| 3,592,433 A | | 7/1971 | Fuhrman | |
| 4,082,306 A | | 4/1978 | Sheldon | |
| 4,348,786 A | * | 9/1982 | Hirose | 16/75 |
| RE32,878 E | * | 2/1989 | Leonard | 16/298 |
| 4,941,853 A | | 7/1990 | Harwath | |
| 5,771,540 A | * | 6/1998 | Carpenter et al. | 16/308 |
| 5,787,549 A | | 8/1998 | Soderlund | |
| 6,388,872 B1 | | 5/2002 | Liao et al. | |
| 6,530,784 B1 | | 3/2003 | Yim et al. | |
| 7,055,215 B1 | | 6/2006 | Ligtenberg et al. | |
| 2005/0250355 A1 | | 11/2005 | Lin | |
| 2008/0076270 A1 | | 3/2008 | Jao et al. | |

FOREIGN PATENT DOCUMENTS

| | | |
|---|---|---|
| GB | 826753 | 1/1950 |
| GB | 660443 | 11/1951 |
| GB | 673013 | 5/1952 |
| GB | 775249 | 5/1957 |
| GB | 972573 | 10/1964 |

OTHER PUBLICATIONS

R.G.S. ATALANTA—A "Kit of Parts" Design, The AUTOCAR, May 30, 1952, pp. 665-667.
Drawings of a laptop hinge sold in the United States prior to Aug. 30, 2009.
Technical Details, Aerokopter 1-3 Sanka Helicopter, http://www.aerokopter.co.za/Technical%20Details%20-%20web.htm, Jan. 25, 2008.
Design of Laminated Torsion Bar Springs, Defense Technical Information Center, Joseph A. Gentiluomo, Abstract, Feb. 1980.
Porsche Catalog (on line), Select Model, 356 Pre-A/A (1950-1959), Front Axle.

\* cited by examiner

Primary Examiner — Jeffrey O Brien
(74) Attorney, Agent, or Firm — Paul & Paul

(57) ABSTRACT

A friction hinge assembly includes a spring that assists the opening of a first member relative to a second member by storing energy in the spring during the closing operation. The spring is of a unique multilayered torsion bar design.

3 Claims, 79 Drawing Sheets

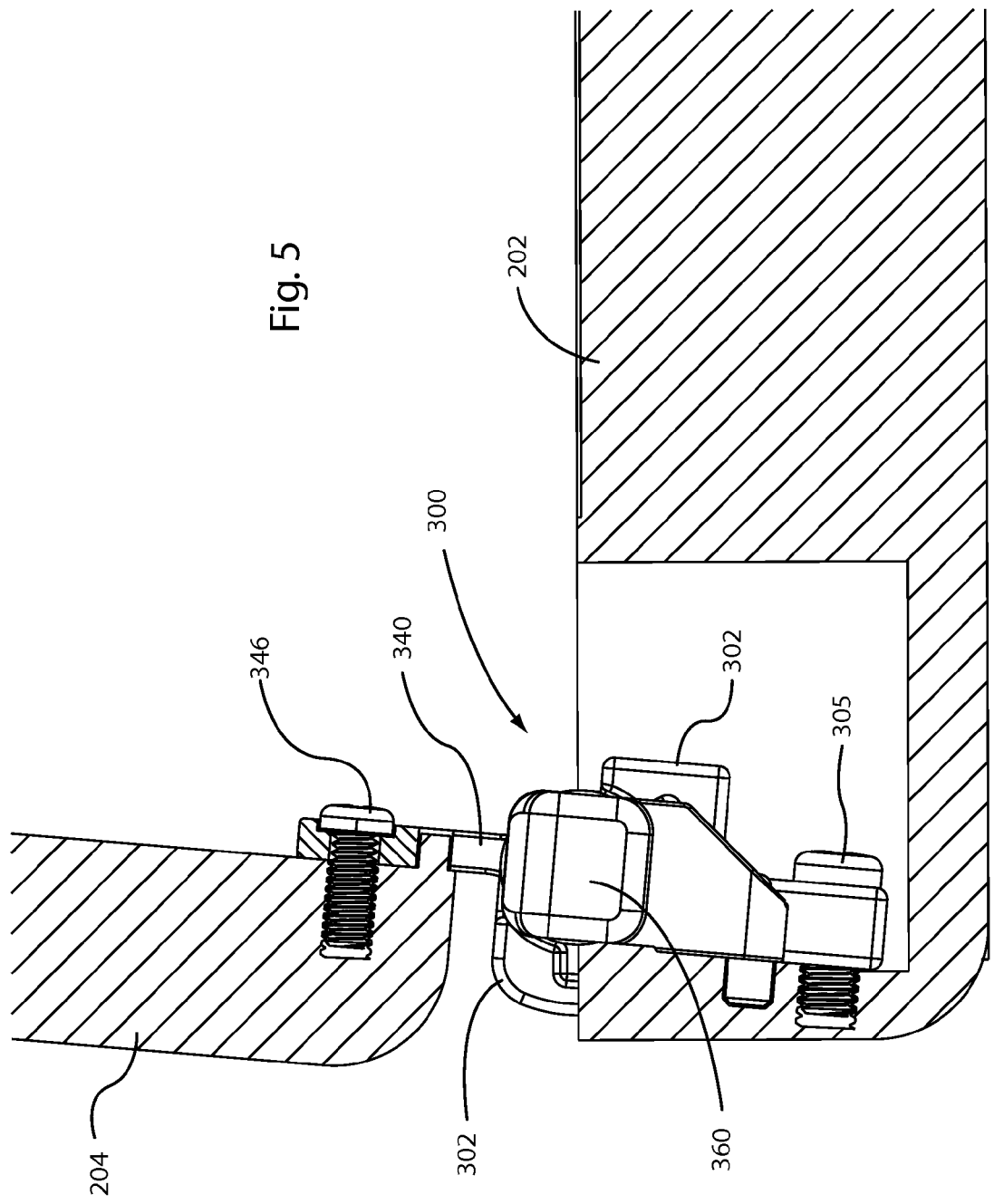

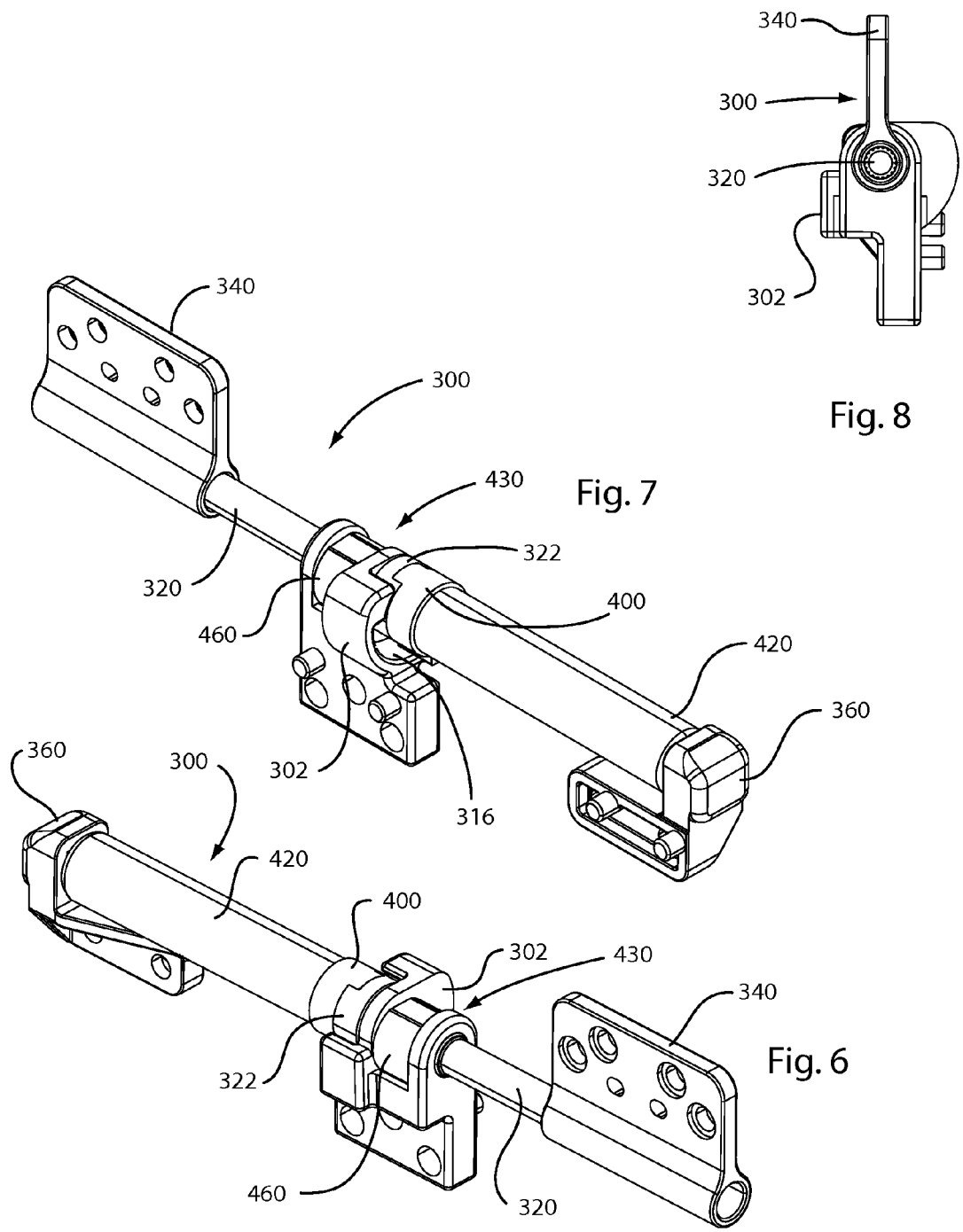

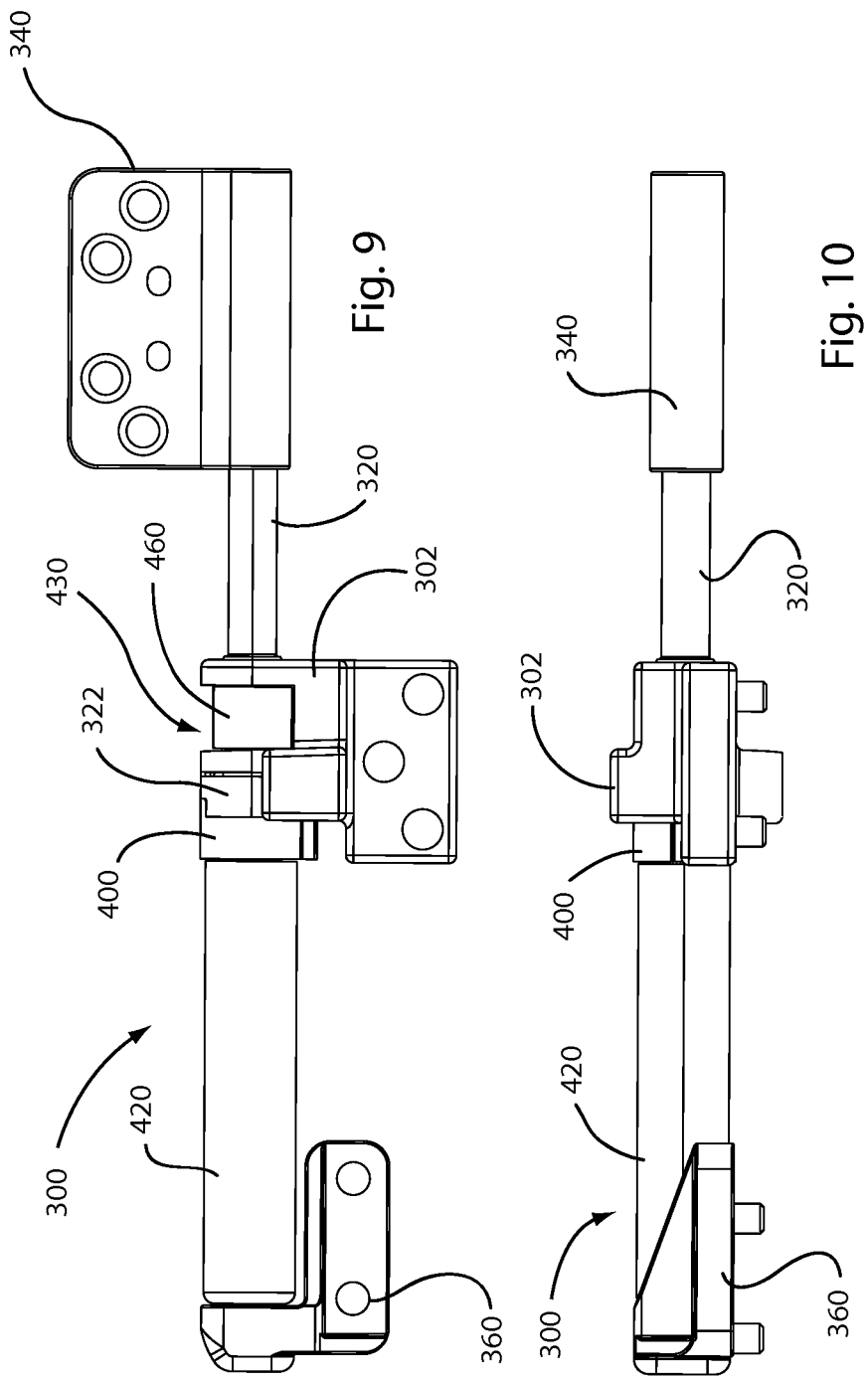

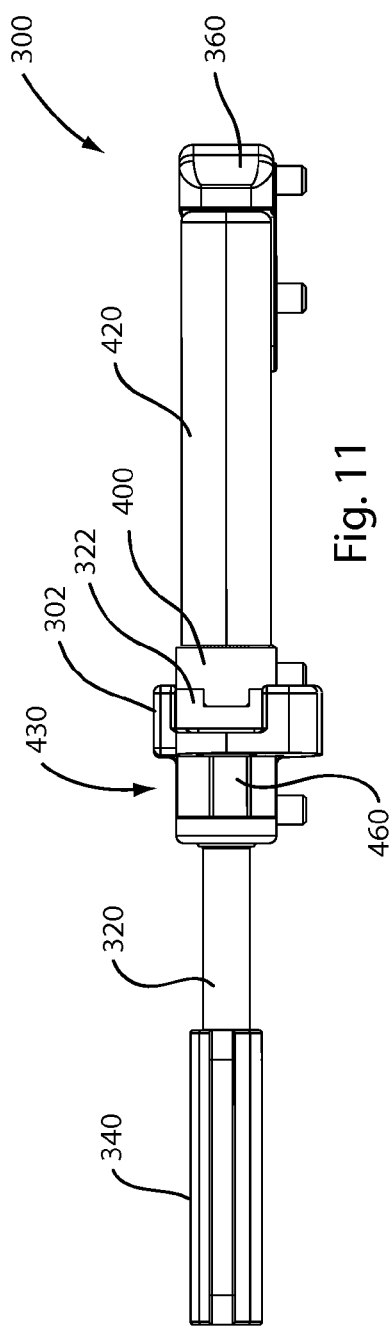
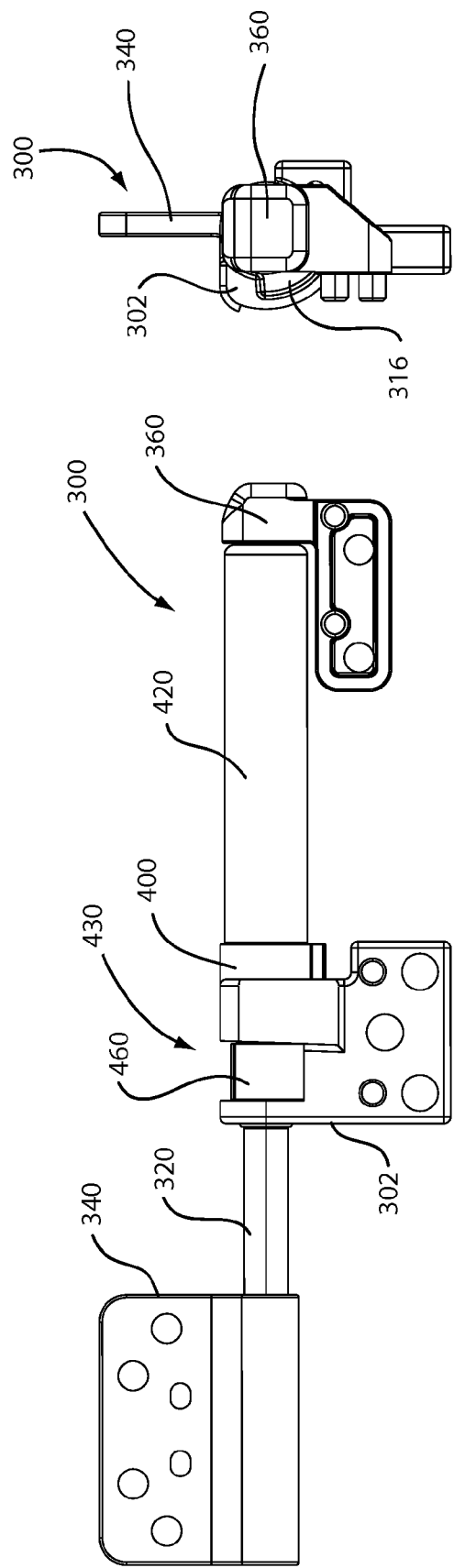
Fig. 11
Fig. 12
Fig. 13

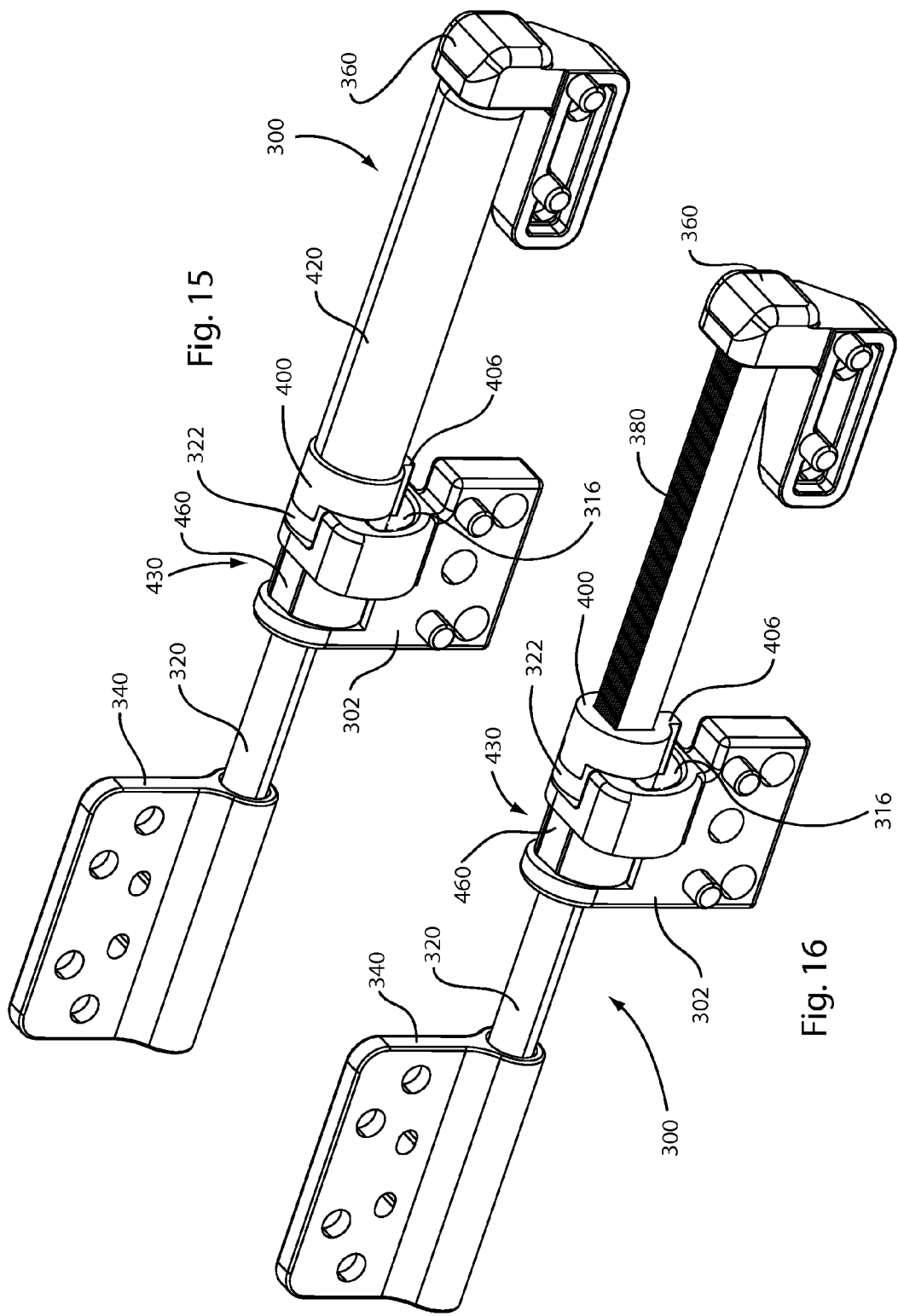

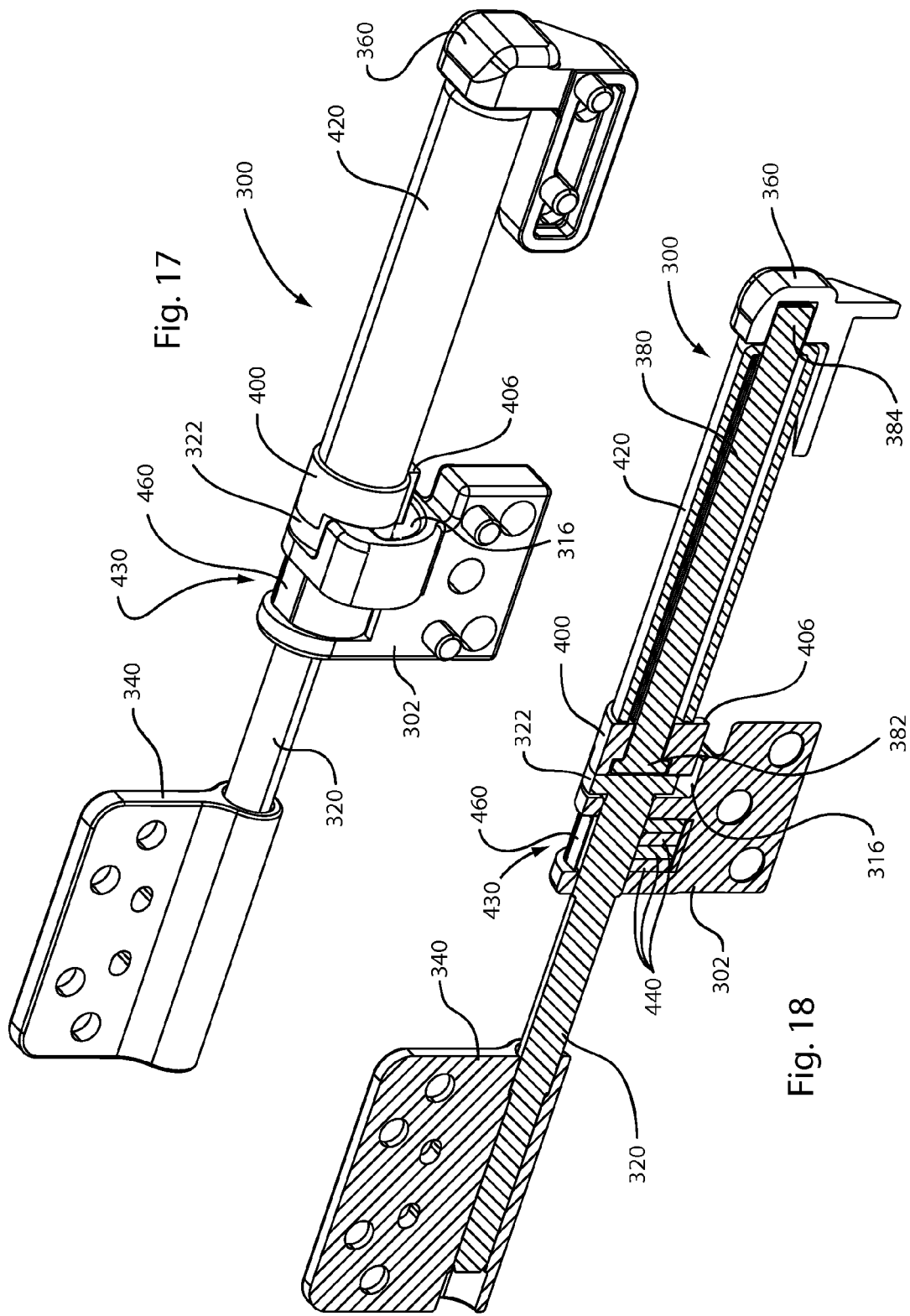

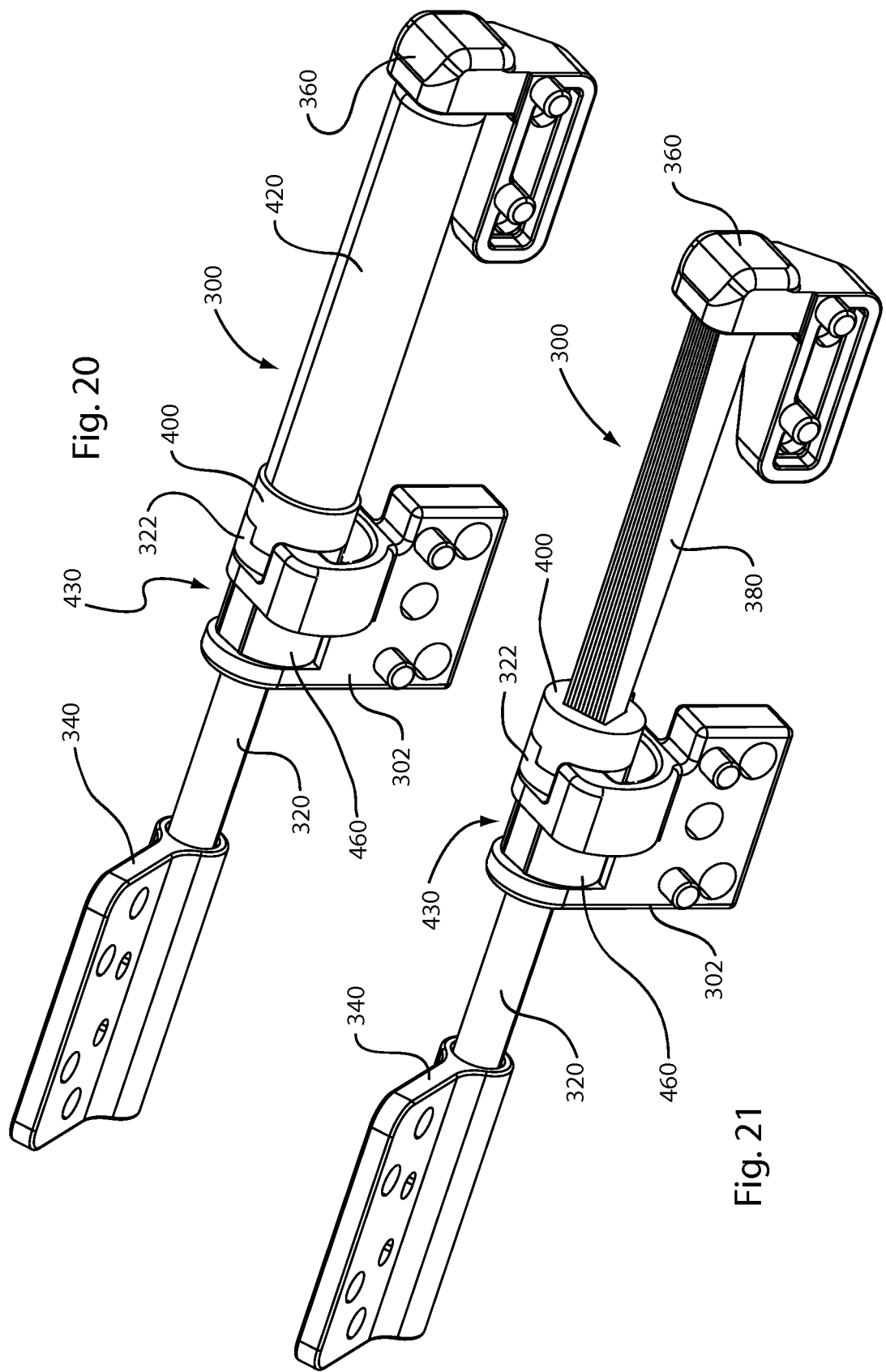

SECTION A-A

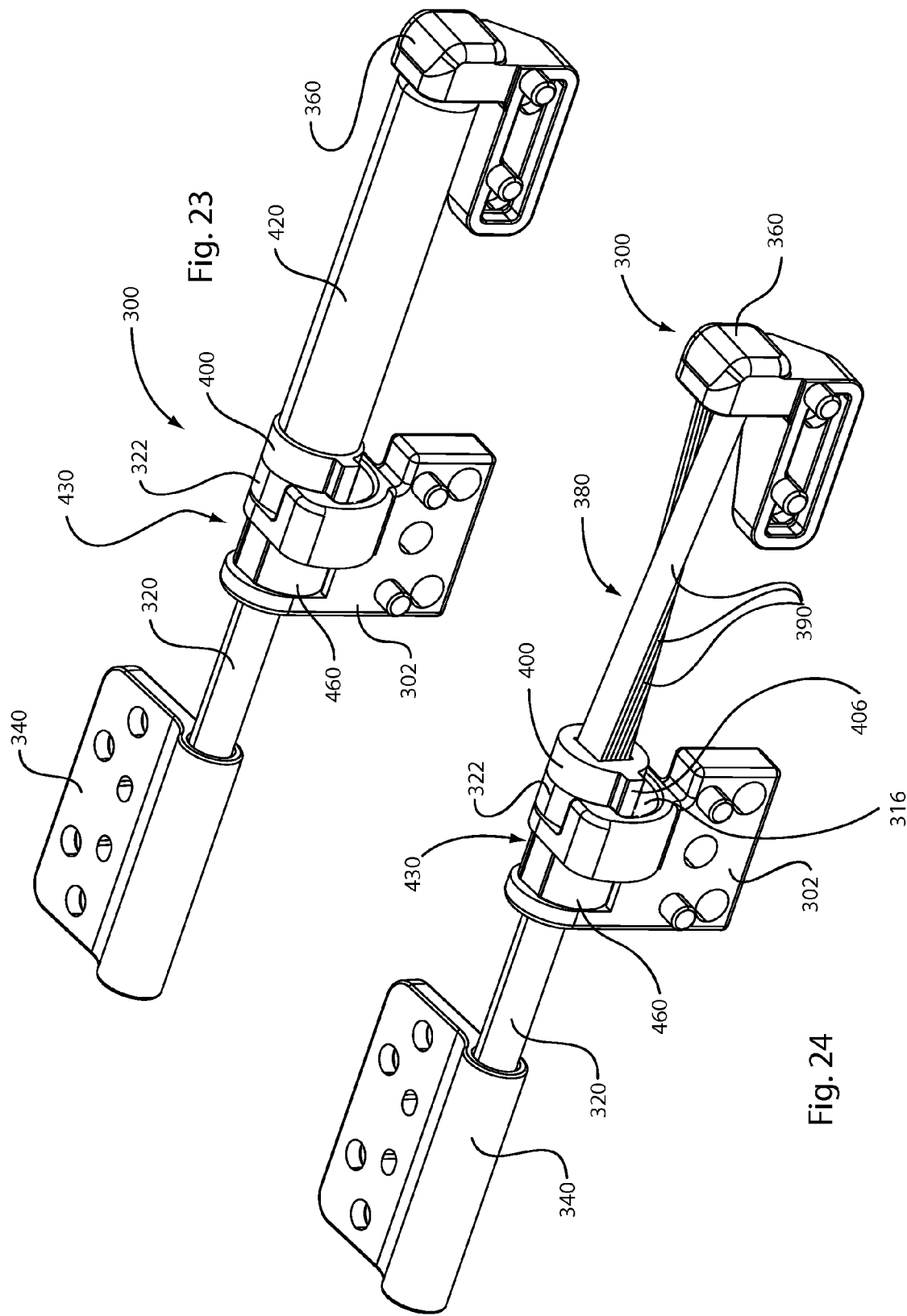

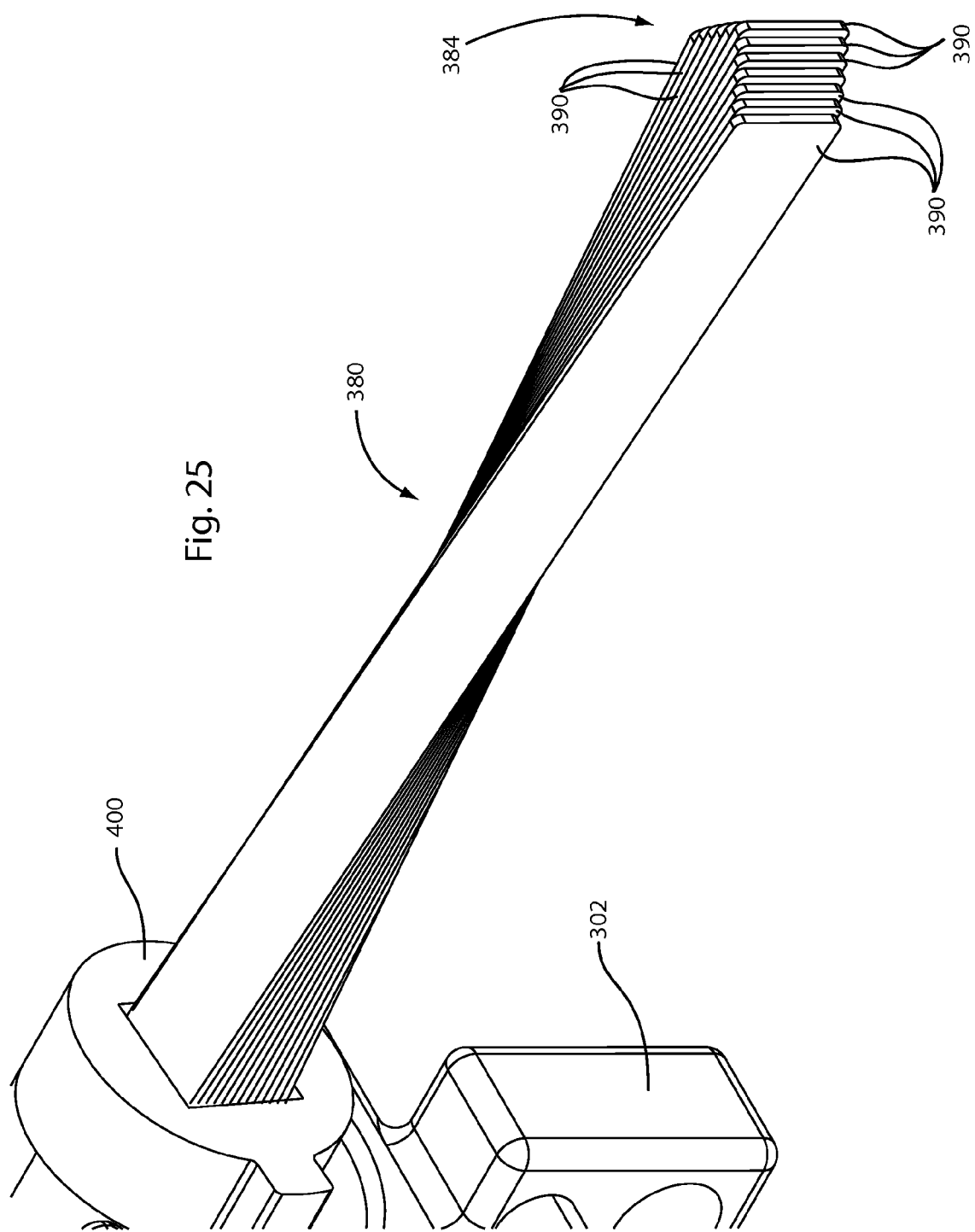

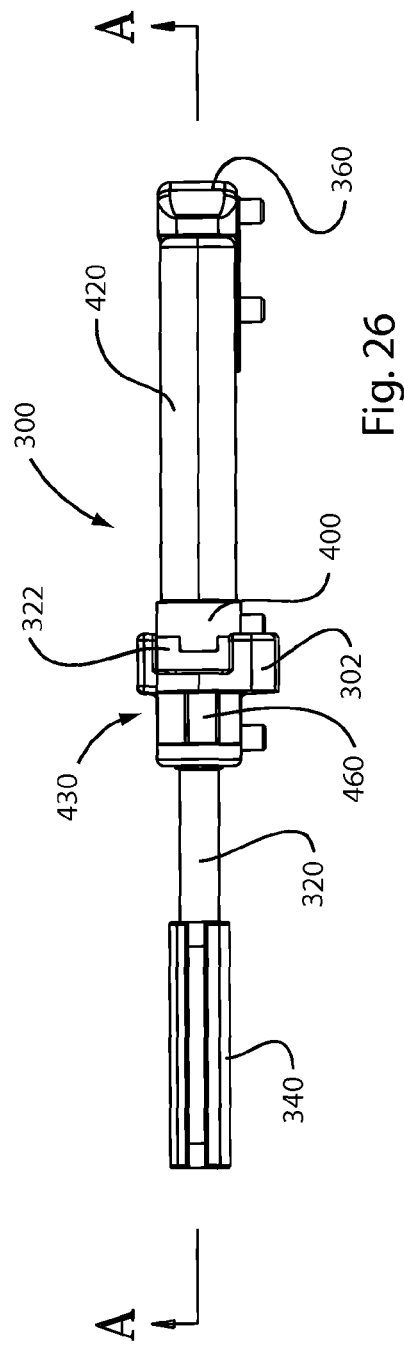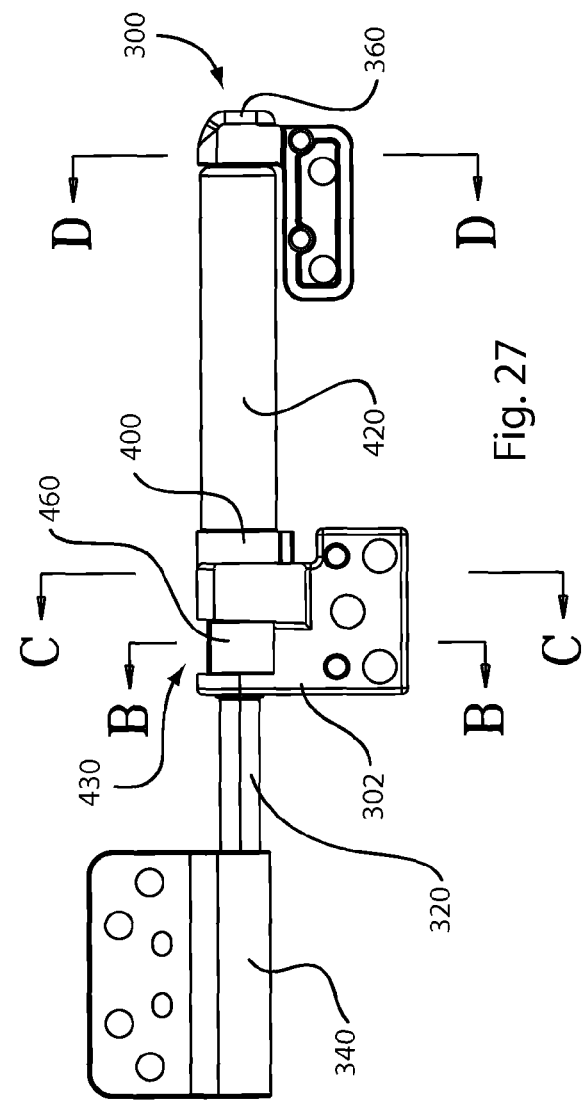
Fig. 26
Fig. 27

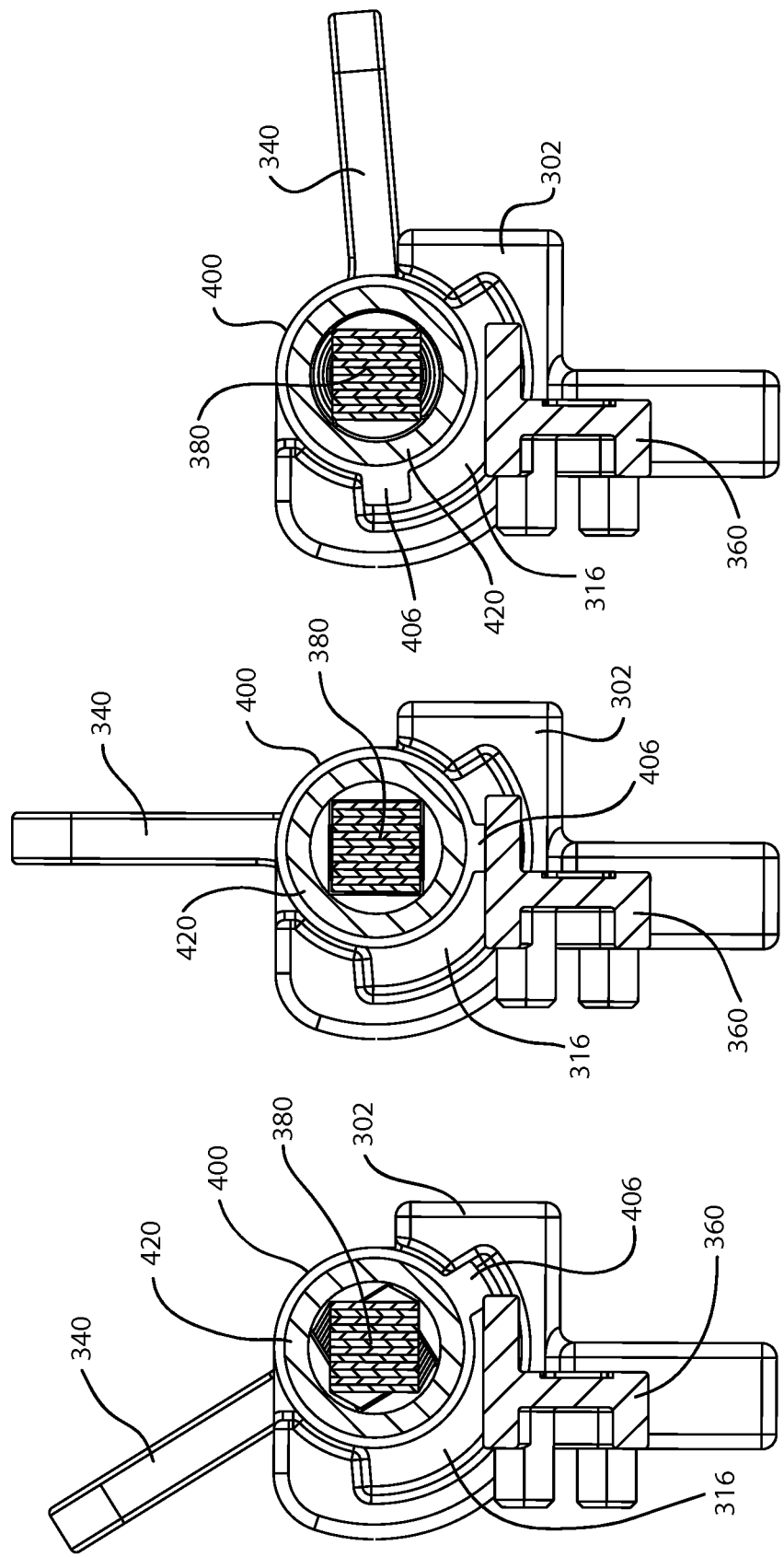

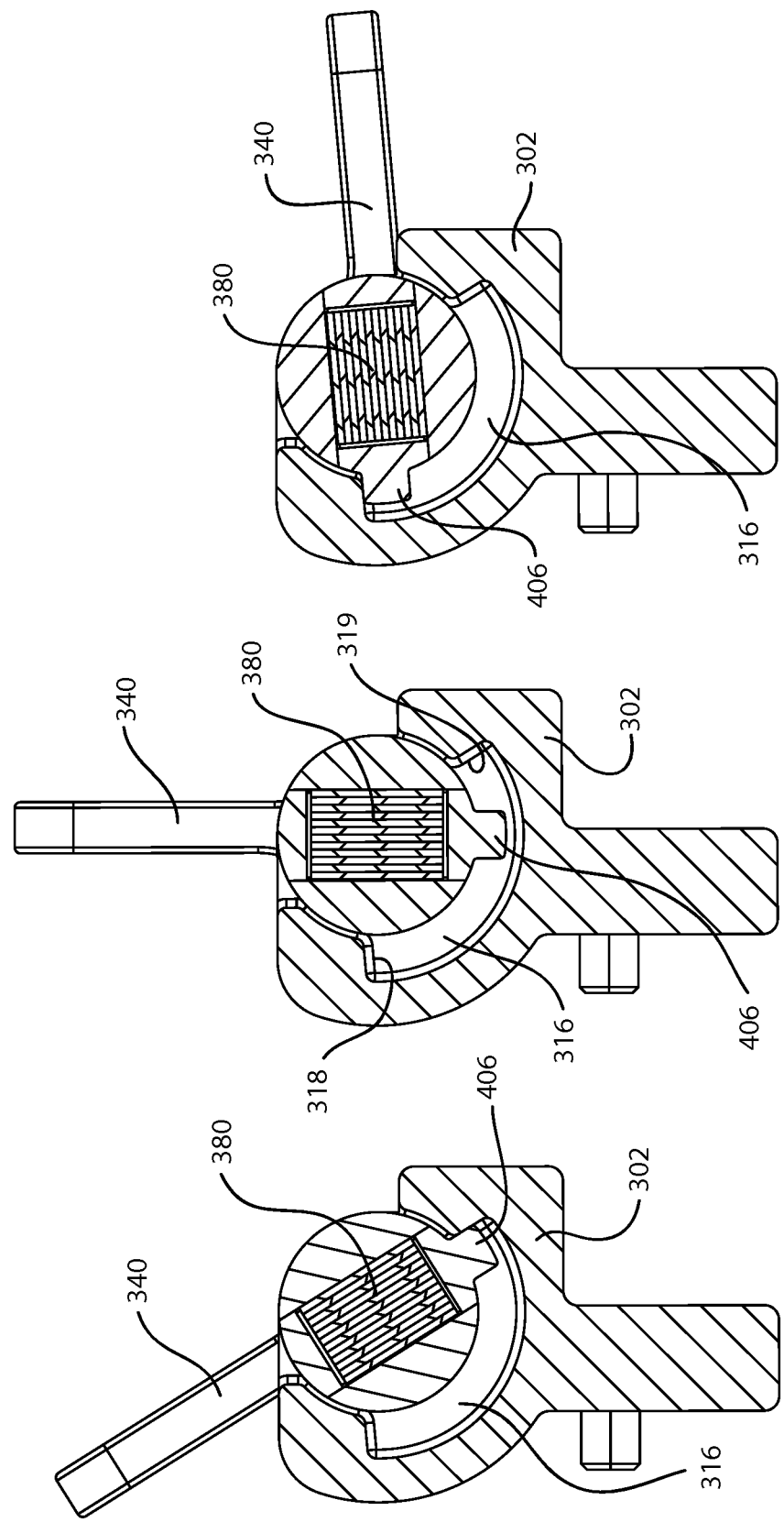

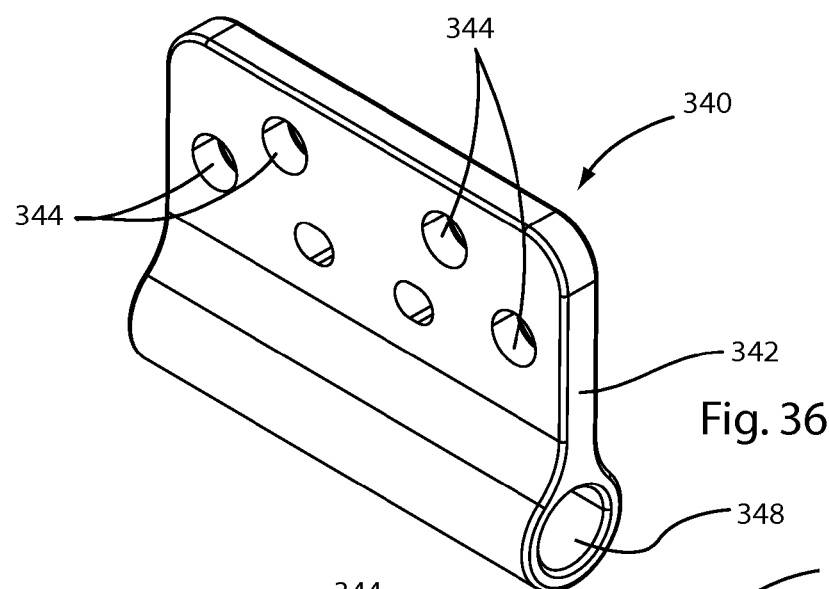
Fig. 36
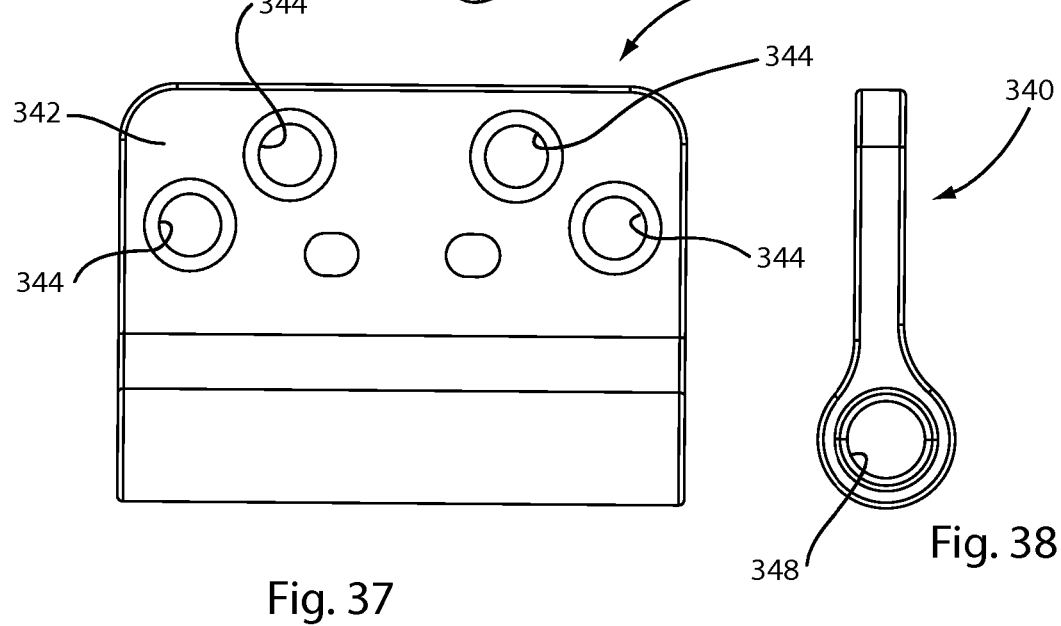
Fig. 37
Fig. 38

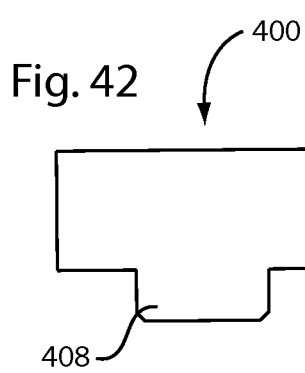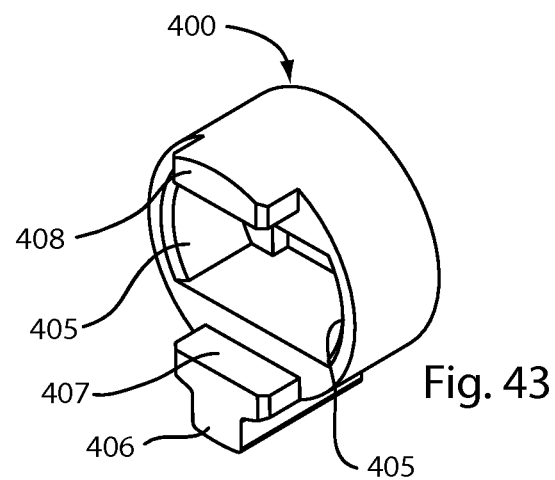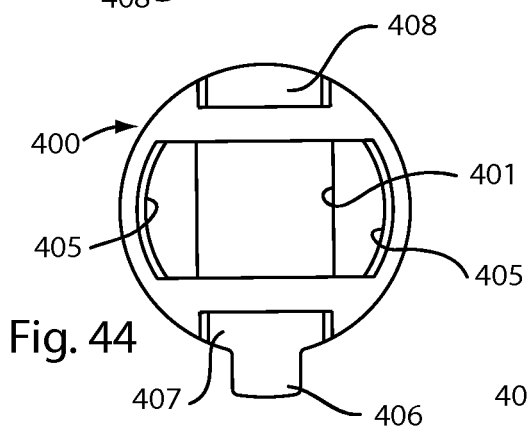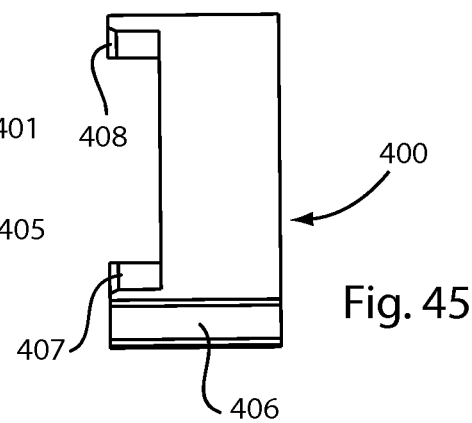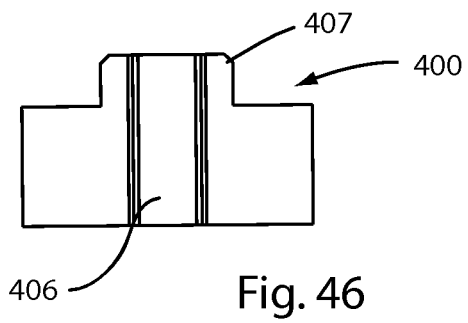

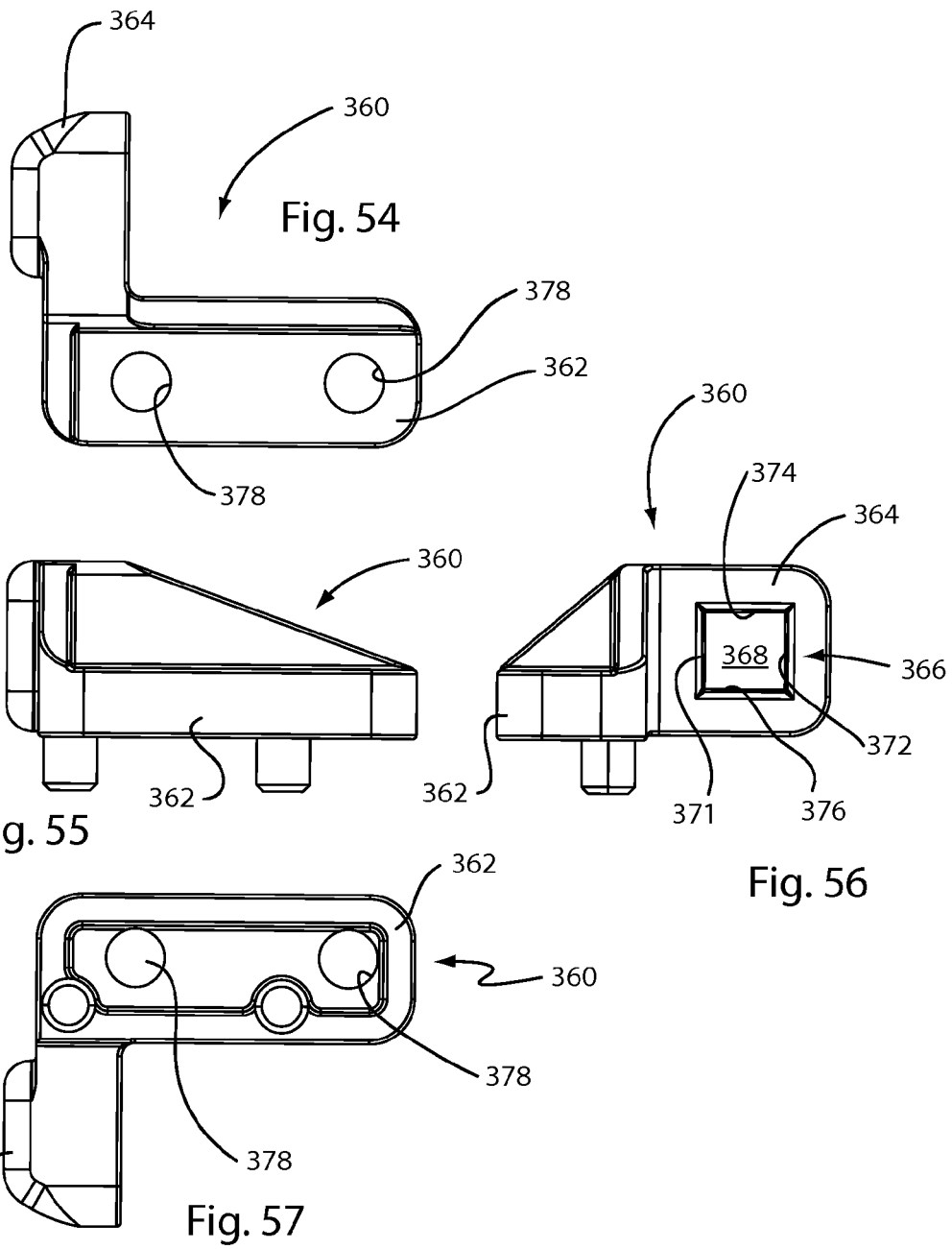

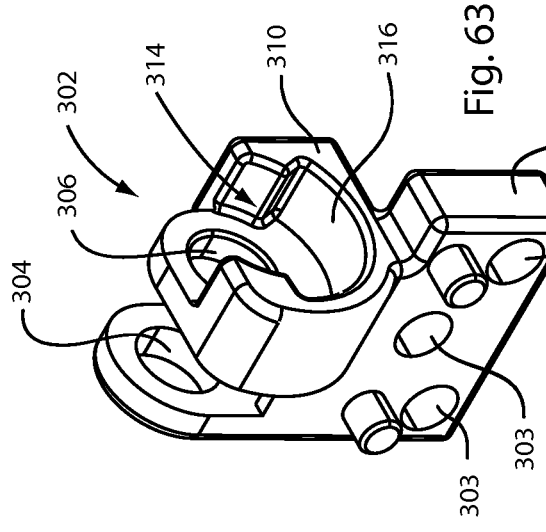
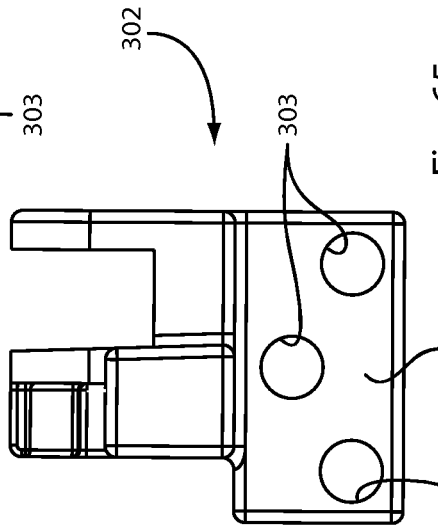
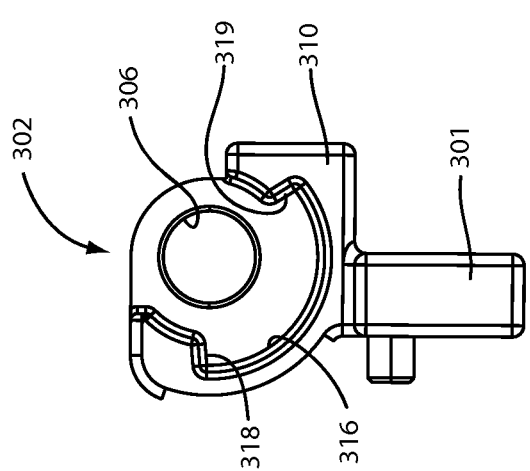

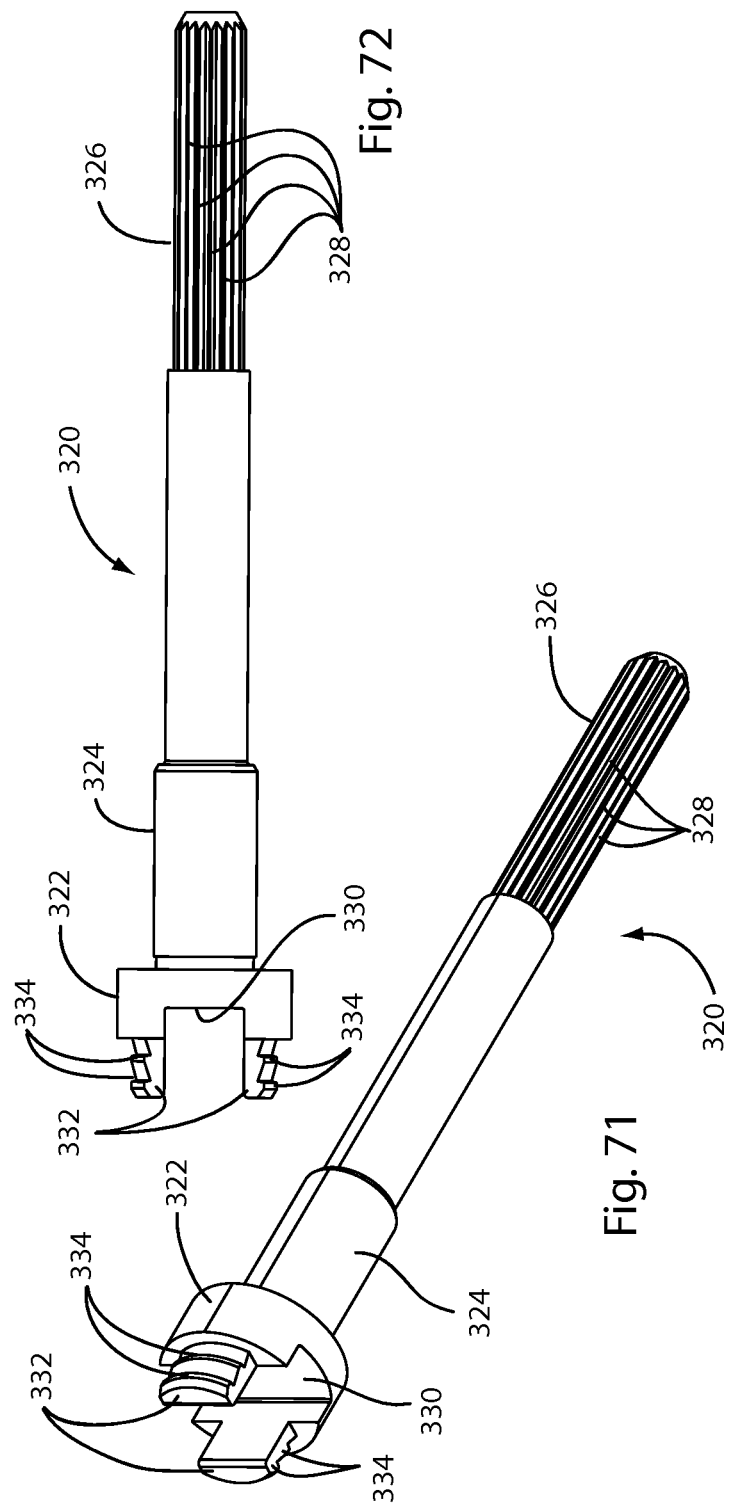

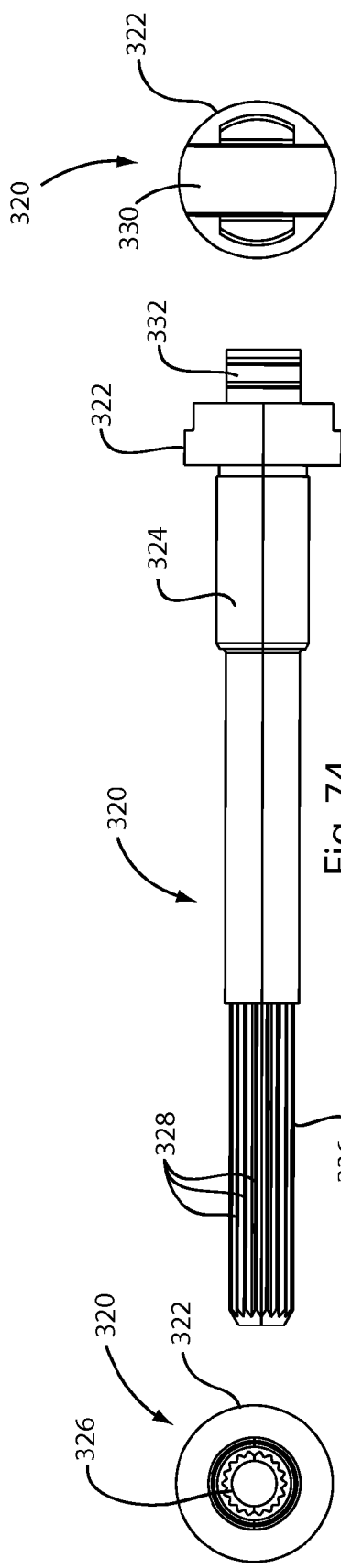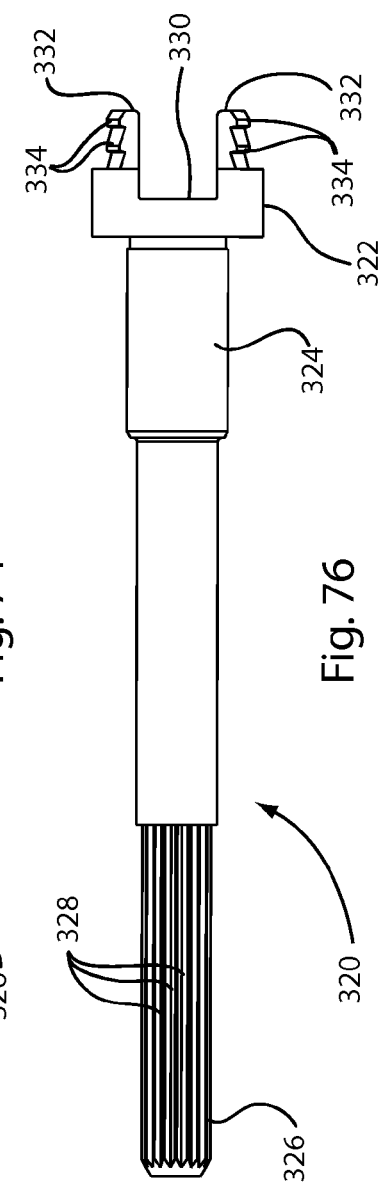

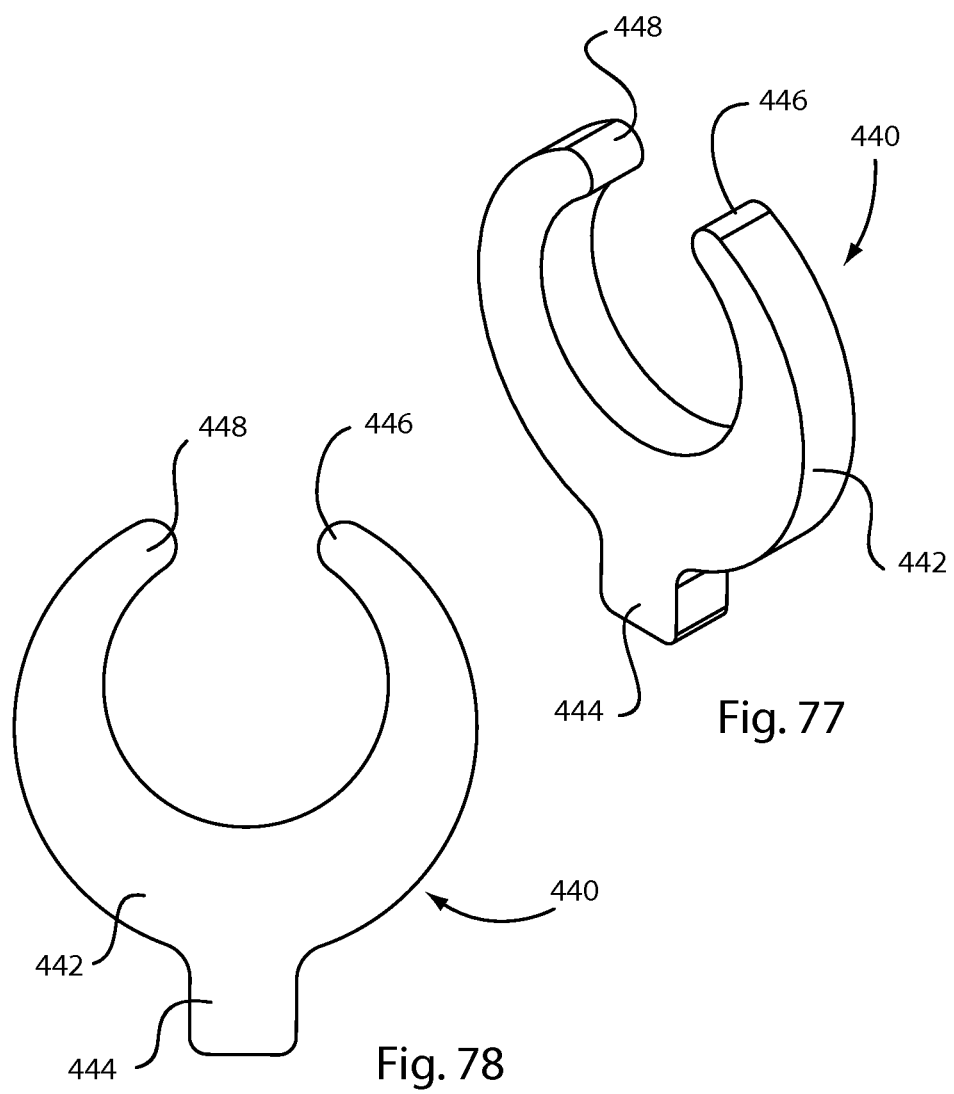

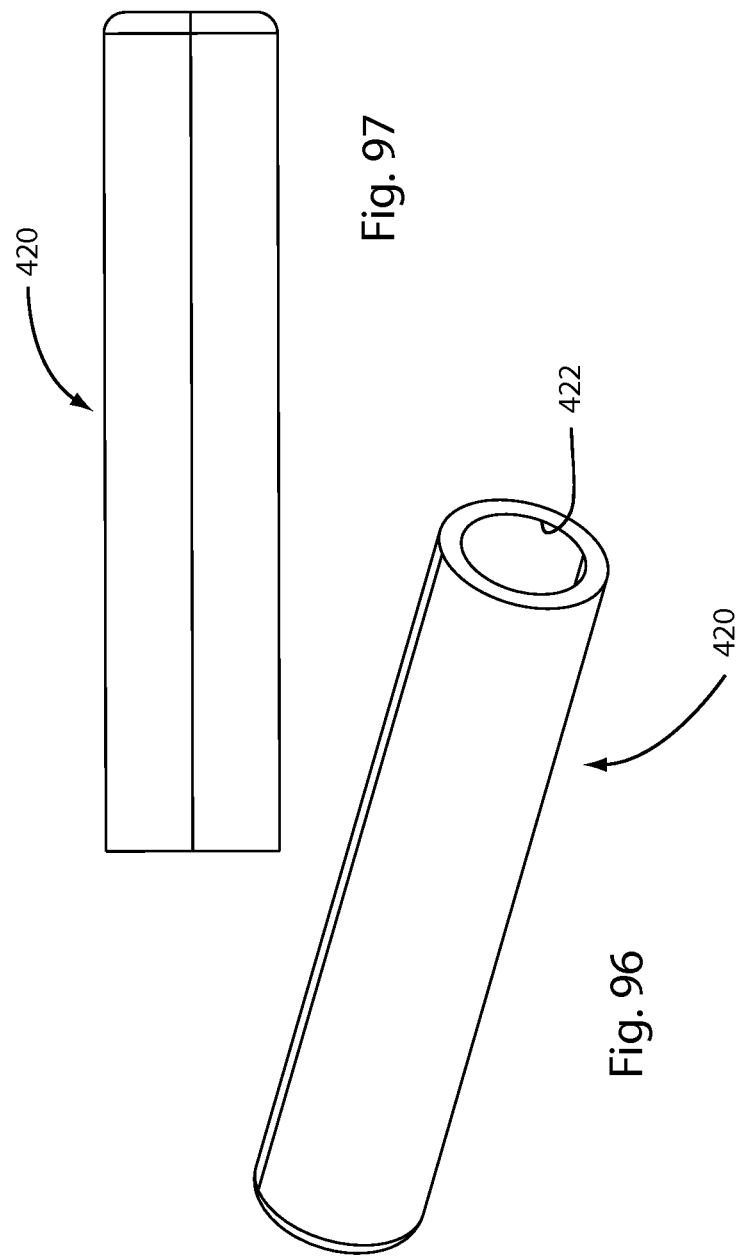

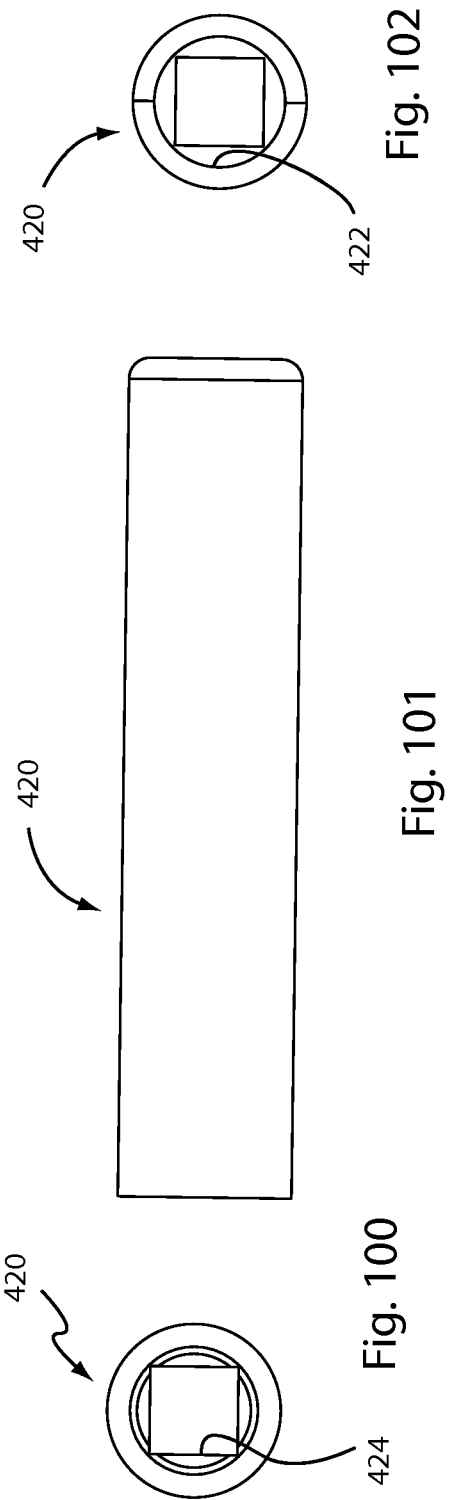

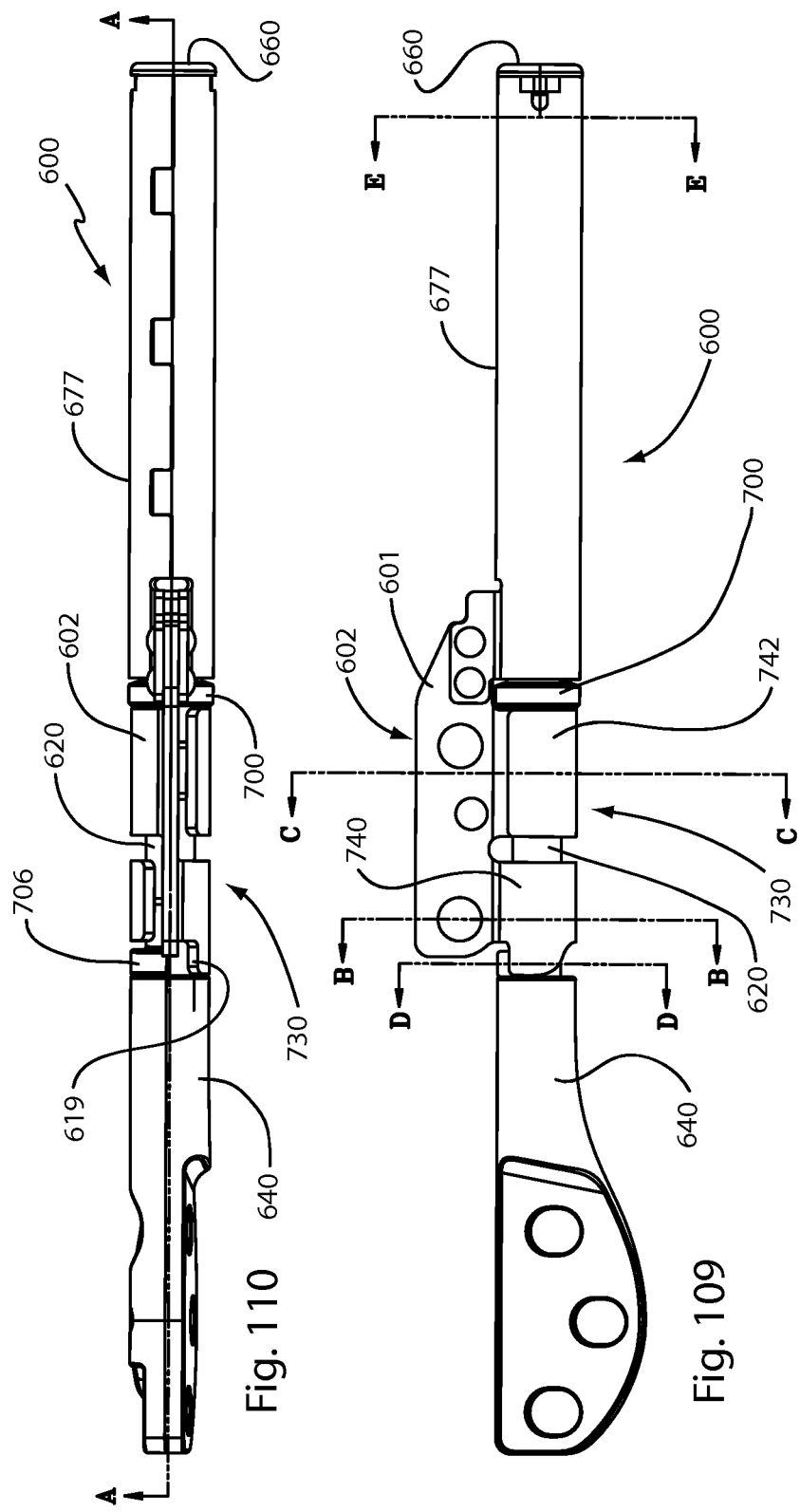

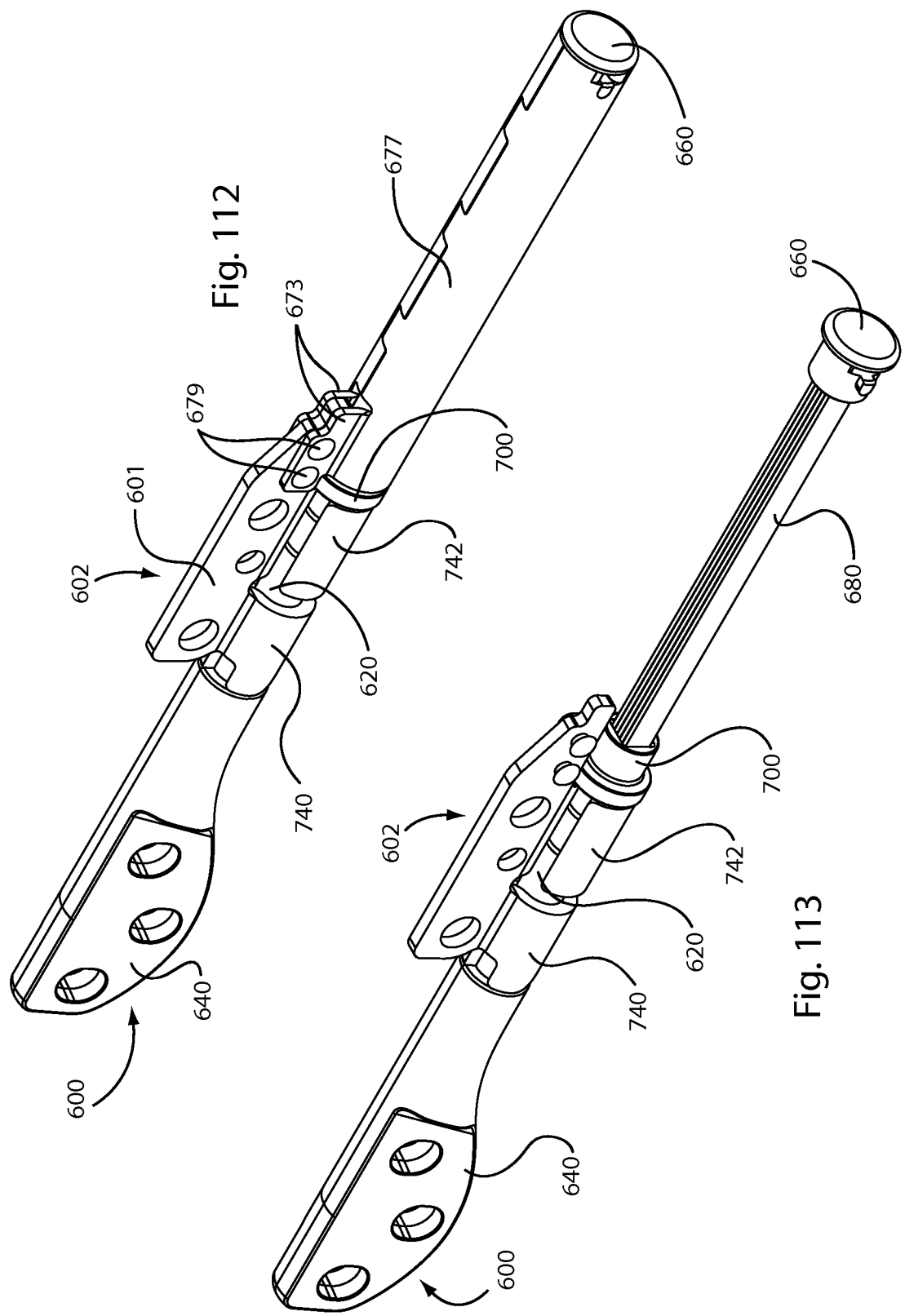

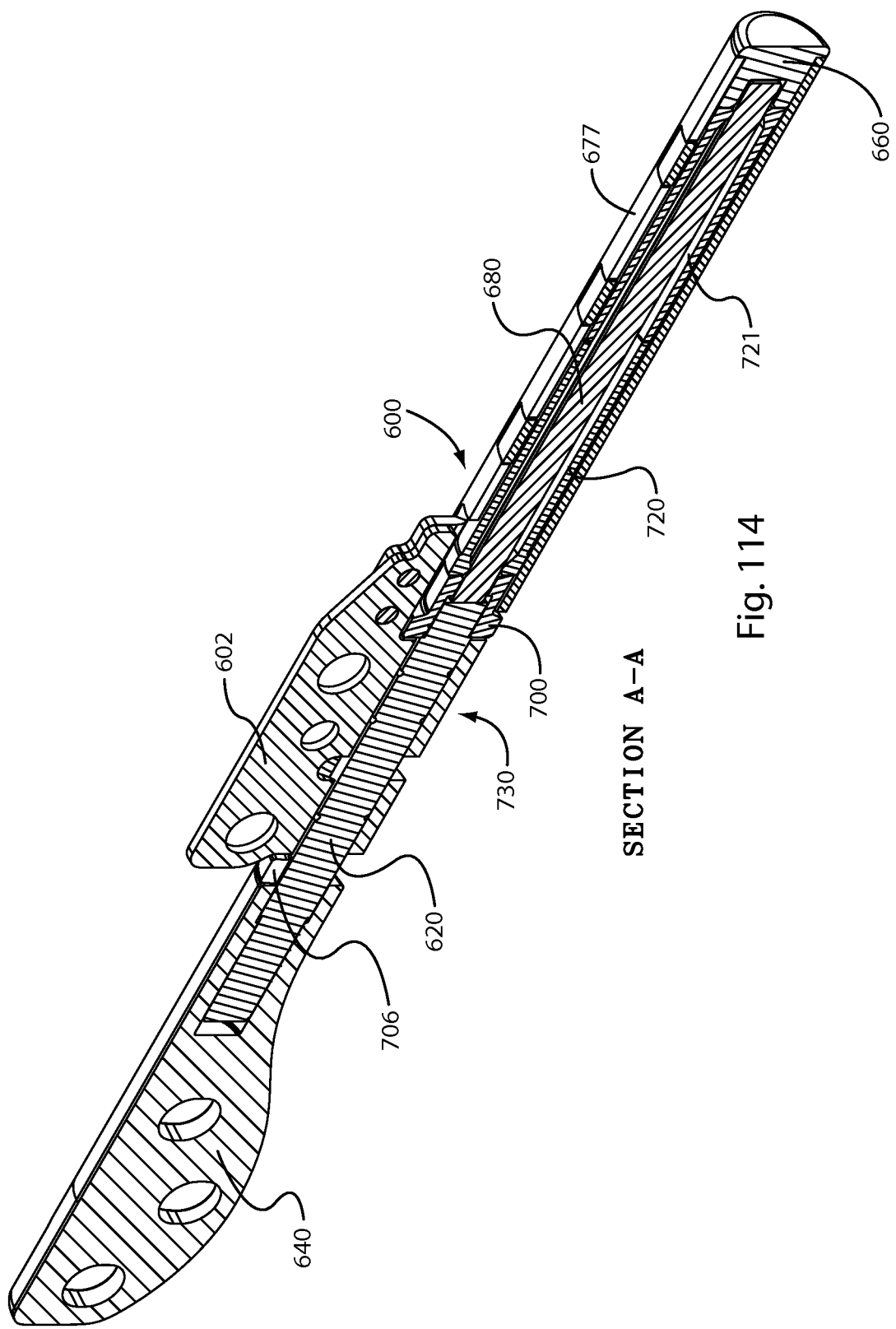

SECTION A-A

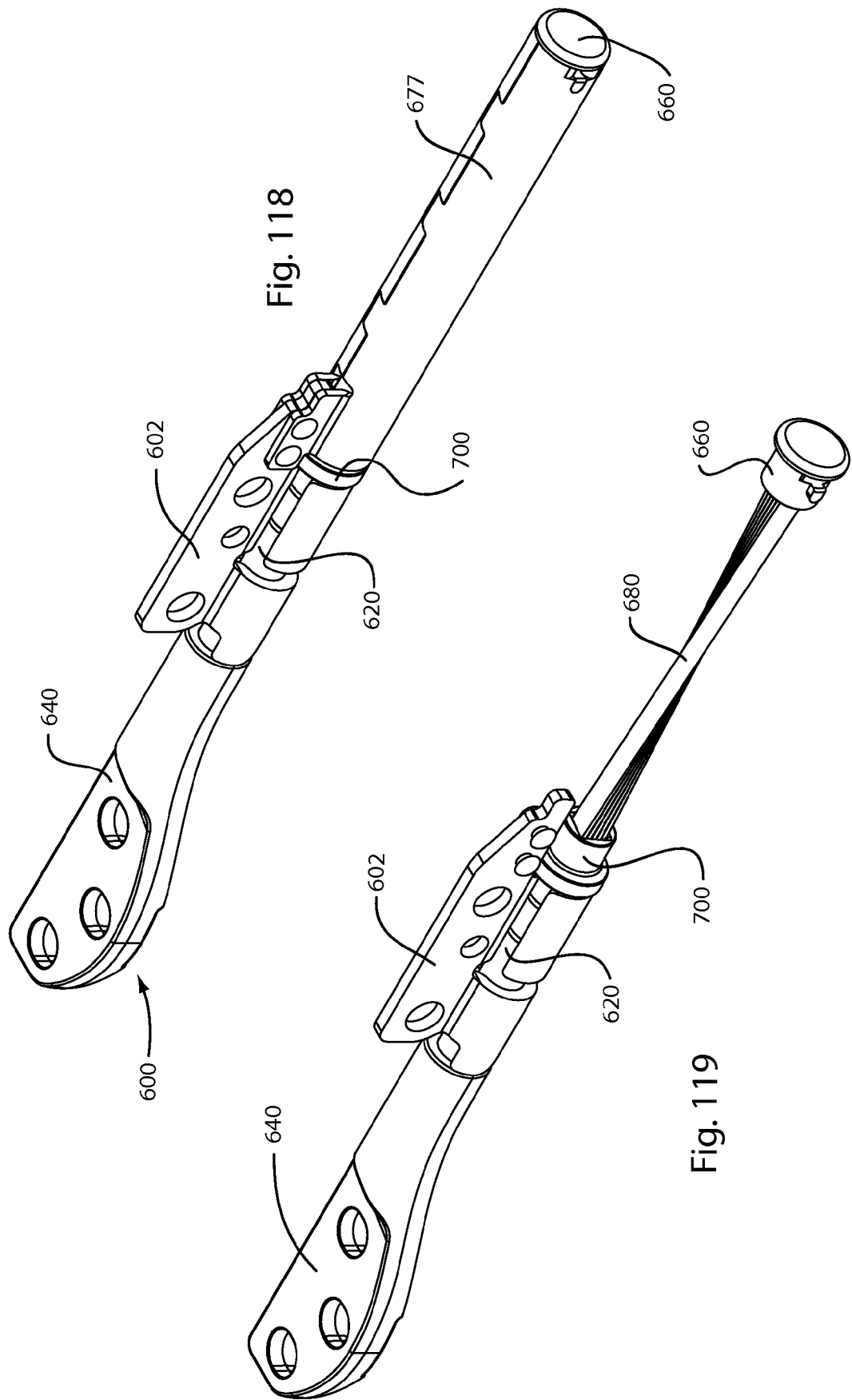

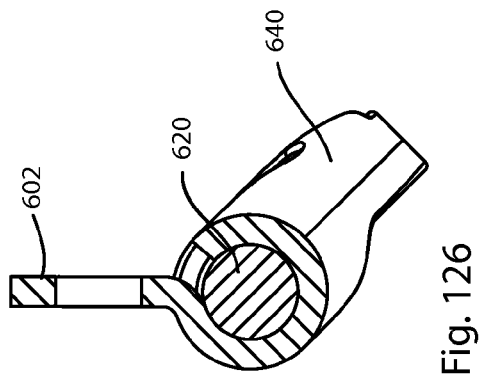
Fig. 125    Fig. 126
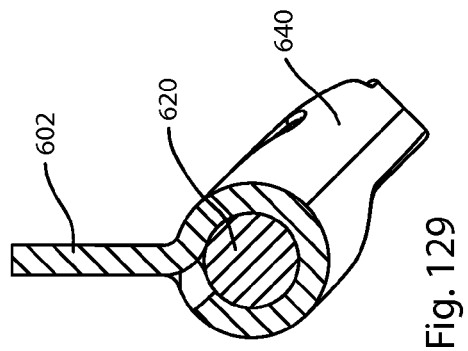
Fig. 128    Fig. 129
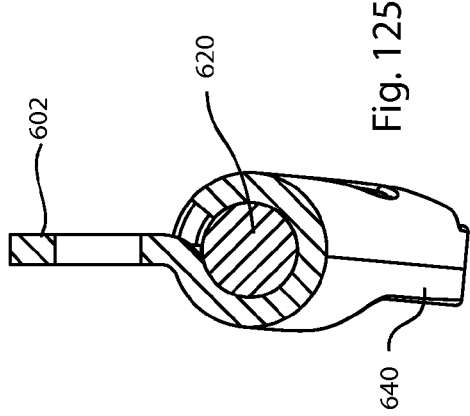
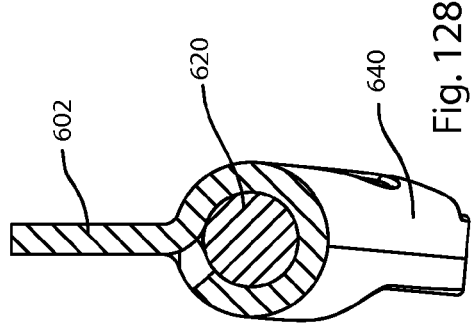
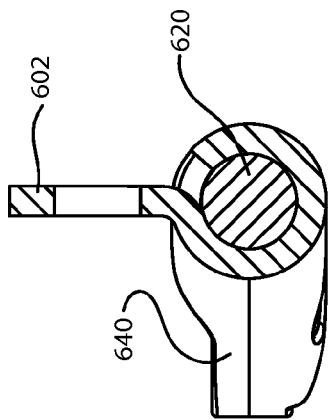
Fig. 124
SECTION B-B VIEWS
Fig. 127
SECTION C-C VIEWS

SECTION D-D

SECTION E-E

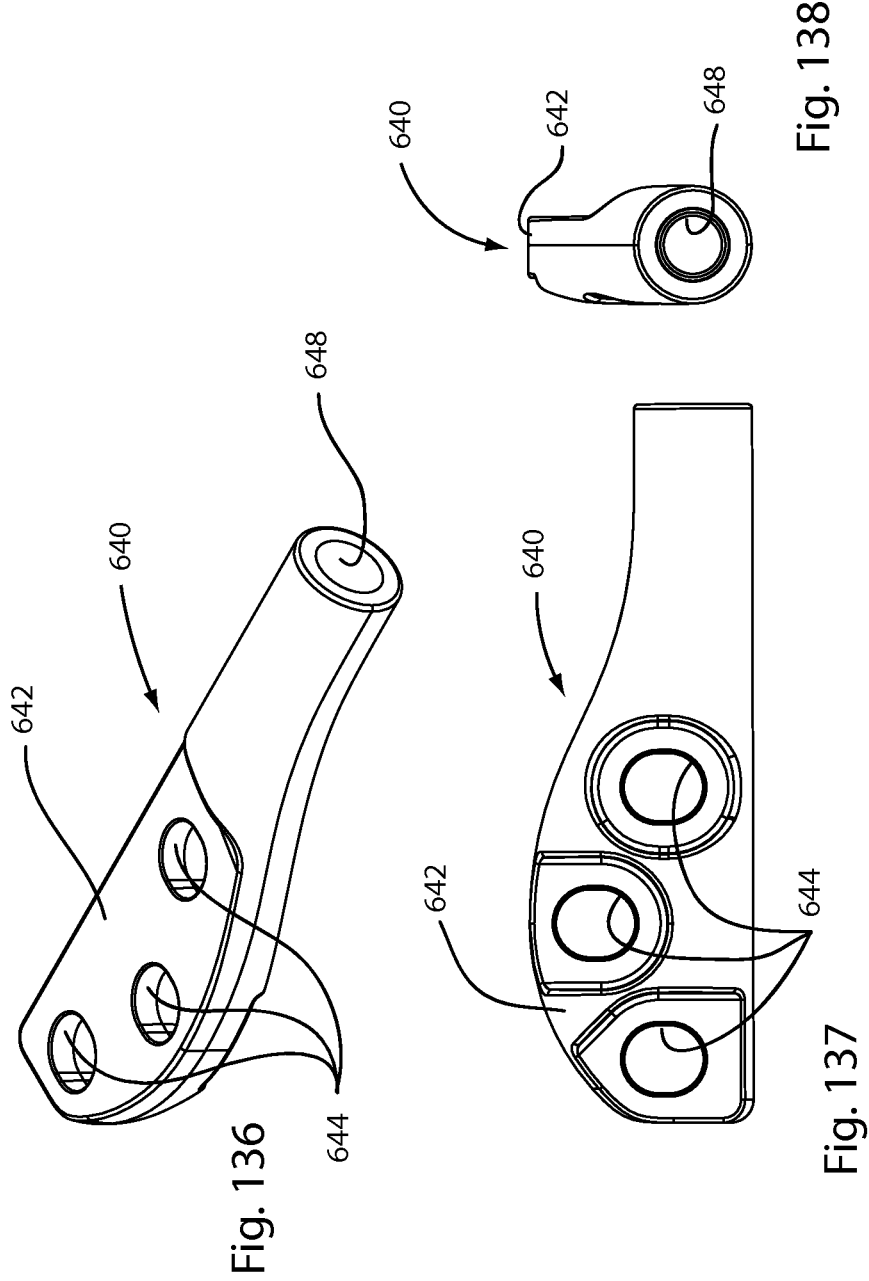

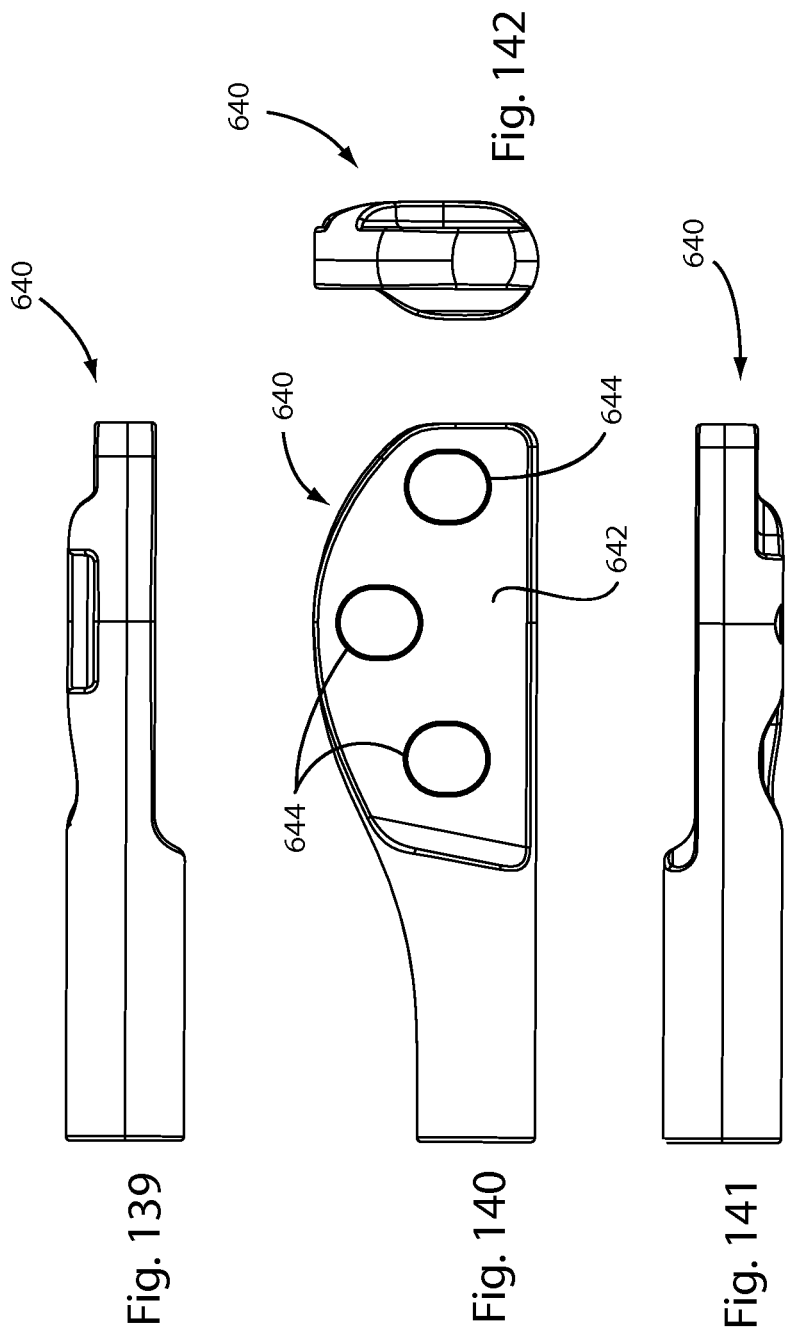

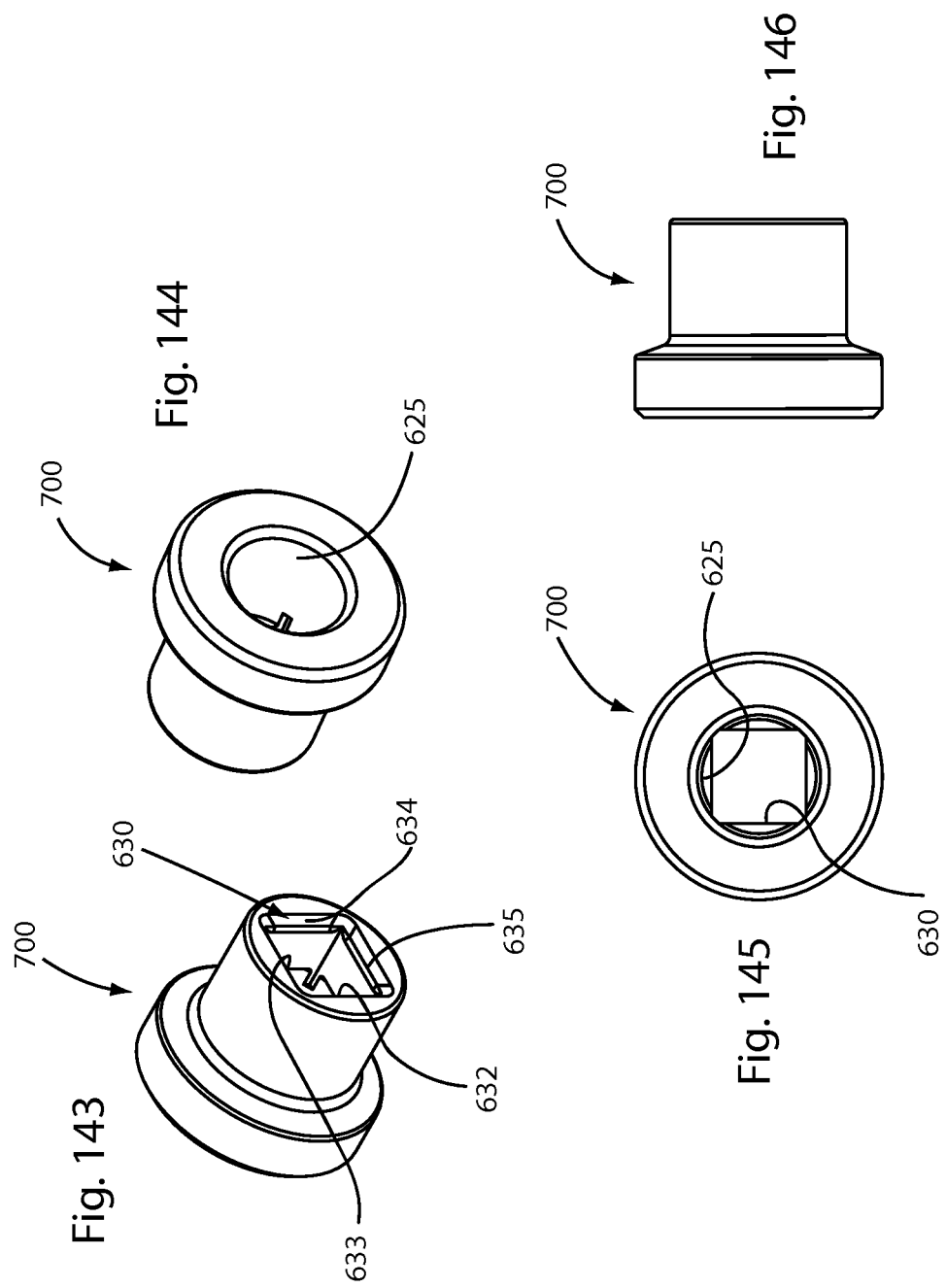

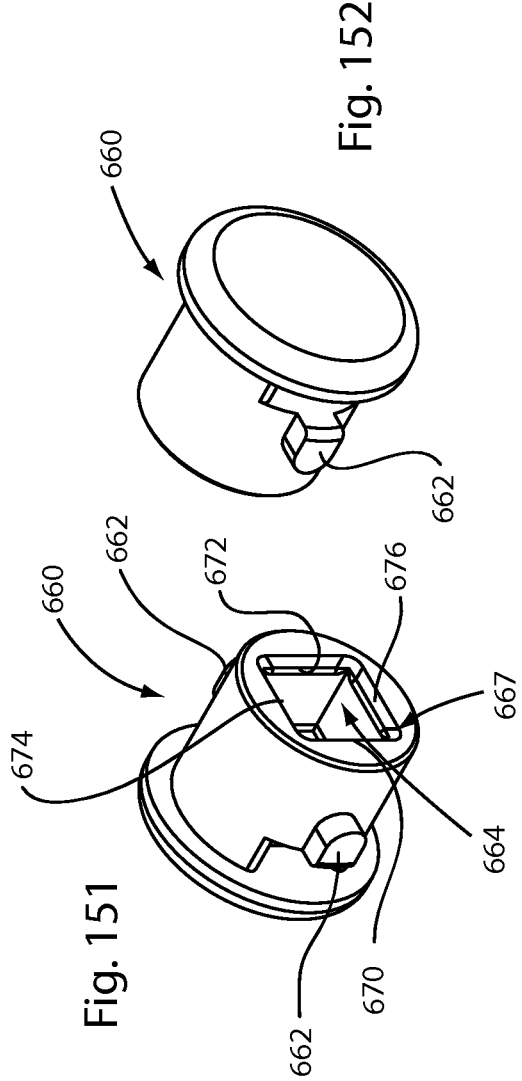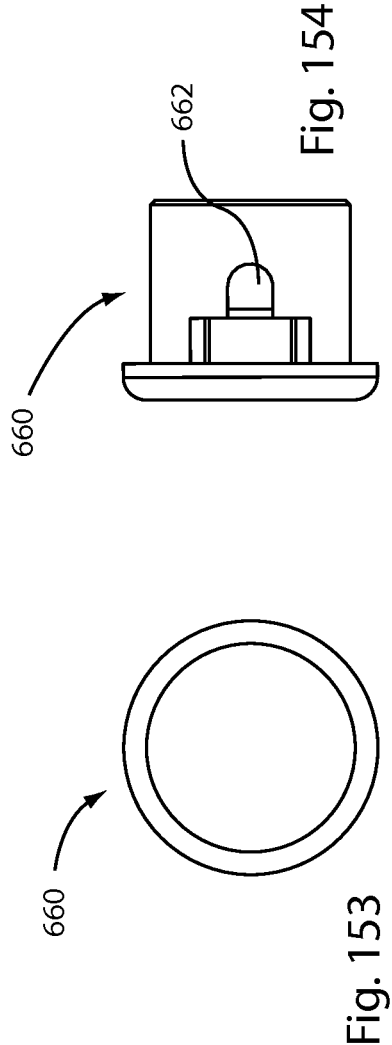

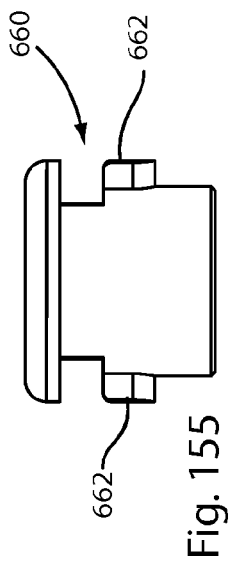
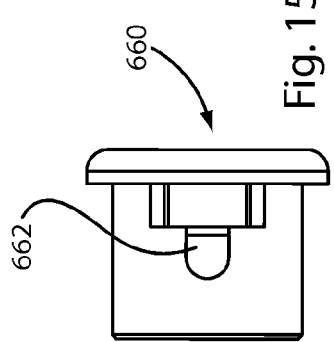
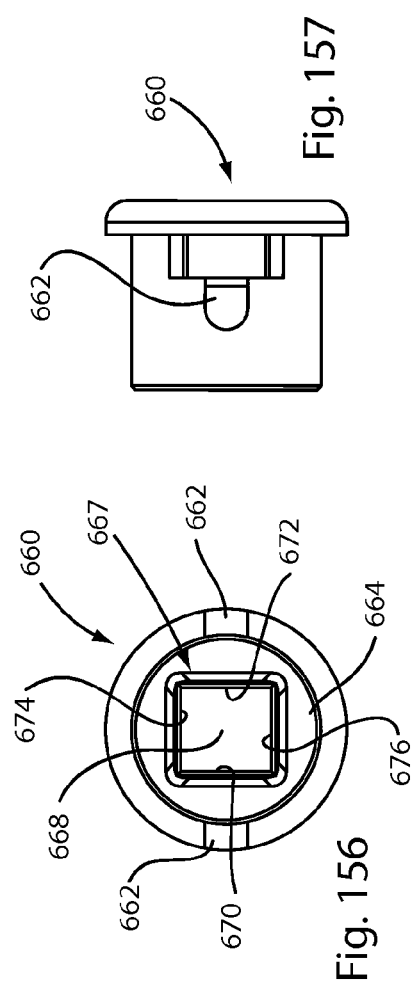
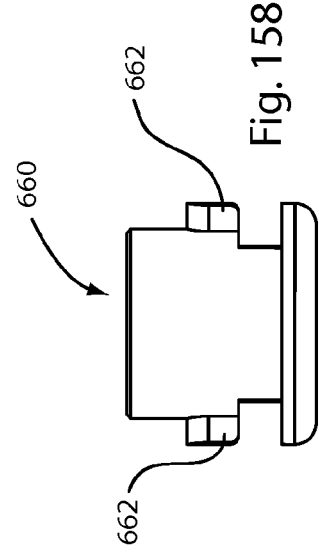

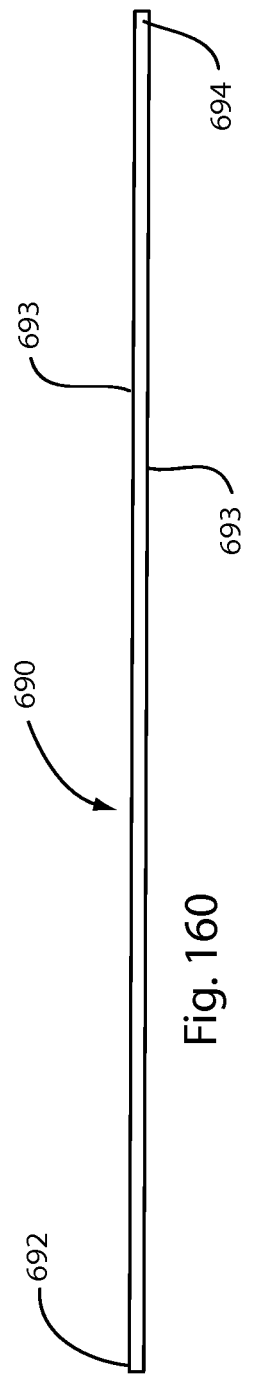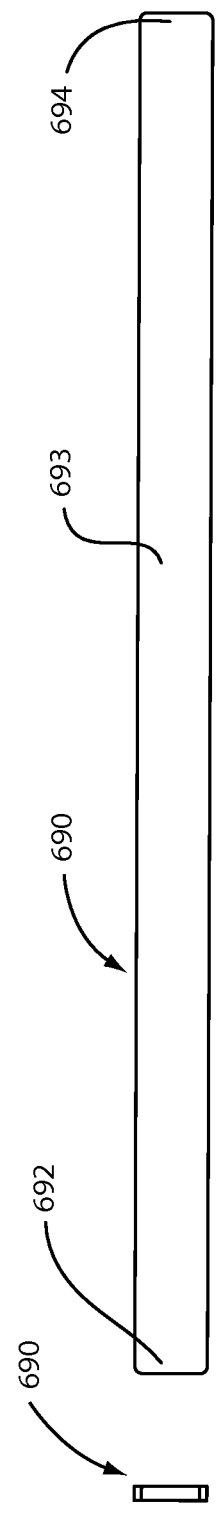
Fig. 160
Fig. 161
Fig. 162

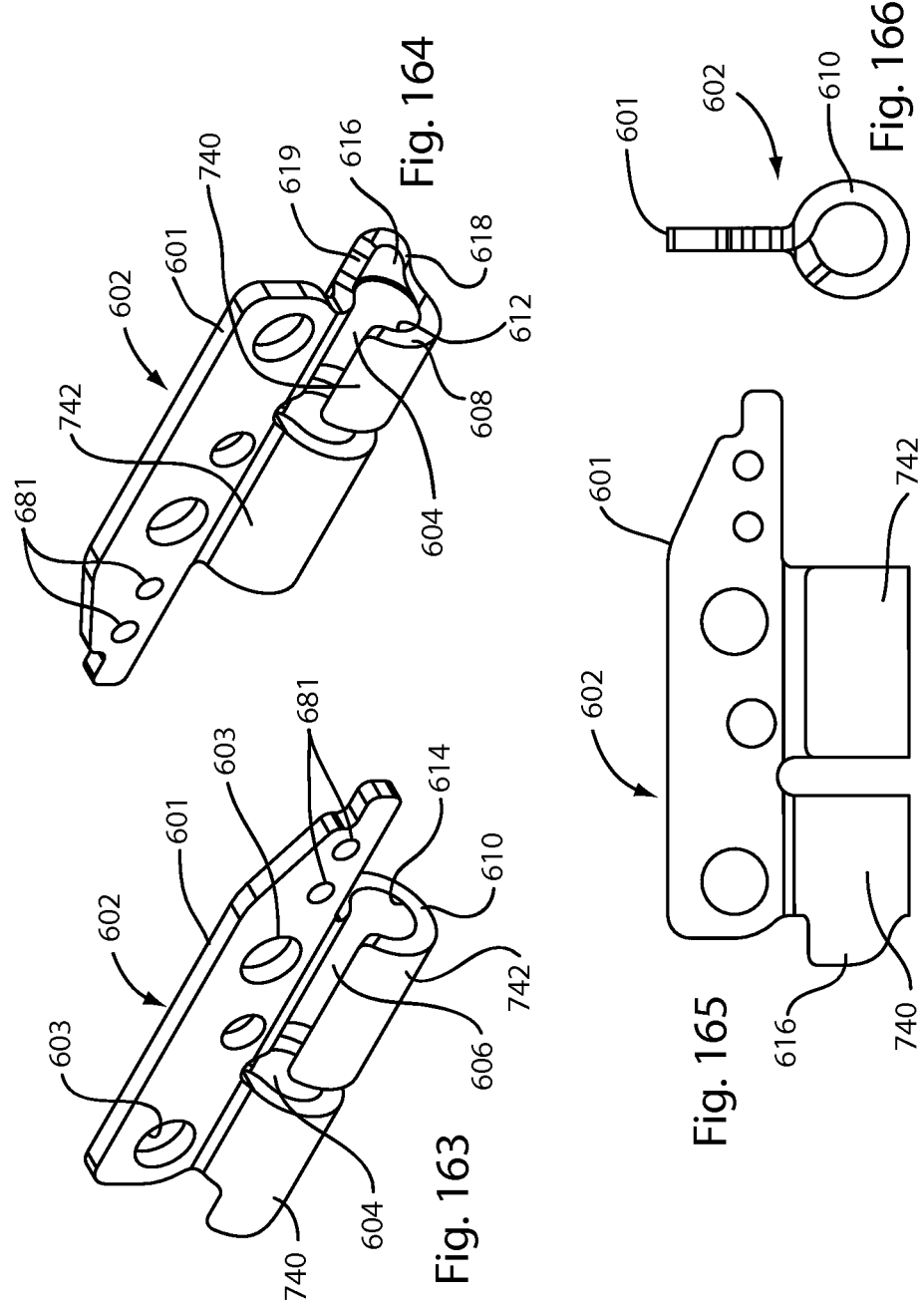

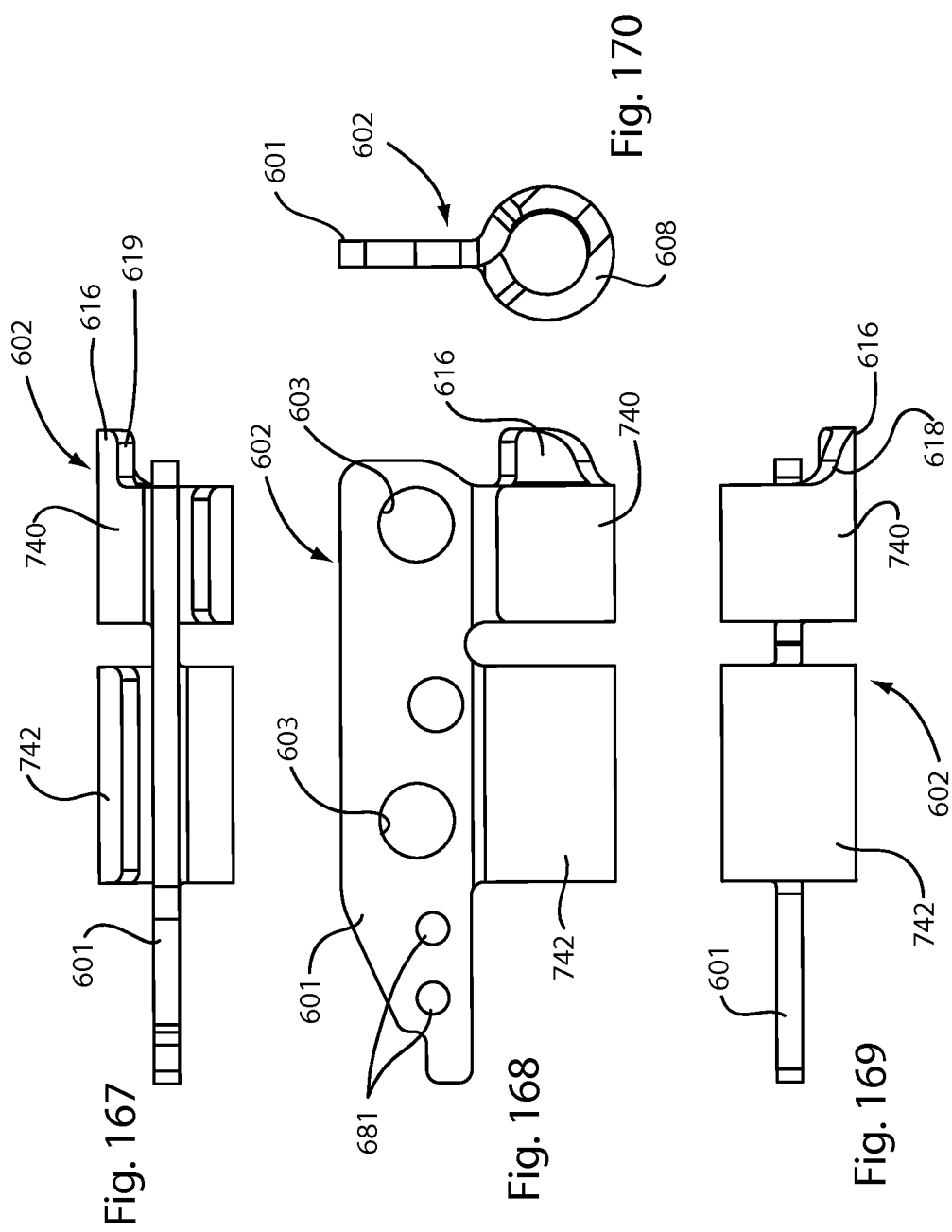

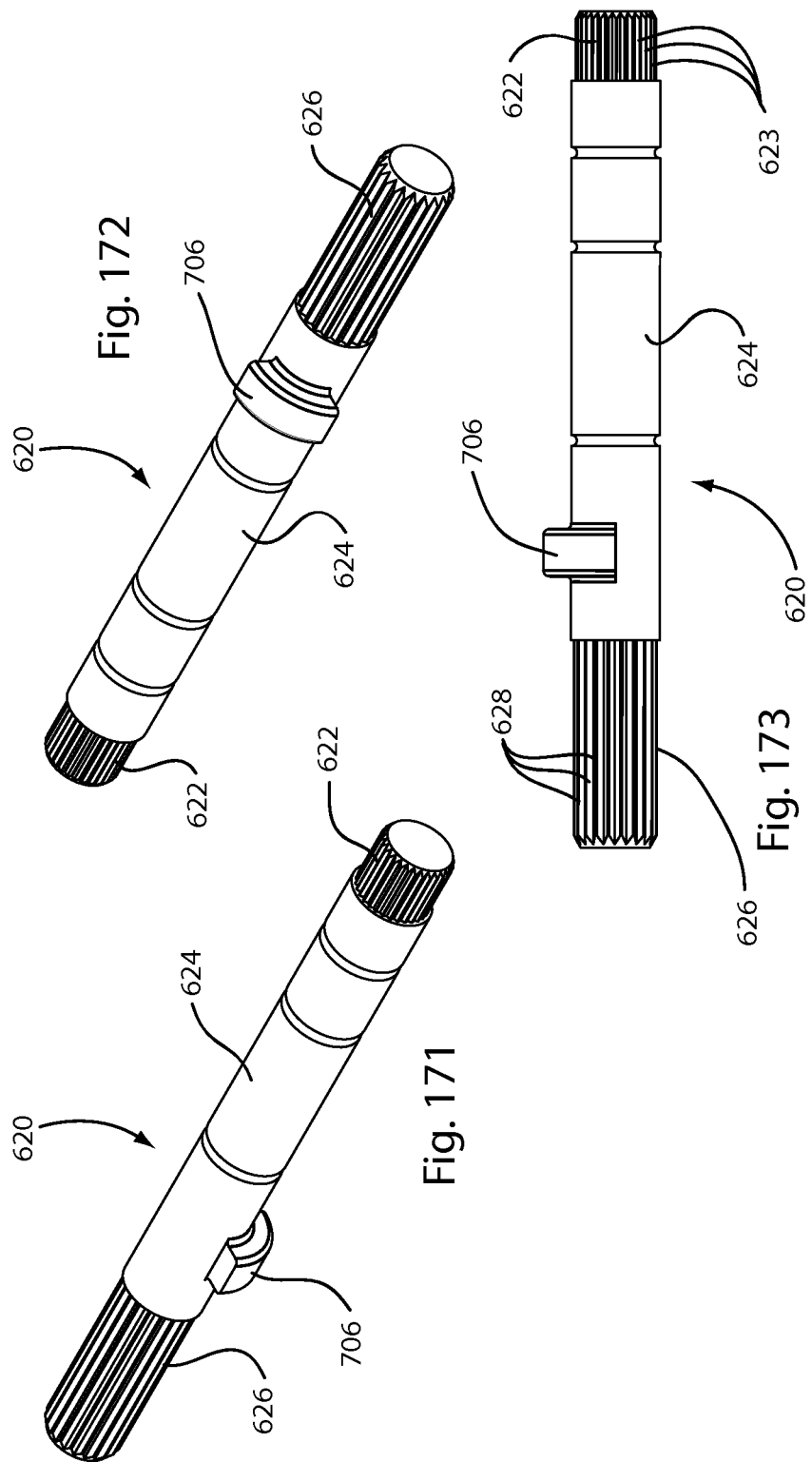

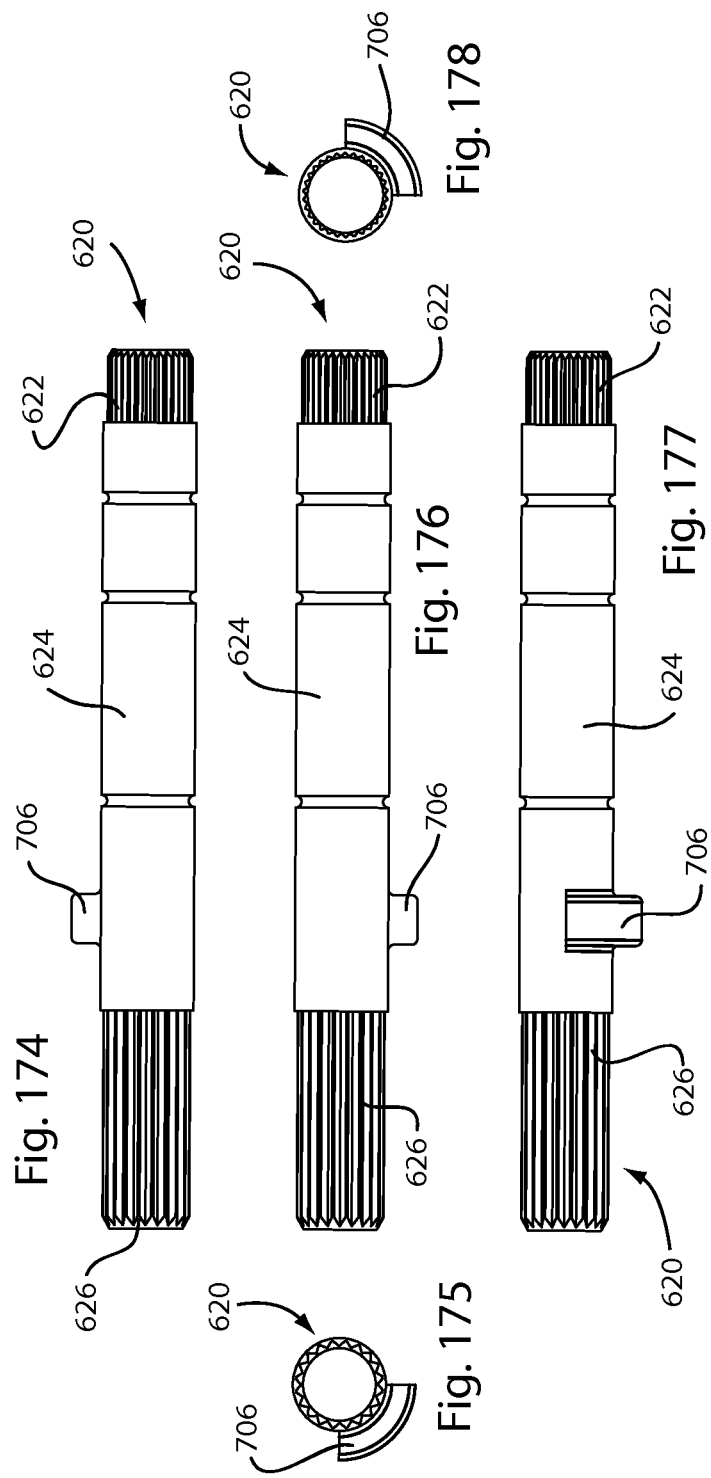

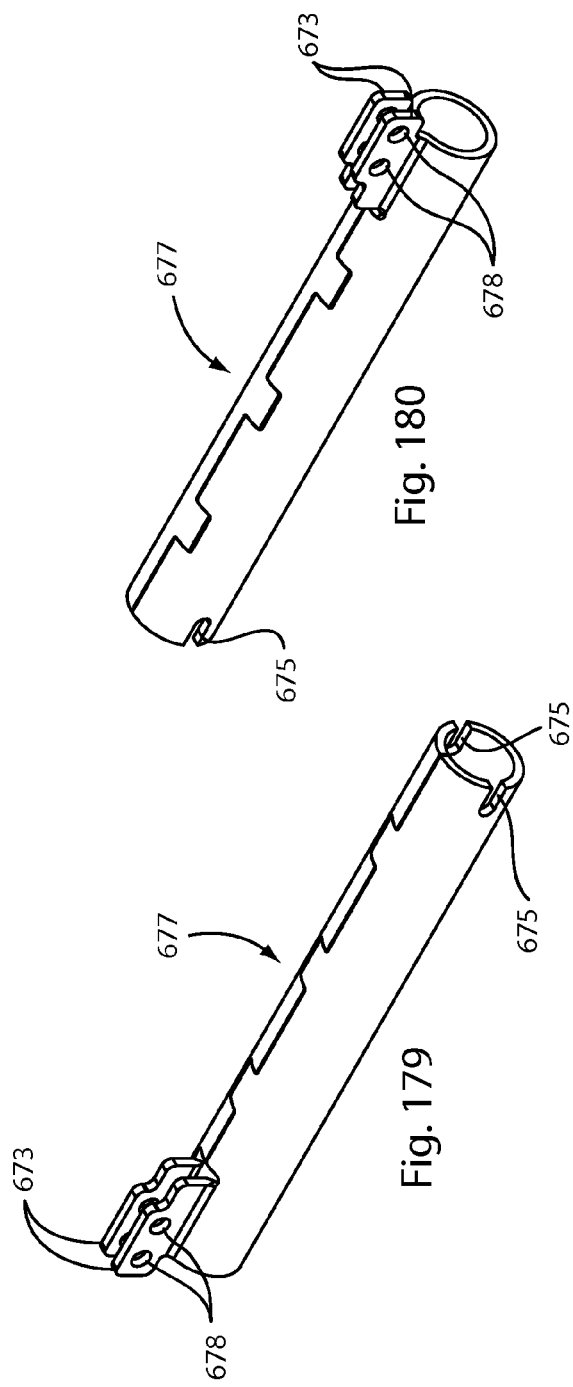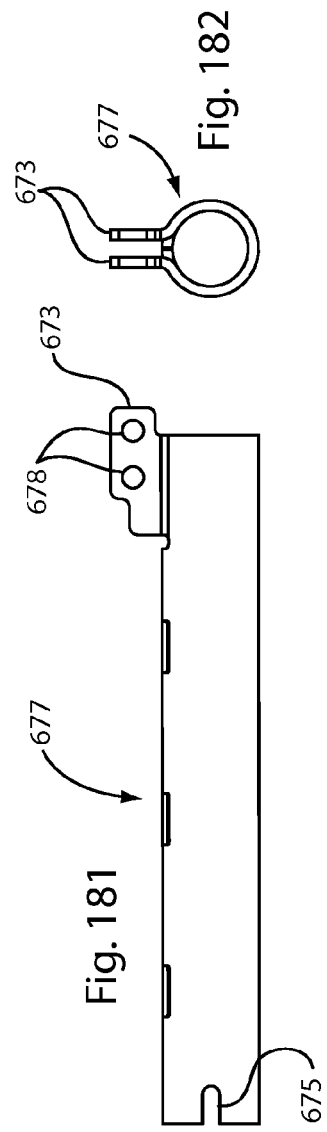

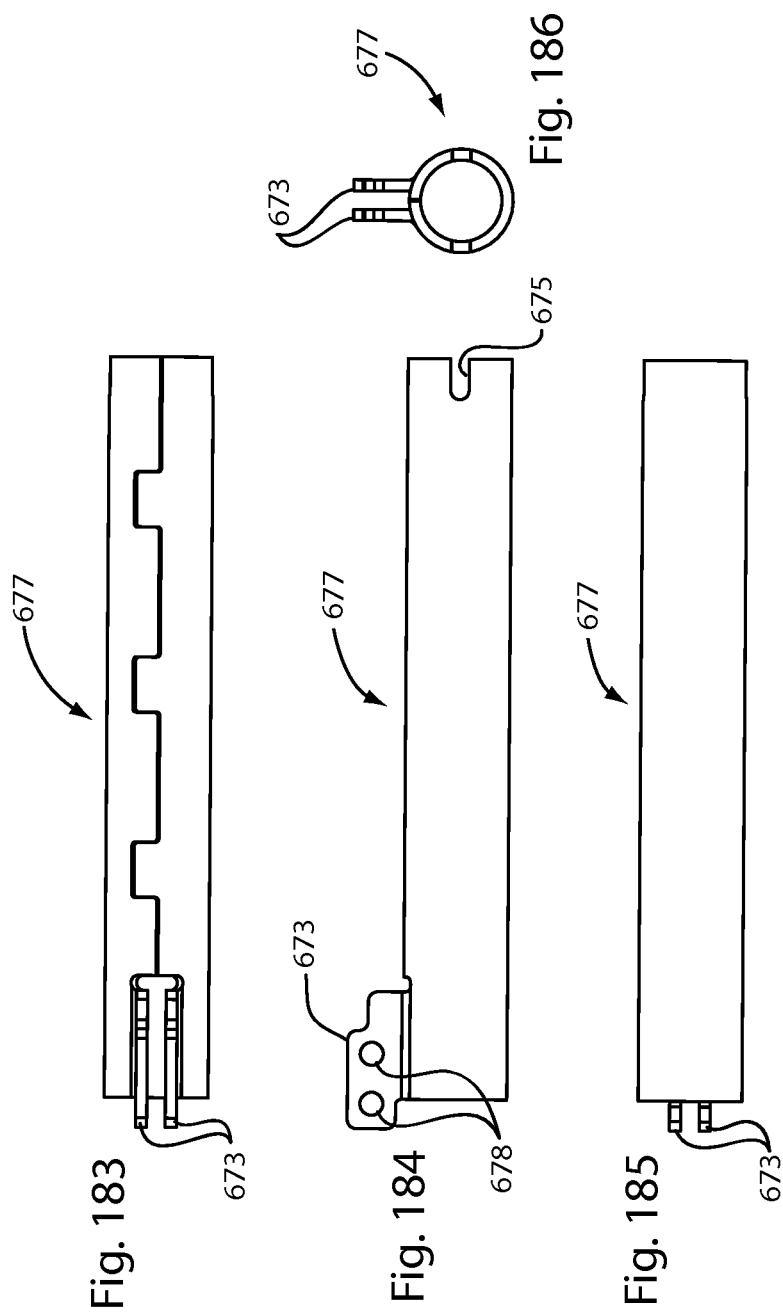

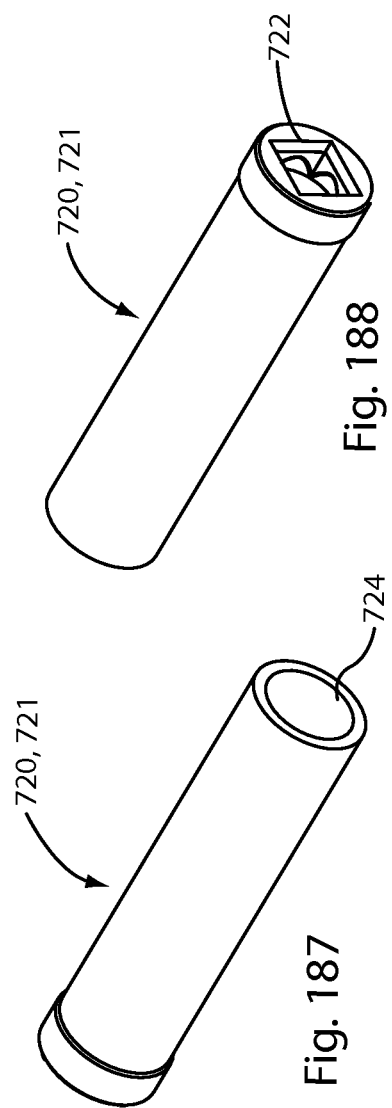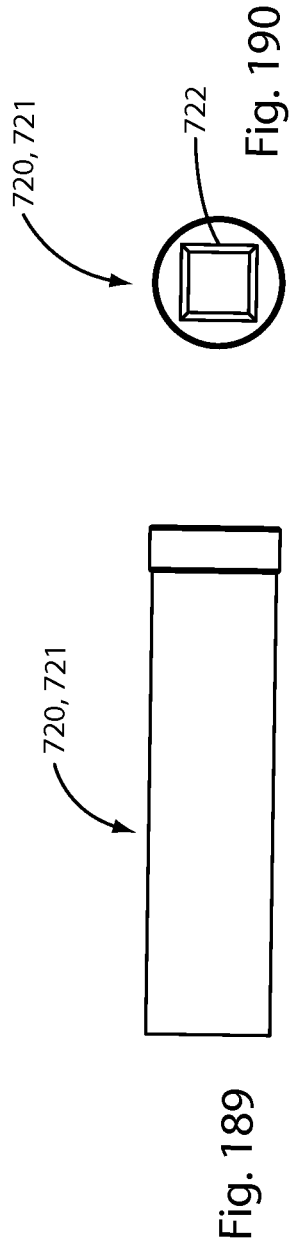

US 8,549,710 B2

HINGE ASSEMBLY WITH A MULTI-LAYER TORSION BAR SPRING

CROSS REFERENCE TO RELATED APPLICATIONS

This application claims the priority of U.S. Provisional Application for Patent Ser. No. 61/238,206, filed on Aug. 30, 2009, which is incorporated herein by reference in its entirety.

BACKGROUND OF THE INVENTION

1. Field of the Invention

The present invention relates to a hinge assembly for rotationally attaching a first member to a second member to allow rotational movement of the first member relative to the second member between a closed position and an open position.

2. Description of the Prior Art

Hinge assemblies for rotationally attaching a first member to a second member to allow rotational movement of the first member relative to the second member between a closed position and an open position are known in the prior art. In particular spring loaded hinge assemblies that assist the opening of the first member relative to the second member by storing energy in a spring during the closing operation are shown in U.S. Pat. No. 7,055,215 B1 to Ligtenberg at al., issued on Jun. 6, 2006. However, these hinges require special machined springs that are extremely costly and complex to manufacture. The multi-layer torsion bar of the present invention, which functions to assist the opening of the first member relative to the second member by storing energy during the closing operation, drastically reduces the cost and complexity of spring manufacture while maintaining the same performance. These and other advantages of the present invention will become apparent from the description and drawings that follow. None of the prior art hinge assemblies are seen to teach or suggest the unique features of the present invention or to achieve the advantages of the present invention.

SUMMARY OF THE INVENTION

The present invention is directed to a hinge assembly for rotationally attaching a first member to a second member to allow rotational movement of the first member relative to the second member between a closed position and an open position. The hinge assembly of the present invention includes a spring that assists the opening of the first member relative to the second member by storing energy in the spring during the closing operation. The spring is of a unique multilayered torsion bar design. The hinge assembly also includes a friction mechanism that exerts a sufficient frictional force on the hinge shaft such that the first member can be held in a range of desired angular positions on either side of the angular position corresponding to the relaxed state of the hinge spring and including the angular position corresponding to the relaxed state of the hinge spring. In addition, the multilayered torsion bar spring with its unique design and features is a significant invention in and of itself. Applying a torsion bar spring to a friction hinge is also another aspect of the invention.

Accordingly, it is an object of the invention to provide a multi-layer torsion bar spring.

It is another object of the invention to provide a spring assisted friction hinge that employs a multi-layer torsion bar spring.

It is yet another object of the invention to provide a spring assisted friction hinge that employs a torsion bar spring.

These and other objects of the present invention will become apparent from the attached description and drawings.

BRIEF DESCRIPTION OF THE DRAWINGS

FIG. 5 is a fragmentary environmental view with a section taken through the laptop computer to show the installation of the hinge assembly of the present invention to the laptop computer.

FIGS. 6-13 are views of the hinge assembly of the present invention showing the hinge adaptor in an angular position relative to the base of the hinge assembly that corresponds to the relaxed state of the hinge spring.

FIG. 15 is an isometric view of the hinge assembly of the present invention showing the hinge adaptor in an angular position relative to the base of the hinge assembly that corresponds to the relaxed state of the hinge spring.

FIG. 16 is an isometric view of the hinge assembly of the present invention showing the hinge adaptor in an angular position relative to the base of the hinge assembly that corresponds to the relaxed state of the hinge spring with the spring cover removed to show the multilayered torsion bar spring in its relaxed state.

FIG. 17 is an isometric view of the hinge assembly of the present invention showing the hinge adaptor in an angular position relative to the base of the hinge assembly that corresponds to the relaxed state of the hinge spring.

FIG. 18 is an isometric view of the hinge assembly of the present invention showing the hinge adaptor in an angular position relative to the base of the hinge assembly that corresponds to the relaxed state of the hinge spring with the hinge assembly sectioned to reveal its internal details.

FIG. 20 is an isometric view of the hinge assembly of the present invention showing the hinge adaptor in an angular position relative to the base of the hinge assembly that corresponds to the fully open position of the laptop computer lid.

FIG. 21 is an isometric view of the hinge assembly of the present invention showing the hinge adaptor in an angular position relative to the base of the hinge assembly that corresponds to the fully open position of the laptop computer lid with the spring cover removed to show the multilayered torsion bar spring in a twisted state corresponding to the fully open position of the laptop computer lid.

FIG. 23 is an isometric view of the hinge assembly of the present invention showing the hinge adaptor in an angular position relative to the base of the hinge assembly that corresponds to the fully twisted state of the hinge spring.

FIG. 24 is an isometric view of the hinge assembly of the present invention showing the hinge adaptor in an angular position relative to the base of the hinge assembly that corresponds to the fully twisted state of the hinge spring with the spring cover removed to show the multilayered torsion bar spring in its fully twisted state.

FIG. 25 is a fragmentary enlarged view showing the multilayered torsion bar spring in its fully twisted state.

FIGS. 26-27 are top and side views of the hinge assembly of the present invention to provide a guide to show the cut lines along which the cross-sectional views in FIGS. 22 and 28-35 are taken.

FIG. 28 is a cross-sectional view of the hinge assembly of the present invention taken along the line D-D in FIG. 27 showing the hinge adaptor in an angular position relative to the base of the hinge assembly that corresponds to the fully open position of the laptop computer lid.

FIG. 29 is a cross-sectional view of the hinge assembly of the present invention taken along the line D-D in FIG. 27 showing the hinge adaptor in an angular position relative to the base of the hinge assembly that corresponds to the relaxed state of the hinge spring.

FIG. 30 is a cross-sectional view of the hinge assembly of the present invention taken along the line D-D in FIG. 27 showing the hinge adaptor in an angular position relative to the base of the hinge assembly that corresponds to the fully-twisted state of the hinge spring.

FIG. 31 is a cross-sectional view of the hinge assembly of the present invention taken along the line C-C in FIG. 27 showing the hinge adaptor in an angular position relative to the base of the hinge assembly that corresponds to the fully open position of the laptop computer lid.

FIG. 32 is a cross-sectional view of the hinge assembly of the present invention taken along the line C-C in FIG. 27 showing the hinge adaptor in an angular position relative to the base of the hinge assembly that corresponds to the relaxed state of the hinge spring.

FIG. 33 is a cross-sectional view of the hinge assembly of the present invention taken along the line C-C in FIG. 27 showing the hinge adaptor in an angular position relative to the base of the hinge assembly that corresponds to the fully-twisted state of the hinge spring.

FIGS. 36-41 are views of the adaptor of the hinge assembly of the present invention for attaching the hinge assembly to a first member such as, for example, a laptop computer lid.

FIGS. 42-49 are views of the spring end cap of the hinge assembly of the present invention for axially constraining one end of the multi-layer torsion bar spring relative to the hinge shaft.

FIGS. 50-57 are views of the end piece of the hinge assembly of the present invention for rotationally constraining one end of the multi-layer torsion bar spring relative to a second member such as, for example, a laptop computer base.

FIGS. 63-70 are views of the hinge base of the hinge assembly of the present invention.

FIGS. 71-76 are views of the hinge shaft of the hinge assembly of the present invention.

FIGS. 77-82 are views of the friction element of the friction mechanism of the hinge assembly of the present invention.

FIGS. 96-102 are views of the torsion bar spring cover of the hinge assembly of the present invention.

FIGS. 109-112 are views of the second embodiment of the hinge assembly of the present invention showing the hinge adaptor in an angular position relative to the base of the hinge assembly that corresponds to the relaxed state of the hinge spring.

FIG. 113 is a view of the second embodiment of the hinge assembly of the present invention showing the hinge adaptor in an angular position relative to the base of the hinge assembly that corresponds to the relaxed state of the hinge spring and with the outer shell and inner sleeves removed to show the torsion bar spring.

FIGS. 114-115 are cross sectional views of the second embodiment of the hinge assembly of the present invention showing the hinge adaptor in an angular position relative to the base of the hinge assembly that corresponds to the relaxed state of the hinge spring.

FIG. 118 is an isometric view of the second embodiment of the hinge assembly of the present invention showing the hinge adaptor in an angular position relative to the base of the hinge assembly that corresponds to the closed state of the hinge assembly and the fully twisted state of the hinge spring.

FIGS. 119-121 are views of the second embodiment of the hinge assembly of the present invention showing the hinge adaptor in an angular position relative to the base of the hinge assembly that corresponds to the closed state of the hinge assembly and the fully twisted state of the hinge spring and that are partially broken away to reveal internal details.

FIG. 124 is a cross-sectional view of the second embodiment of the hinge assembly of the present invention taken along the line B-B in FIG. 109 showing the hinge adaptor in an angular position relative to the base of the hinge assembly that corresponds to the fully closed position of the laptop computer lid.

FIG. 125 is a cross-sectional view of the second embodiment of the hinge assembly of the present invention taken along the line B-B in FIG. 109 showing the hinge adaptor in an angular position relative to the base of the hinge assembly that corresponds to the relaxed state of the hinge assembly.

FIG. 126 is a cross-sectional view of the second embodiment of the hinge assembly of the present invention taken along the line B-B in FIG. 109 showing the hinge adaptor in an angular position relative to the base of the hinge assembly that corresponds to the fully open position of the laptop computer lid.

FIG. 127 is a cross-sectional view of the second embodiment of the hinge assembly of the present invention taken along the line C-C in FIG. 109 showing the hinge adaptor in an angular position relative to the base of the hinge assembly that corresponds to the fully closed position of the laptop computer lid.

FIG. 128 is a cross-sectional view of the second embodiment of the hinge assembly of the present invention taken along the line C-C in FIG. 109 showing the hinge adaptor in an angular position relative to the base of the hinge assembly that corresponds to the relaxed state of the hinge assembly.

FIG. 129 is a cross-sectional view of the second embodiment of the hinge assembly of the present invention taken along the line C-C in FIG. 109 showing the hinge adaptor in an angular position relative to the base of the hinge assembly that corresponds to the fully open position of the laptop computer lid.

FIGS. 136-142 are views of the adaptor of the second embodiment of the hinge assembly of the present invention for attaching the hinge assembly to a first member such as, for example, a laptop computer lid.

FIGS. 143-150 are views of the first spring end cap or holder of the second embodiment of the hinge assembly of the present invention for axially constraining one end of the multi-layer torsion bar spring relative to the hinge base.

FIGS. 151-158 are views of the second spring end cap or holder of the second embodiment of the hinge assembly of the present invention for axially constraining one end of the multi-layer torsion bar spring relative to the hinge shaft.

FIGS. 159-162 are views of one leaf of the multi-layer torsion bar spring of the second embodiment of the hinge assembly of the present invention.

FIGS. 163-170 are views of the hinge base of the second embodiment of the hinge assembly of the present invention, which also constitutes the friction mechanism of the second embodiment of the hinge assembly of the present invention.

FIGS. 171-178 are views of the hinge shaft of the second embodiment of the hinge assembly of the present invention.

FIGS. 179-186 are views of the outer shell covering the torsion bar spring of the second embodiment of the hinge assembly of the present invention.

FIGS. 187-194 are views of the inner torsion bar spring covers or sleeves of the second embodiment of the hinge assembly of the present invention that fit between the outer shell and the torsion bar spring.

Similar reference characters denote corresponding features consistently throughout the attached drawings.

DETAILED DESCRIPTION OF THE PREFERRED EMBODIMENTS

Figure 1:
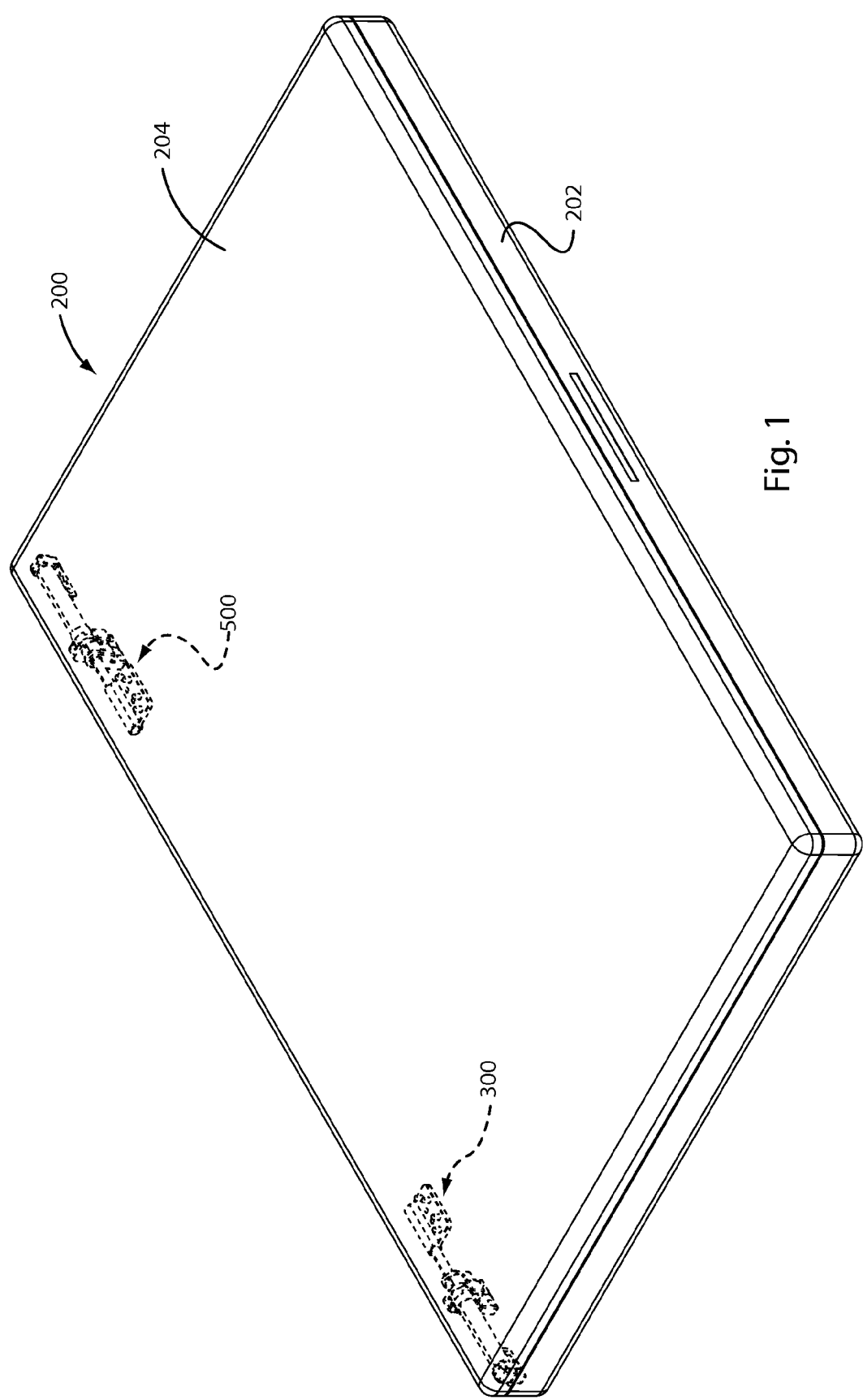
FIG. 1 is an environmental view of the hinge assembly of the present invention showing the hinge assembly applied to a laptop computer with the lid of the laptop computer in the closed position.
Figure 2:
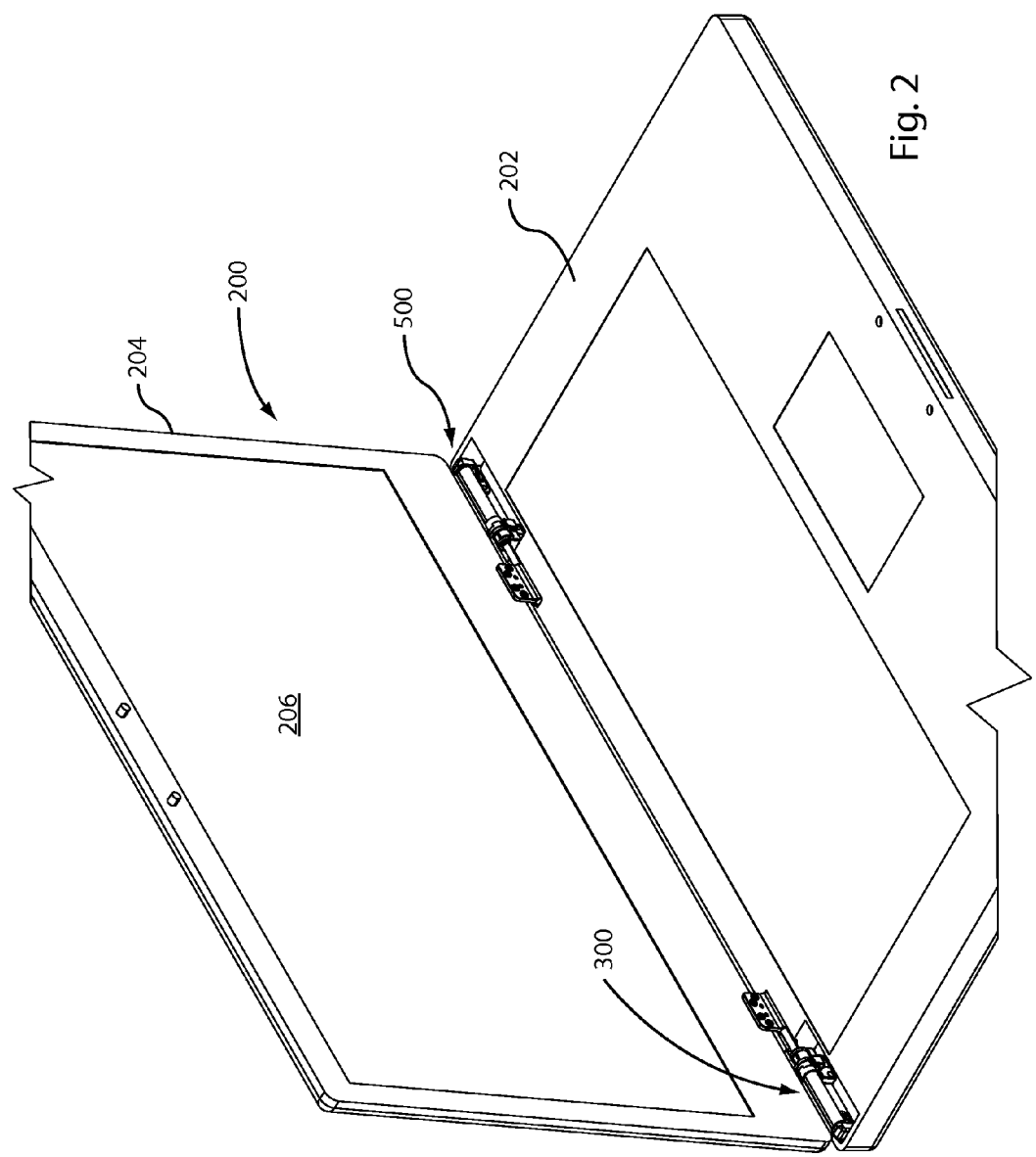
FIG. 2 is an environmental view of the hinge assembly of the present invention showing the hinge assembly applied to a laptop computer with the lid of the laptop computer in an angular position relative to the base of the laptop computer that corresponds to the relaxed state of the hinge spring.
Figure 3:
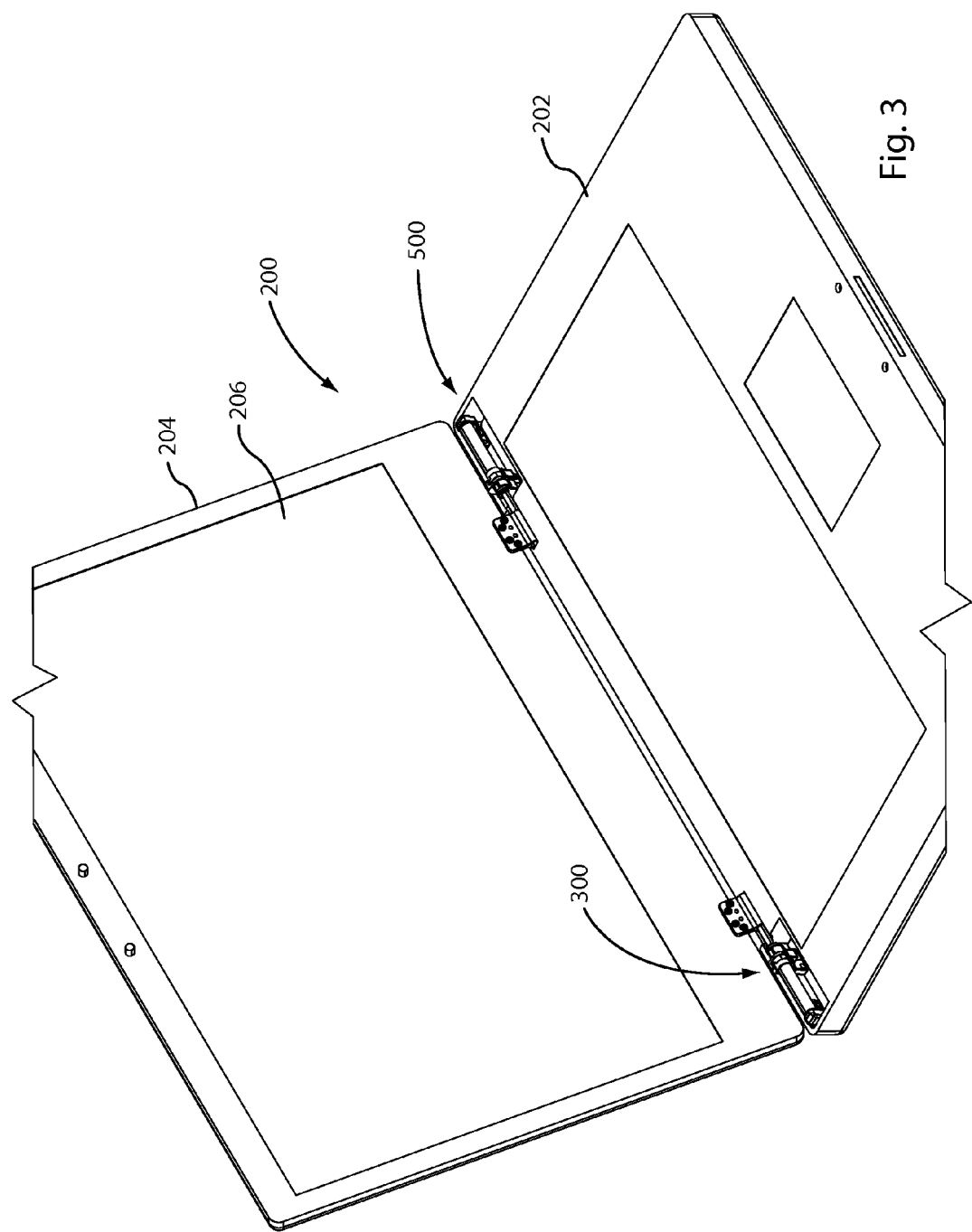
FIG. 3 is an environmental view of the hinge assembly of the present invention showing the hinge assembly applied to a laptop computer with the lid of the laptop computer in an angular position relative to the base of the laptop computer that corresponds to the fully open state of the laptop computer lid.
Figure 4:
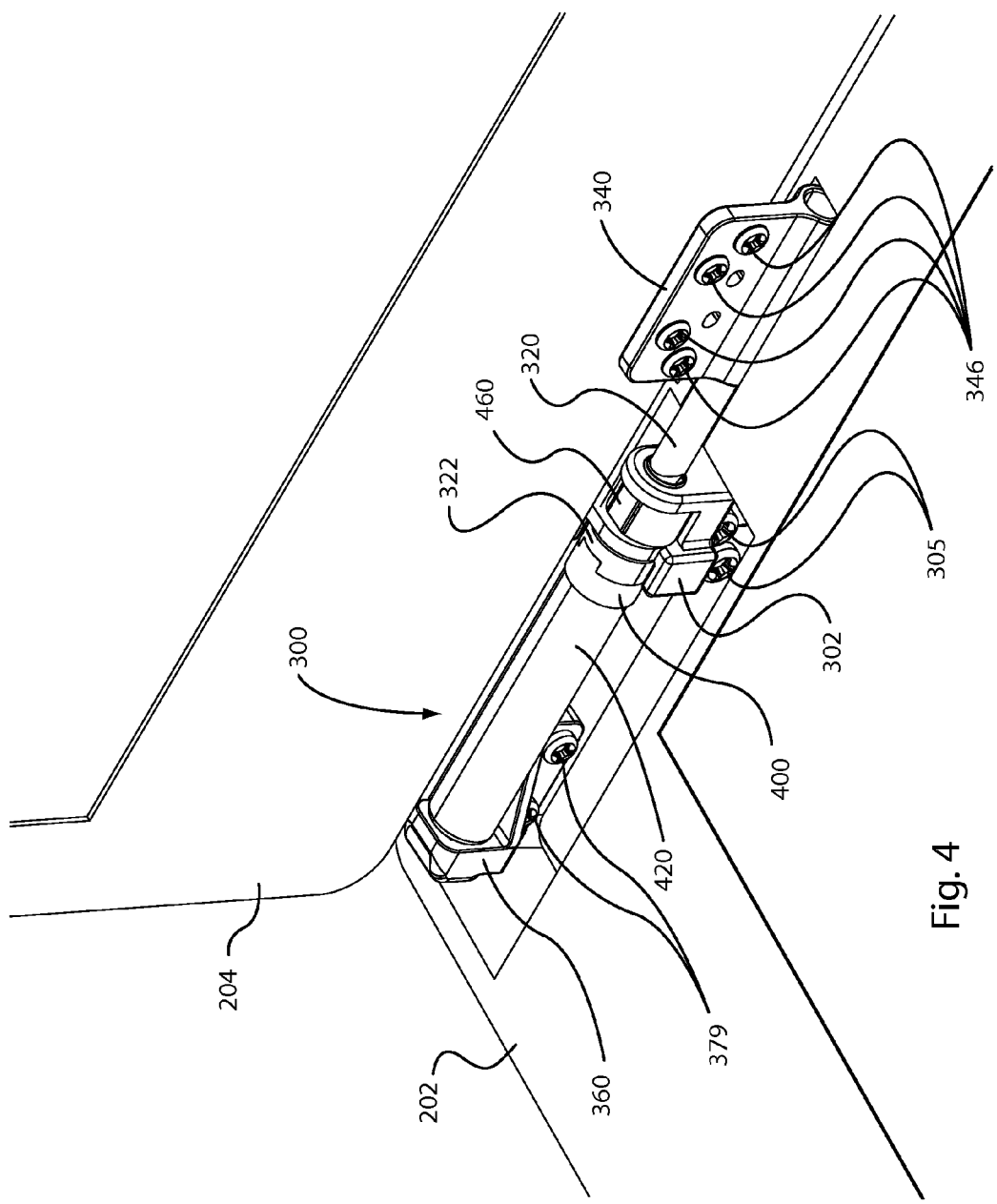
FIG. 4 is a fragmentary environmental view showing the installation of the hinge assembly of the present invention to a laptop computer.
Figure 14:
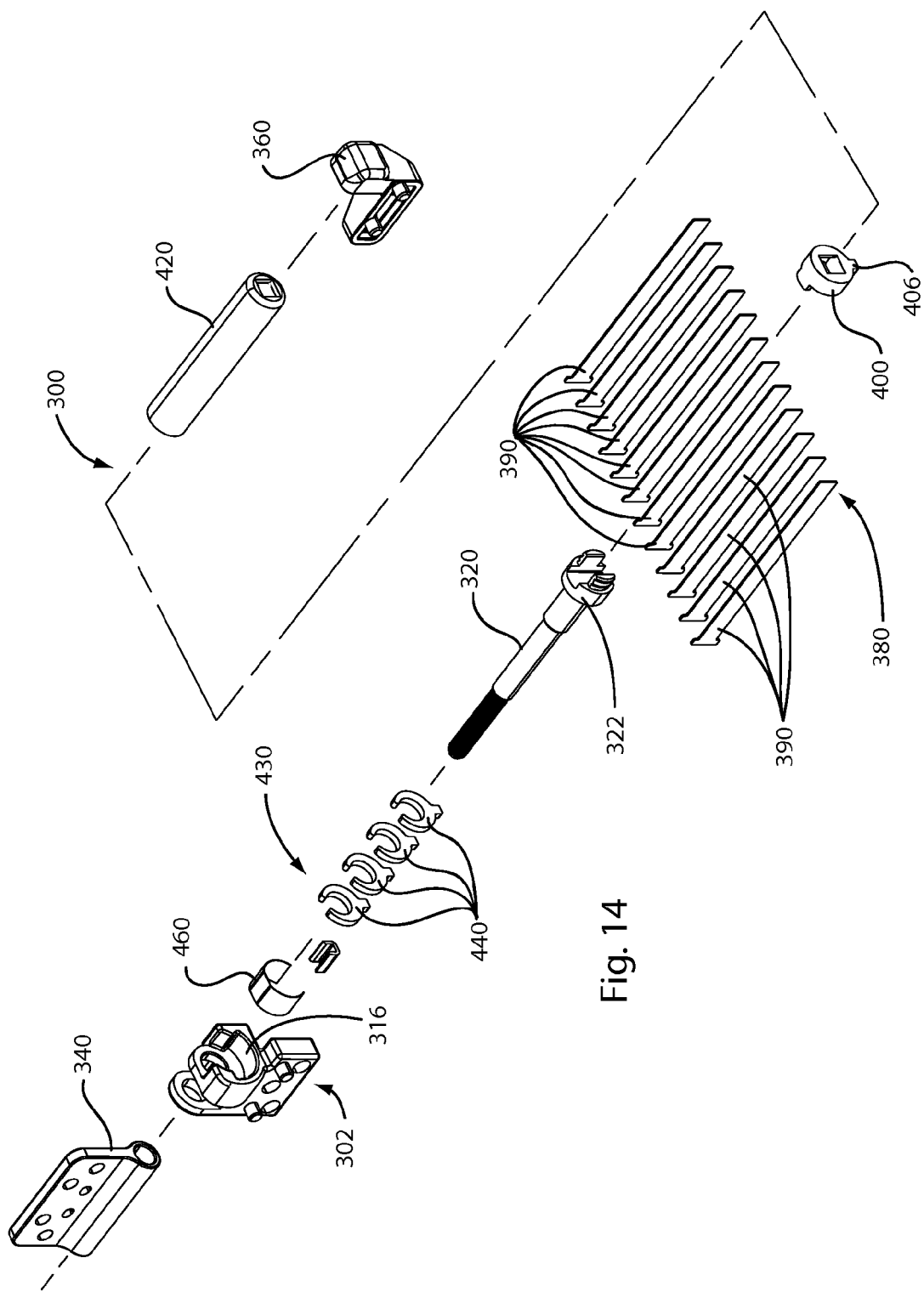
FIG. 14 is an exploded view of the hinge assembly of the present invention.

Referring to FIGS. 1-102, the present invention is directed to a hinge assembly 300, 500 for rotationally attaching a first member to a second member to allow rotational movement of the first member relative to the second member between a closed position and an open position. Referring to FIGS. 1-5, two hinge assemblies 300 and 500 made in accordance with the present invention are shown being used to rotationally attach the lid 204 of a laptop computer 200 to the base 202 of the laptop computer 200. The laptop lid 204 typically houses the laptop screen 206 and its angular position relative to the laptop base 202 should be adjustable within a range of angular positions suitable for people of a variety of sizes to properly view the laptop screen 206.

The hinge assembly 300 is a left hinge assembly and the hinge assembly 500 is a right hinge assembly. The right hinge assembly 500 is a mirror image of the hinge assembly 300 about a plane perpendicular to longitudinal axes of the shafts of each of the hinge assemblies and positioned halfway between the two hinge assemblies. Accordingly, only the hinge assembly 300 is described in detail. The laptop lid 204 typically is releasably secured in the closed position relative to the laptop base 202 by a latch (not shown) of some sort. The latch can be operated by a user to release or free the laptop lid 204 for rotational movement to the open position relative to the laptop base 202.

The hinge assembly 300 can be used to rotationally attach a first member to a second member to allow rotational movement of the first member relative to the second member between a closed position and an open position. In the illustrated example, the first member is the laptop lid 204 and the second member is the laptop base 202. The hinge assembly 300 includes an elongated shaft 320, an adaptor 340, a hinge base 302, a friction mechanism 430, an end piece 360, a torsion bar spring 380, a cap 400, and a torsion bar cover 420.

Referring to FIGS. 1-35 and 71-76, the elongated shaft 320 has at least a first end portion 326, a second portion 324 and a head portion 322. The first end portion 326 of the shaft 320 is provided with a plurality of elongated teeth 328 of triangular cross section evenly distributed about the circumference of the first end portion 326 of the shaft 320. Each of the plurality of elongated teeth 328 extends for at least the majority of the length of the first end portion 326 of the shaft 320. In the illustrated example, the second portion 324 of the shaft 320 is of larger diameter compared to the first end portion 326. The head portion 322 of the shaft 320 is in the form of a cylindrical disk of a larger diameter as compared to the second portion 324. The head portion 322 of the shaft 320 has a slot 330 that extends transversely, i.e. perpendicularly, to the longitudinal axis of the shaft 320. The head portion 322 of the shaft 320 has a pair of prongs 332 projecting from the head portion 322 on either side of the slot 330. The prongs 332 extend from the head portion 322 of the shaft 320 in a direction parallel to the longitudinal axis of the shaft 320 and away from the first end portion 326 and the second portion 324. The prongs 332 have a plurality of ribs 334 provided on their outer surfaces. In the illustrated example, the ribs 334 are curved and have a saw tooth profile in cross section.

The adaptor 340 is attached to the shaft 320 at the first end portion 326 of the shaft 320. The adaptor 340 is attached to the first end portion 326 of the shaft 320 such that the adaptor 340 is constrained to rotate with the shaft 320 as a unit. The adaptor 340 is adapted for fixed attachment to the first member, the laptop lid 204 in the illustrated example, so as to move with the first member as a unit. Referring to FIGS. 1-35 and 36-41, the adaptor 340 has a body portion 342 that is rectangular with two rounded corners in plan view. The body portion 342 of the adaptor 340 is provided with a plurality of holes 344 to allow the adapter 340 to be securely fastened to the first member, for example the laptop lid 204, by screws 346.

The adaptor 340 has a bore 348 provided on one side of the rectangular body portion 342. The bore 348 of the adapter 340 is designed to receive the first end portion 326 of the shaft 320 in a press fit or interference fit such that the shaft 320 is securely fastened to the adaptor 340 and the shaft 320 and the adaptor 340 are rotationally coupled to rotate together as a unit. The teeth 328 on the shaft's end portion 326 assist in rotationally coupling the shaft 320 to the adaptor 340 by providing a stronger grip between the internal surface of the bore 348 of the adapter 340 and the exterior surface of the first end portion 326 of the shaft 320. Thus, the bore 348 of the adapter 340 and the toothed exterior surface of the first end portion 326 of the shaft 320 form the means for securely fastening the shaft 320 to the adaptor 340 and rotationally coupling the shaft 320 and the adaptor 340 together in the illustrated embodiment.

Many other suitable means may also be employed for securely fastening the shaft 320 to the adaptor 340 and rotationally coupling the shaft 320 and the adaptor 340 together. The exterior surface of the first end portion 326 of the shaft 320 may be smooth and inserted into the bore 348 in an interference fit to secure and couple the shaft 320 and the adaptor 340 together. A key cooperating with slots in the shaft 320 and the bore 348 may be used to secure and couple the shaft 320 and the adaptor 340 together. Fasteners extending through the wall of the bore 348 either extending into corresponding holes in the shaft 320 or frictionally engaging the shaft 320 may be used to secure and couple the shaft 320 and the adaptor 340 together. Also, the adaptor 340 may be clamped to the shaft 320 using a clamping arrangement such as by providing a longitudinal slot that extends completely through the wall of the bore 348 and providing one or two flanges adjacent the longitudinal slot with screws that can be tightened to draw the edges of the longitudinal slot together to clamp the adaptor 340 to the shaft 320.

The hinge base 302 is adapted for fixed attachment to the second member, the laptop base 202 in this example, so as to move with the second member as a unit. The hinge base 302 has at least one bearing surface 304, 306 that rotationally supports the shaft 320 such that, when the adaptor 340 is attached to the first member and the hinge base 302 is attached to the second member, the first member is rotationally attached to the second member such that the first member can rotationally move relative to the second member between a closed position and an open position. In the illustrated example, the first and second members are the laptop lid 204 and the laptop base 202, respectively. The bearing surface of the hinge base 302 supports a portion of the second portion 324 of the shaft 320 to provide for rotational support of the shaft 320 by the hinge base 302.

Referring to FIGS. 1-35 and 63-70, in the illustrated example, the hinge base 302 has two bearing surfaces 304 and 306. The hinge base 302 has one side 308 that is closest to the adaptor 340 and one side 310 that is farthest from the adaptor 340. The side 308 has an opening 312 that allows the shaft 320 to extend outward from the hinge base 302 to the adapter 340. The side 310 has an opening 314 that allows the head portion 322 of the shaft 320 to be at least partially exposed and accessible from the side of the hinge base 302 farthest from the adapter 340. A curved recess 316 is provided along a portion of the rim of the opening 314. The recess 316 has end walls 318 and 319. The hinge base 302 has a flange 301 that has a plurality of holes 303 to allow the hinge base 302 to be securely fastened to the second member, for example the laptop base 202, by screws 305.

Referring to FIGS. 1-35, 63-70, and 77-95, the hinge assembly 300 is provided with a friction mechanism 430 for frictionally resisting rotational motion of the shaft 320 relative to the hinge base 302. The friction mechanism 430 is supported by the hinge base 302. The friction mechanism 430 is located between the bearing surfaces 304 and 306. The friction mechanism 430 includes a plurality of friction elements 440, a channel insert, and friction mechanism cover 460. The hinge base 302 has a channel 307 that extends between the bearing surfaces 304 and 306 in a direction parallel to the longitudinal axis of the shaft 320. The friction elements 440 are of the symmetrical friction clip type and have a C-shaped portion 442 and a stem 444. The stem 444 projects outward from the outer surface of the C-shaped portion 442 at a location opposite the gap between the tips 446 and 448 of the C-shaped portion 442. The friction elements 440 engage the portion of the second portion 324 of the shaft 320 that extends between the bearing surfaces 304 and 306. The inner radius of the C-shaped portion 442 is smaller than the radius of the outer surface of the second portion 324 of the shaft 320 so that the C-shaped portion 442 expands when placed around the second portion 324 of the shaft 320. The resilience of the C-shaped portion 442 of the friction elements 440 causes the C-shaped portions 442 of the friction elements 440 to exert a gripping force on the second portion 324 of the shaft 320.

The channel insert 450 fits into the channel 307. The channel insert 450 is U-shaped in cross section and extends for the length of the channel 307. The stems 444 of the friction elements 440 are received in the channel insert 450 and consequently in the channel 307 to prevent the friction elements 440 from rotating with the shaft 320. Thus, the friction elements 440 are prevented from rotating relative to the hinge base 302. The gripping force exerted by the C-shaped portions 442 of the friction elements 440 on the shaft 320 generates a friction torque that resists rotational motion of the shaft 320 relative to the hinge base 302. The friction torque generated by the friction elements 440 can be matched to any specified value for a particular application by adjusting the geometry, number and material of the friction elements 440. The friction mechanism cover 460 is C-shaped in cross section and extends for the length of the gap between the bearing surfaces 304 and 306. The edges of the friction mechanism cover 460 seal against the outer surfaces of the C-shaped portions 442 of the friction elements 440 and the portions of the hinge base 302 that form the bearing surfaces 304 and 306. The friction mechanism cover 460 keeps dirt and abrasive particles out of the friction mechanism 430 and keeps lubricant, needed to ensure smooth hinge operation and prevent premature friction element failure, confined to the friction mechanism 430. The channel insert 450 is made of a relatively harder material compared to the hinge base 302 and acts to distribute forces exerted by the stems of the friction elements 440 evenly on the walls of the channel 307 so that the stems of the friction elements 440 do not dig into and warp the channel 307.

The end piece 360 is adapted for fixed attachment to the second member, in this example the laptop base 202, so as to move with the second member as a unit. The end piece 360 has a flange 362 and a socket 364. The socket 364 has a front opening 366, a back wall 368, side edges 370 and 372, top edge 374 and bottom edge 376. The front opening 366 is rectangular. The flange 362 of the end piece 360 has a plurality of holes 378 to allow the end piece 360 to be securely fastened to the second member, for example the laptop base 202, by screws 379. FIGS. 1-5 show the end piece 360 fastened to the laptop base 202.

Referring to FIGS. 1-35 and 42-62, the torsion bar spring 380 extends from the end piece 360 to the head portion 322 of the shaft 320. The torsion bar spring 380 has a first end 382 and a second end 384. The torsion bar spring 380 is resilient and has a longitudinal axis. The first end 382 of the torsion bar spring 380 is constrained to rotate with the shaft 320 as a unit. The second end 384 of the torsion bar spring 380 is constrained by the end piece 360 so there can be essentially no relative rotation between the end piece 360 and the second end 384 of the torsion bar spring 380 about the longitudinal axis of the torsion bar spring 380 such that rotation of the shaft 320 relative to the end piece 360 causes the torsion bar spring 380 to be twisted about its longitudinal axis when the shaft 320 is initially in a neutral position. The neutral position refers to the position of any part of the hinge assembly 300 that corresponds to the relaxed state of the torsion bar spring 380. The torsion bar spring 380 stores energy as it is twisted and tends to exert a force to restore the shaft 320 and the adaptor 340 to their neutral positions due to the resilience of the torsion bar spring 380.

The torsion bar spring 380 is made of a plurality of leaves 390 that are stacked together in superimposed fashion. Each spring leaf 390 is in the form of an elongated rectangular strip having lateral tabs 391 extending from either side at one end of the elongated rectangular strip to form a T-shaped head 392. As the spring leaves 390 are stacked together they give the first end 382 of the torsion bar spring 380 a "T" shape. The first end 382 of the torsion bar spring 380 is constrained against rotation relative to the head portion 322 of the shaft 320 and the second end 384 of the torsion bar spring 380 is constrained against rotation relative to the end piece 360 such that rotation of the shaft 320 relative to the end piece 360 causes the torsion bar spring 380 to be twisted about its longitudinal axis when the shaft 320 is initially in a neutral position.

The first end 382 of the torsion bar spring 380 is constrained against rotation relative to the head portion 322 of the shaft 320 by a cap 400. The cap 400 has a rectangular opening 401 with rounded lateral edges 402 and top and bottom edges 403 and 404, respectively. The cap 400 has two cavities 405 that receive the prongs 332 of the head portion 322 of the shaft 320 to securely fasten the cap 400 to the head portion 322 of the shaft 320. Each cavity 405 receives a respective one of the prongs 332. The prongs 332 will be in an interference fit with the cavities 405. The ribs 334 on the prongs' outer surfaces assist in securely fastening the cap 400 to the head portion 322 of the shaft 320 by providing a stronger grip between the internal surface of the cavities 405 and the exterior surface of the prongs 332. Thus, the cavities 405 and the prongs 332 form the means for securely fastening the cap 400 to the head portion 322 of the shaft 320 in the illustrated embodiment.

The cap 400 has a rib 406 and two axial lateral projections 407 and 408. The axial lateral projections 407 and 408 extend in a direction parallel to the longitudinal axis of the shaft 320 from either side of the cap 400. When the cap 400 is securely fastened to the head portion 322 of the shaft 320, the axial lateral projections 407 and 408 fit at least in part into the slot 330 of the shaft head portion 322 and close off the ends of the slot 330. When the cap 400 is securely fastened to the head portion 322 of the shaft 320, the rib 406 extends at least in part into the recess 316 of the hinge base 302 to limit the rotation of the hinge shaft 320 relative to the hinge base 302. The rib 406 engages the end wall 319 of the recess 316 to stop the rotation of the hinge shaft 320 and adaptor 340 at a position corresponding to the fully open position of the laptop lid 204. The rib 406 engages the end wall 318 of the recess 316 to stop the rotation of the hinge shaft 320 and adaptor 340 at a position slightly passed the closed position of the laptop lid 204. The rib 406 and the recess 316 constitute a safety means for preventing the over stressing of the torsion bar spring 380 that can lead to breakage of the torsion bar spring 380.

The torsion bar spring 380 extends through the opening 401 of the cap 400. The rounded lateral edges 402 of the cap 400 are in direct contact with the surfaces 393 of the outermost leaves 390 of the torsion bar spring 380. The distance between the rounded lateral edges 402 of the opening 401 of the cap 400 is such that the fit of the torsion bar spring 380 between the rounded lateral edges 402 of the opening 401 is very tight or with minimal clearance. Thus, the rounded lateral edges 402 of the opening 401 are responsible for transferring torque between the shaft 320 and the torsion bar spring 380. Using the rounded lateral edges 402 of the opening 401 for torque transfer between the shaft 320 and the torsion bar spring 380, places the torque transfer edges 402 at a slight displacement from the T-shaped heads 392 of the spring leaves 390. This avoids the problem of stress concentration at the joint between the T-shaped heads 392 and the remainder of the rectangular strip body portions of the spring leaves 390, which can lead to the premature failure of the torsion bar spring 380. Also, the rounding of the edges 402 of the opening 401 of the cap 400 prevents stress concentration at the edges of the outermost spring leaves 390, which can also lead to failure of the spring leaves 390 and consequently of the torsion bar spring 380. The distance between the top edge 407 and the bottom edge 408 of the opening 401 of the cap 400 is such that the T-shaped heads 392 of the leaves 390 cannot pass through the opening 401, and the T-shaped heads 392 of the leaves 390 are captured between the cap 400 and the shaft head portion 322. This arrangement constrains the axial movement, i.e. movement in a direction parallel to the longitudinal axis of the shaft 320, of the T-shaped heads 392 of the leaves 390.

The ends 394 of the leaves 390 that are farthest from the T-shaped heads 392 are stacked together in superimposed fashion when the torsion bar spring 380 is in a relaxed state, and the ends 394 form the second end 384 of the torsion bar spring 380. The torsion bar spring 380 extends through the opening 366 of the socket 364. The lateral edges 370 and 372 of the socket opening 366 are rounded. The rounded lateral edges 370 and 372 of the socket opening 366 are in direct contact with the surfaces 393 of the outermost leaves 390 of the torsion bar spring 380. The distance between the rounded lateral edges 370 and 372 of the opening 366 of the socket 364 is such that the fit of the torsion bar spring 380 between the rounded lateral edges 370 and 372 of the opening 366 is very tight or with minimal clearance. Thus, the rounded lateral edges 370 and 372 of the opening 366 are responsible for transferring torque between the end piece 360 and the torsion bar spring 380. Using the rounded lateral edges 370 and 372 of the opening 366 for torque transfer between the end piece 360 and the torsion bar spring 380, provides for uniform stress distribution over the width of the spring leaves 390 and prevents stress concentration at the edges of the outermost spring leaves 390. Both of these results enhance the life span of the spring leaves 390 and reduce the chance of the failure of the spring leaves 390 and consequently of the torsion bar spring 380. The distance between the top edge 374 and the bottom edge 376 of the opening 366 of the socket 364 is such that the top edge 374 and the bottom edge 376 of the opening 366 will not interfere with the movements of the ends 394 of the leaves 390 within the socket 364.

Figure 19:
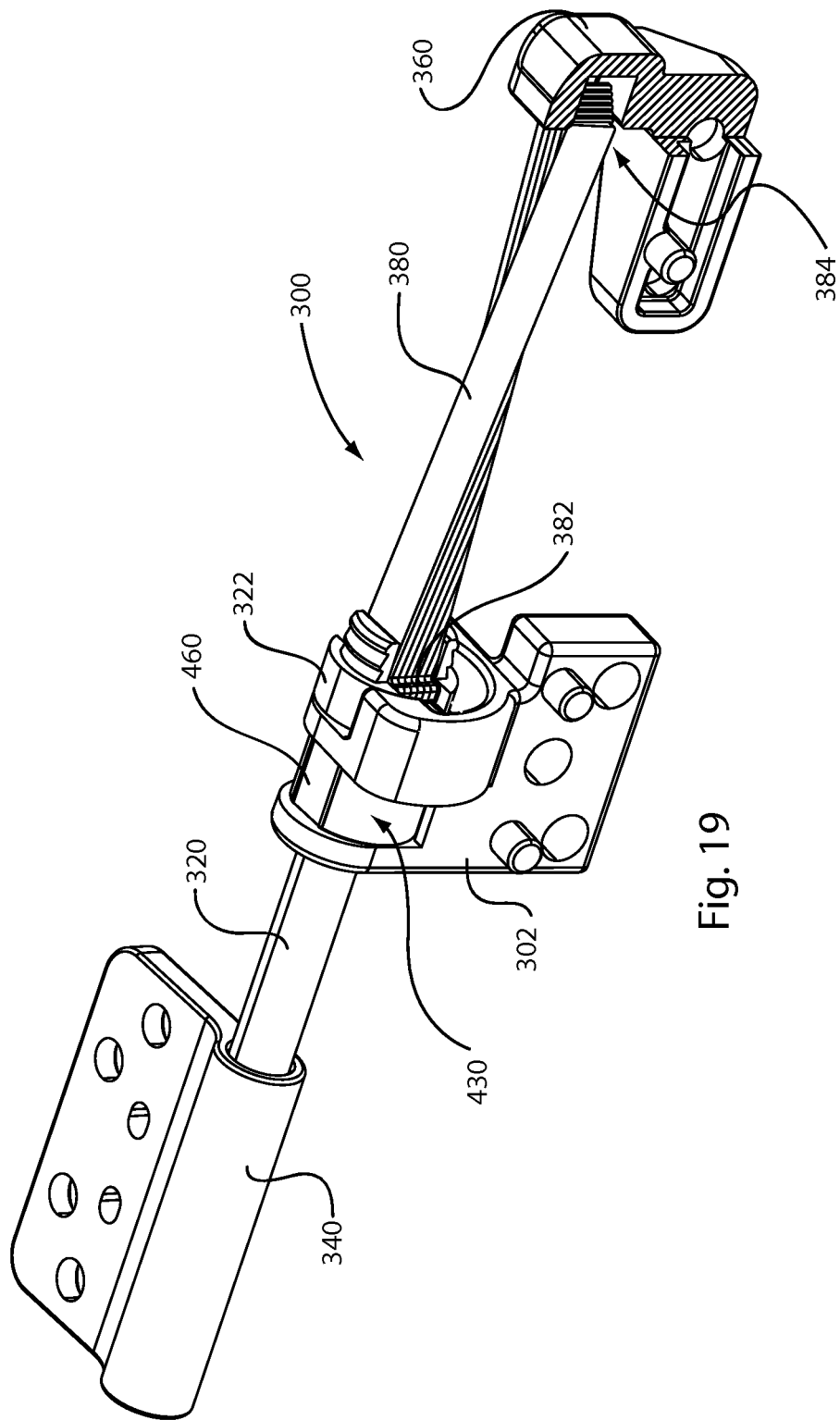
FIG. 19 is an isometric view of the hinge assembly of the present invention showing the hinge adaptor in an angular position relative to the base of the hinge assembly that corresponds to the fully twisted state of the hinge spring with the spring cover and cap removed and with the end piece of the hinge assembly sectioned to show the multilayered torsion bar spring in its fully twisted state.
Figure 22:
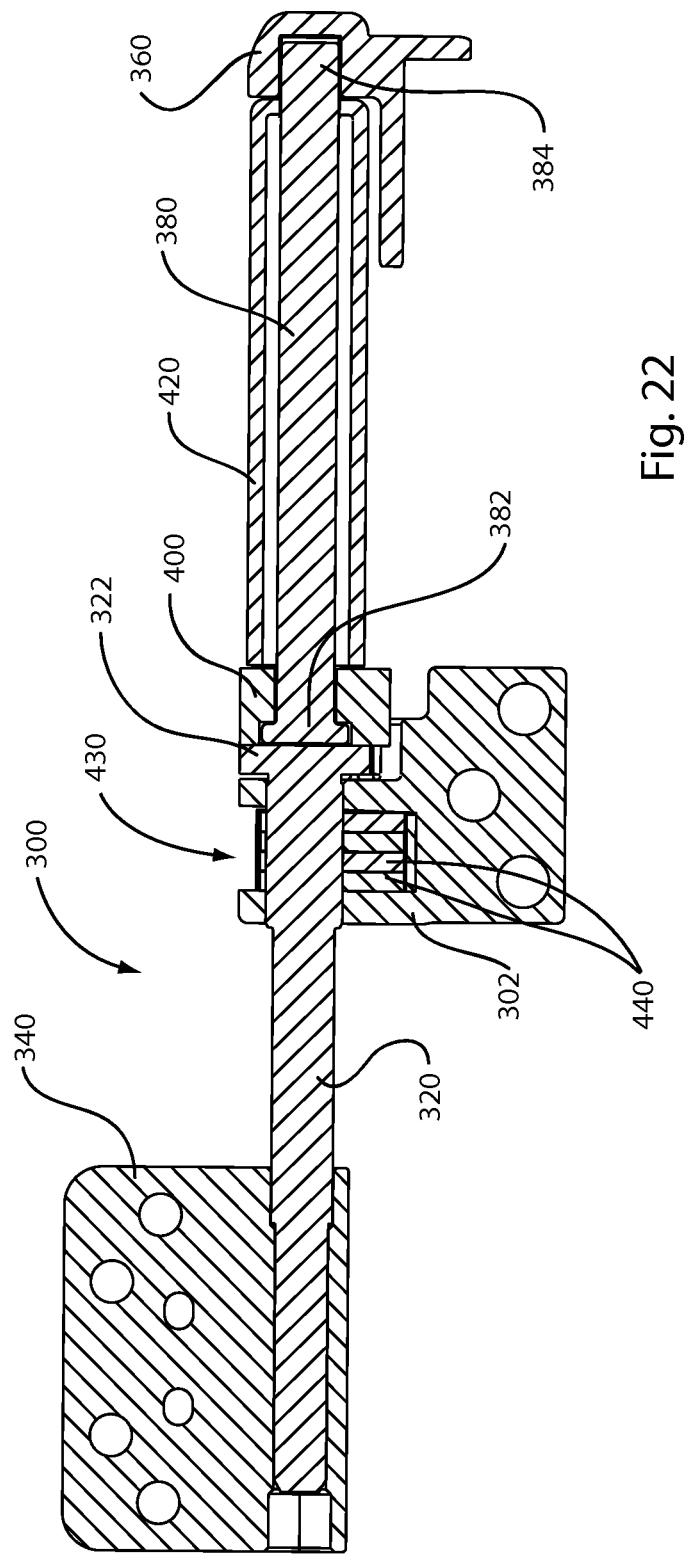
FIG. 22 is a cross-sectional view of the hinge assembly of the present invention taken along the line A-A in FIG. 26 to reveal its internal details.
Figure 35:
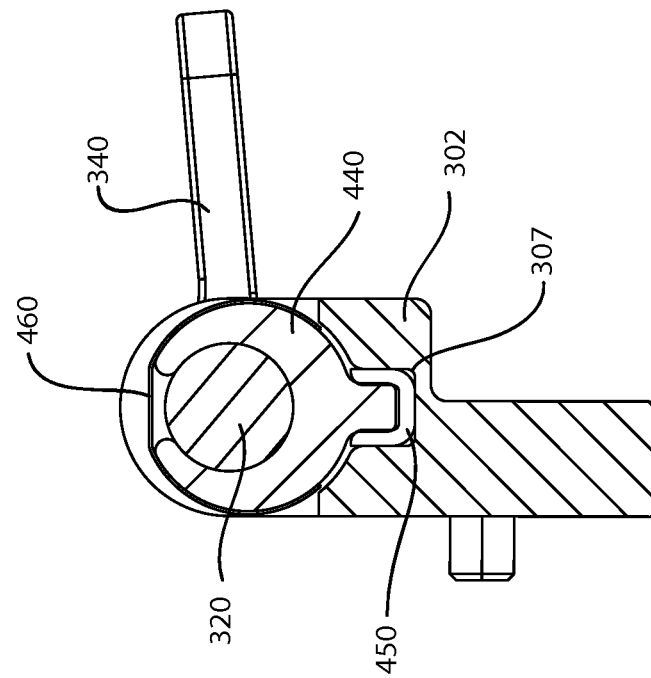
FIG. 35 is a cross-sectional view of the hinge assembly of the present invention taken along the line B-B in FIG. 27 showing the hinge adaptor in an angular position relative to the base of the hinge assembly that corresponds to the fully-twisted state of the hinge spring.
Figure 34:
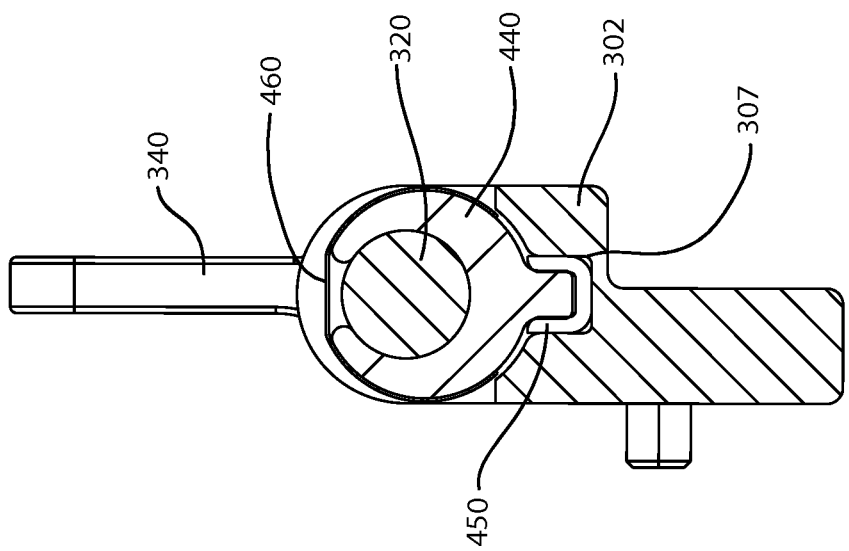
FIG. 34 is a cross-sectional view of the hinge assembly of the present invention taken along the line B-B in FIG. 27 showing the hinge adaptor in an angular position relative to the base of the hinge assembly that corresponds to the relaxed state of the hinge spring.
Figure 39:
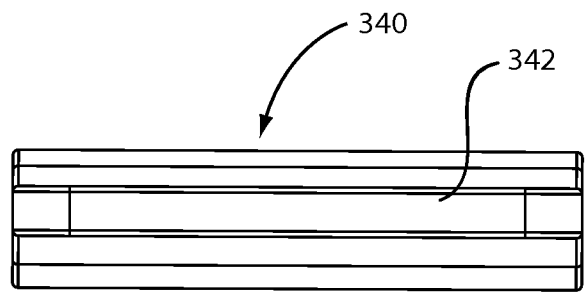
Figure 40:
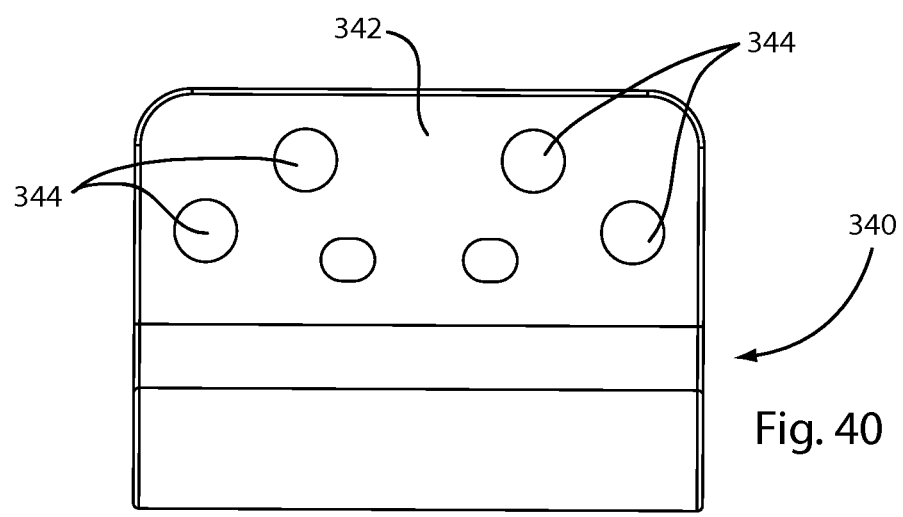
Figure 41:
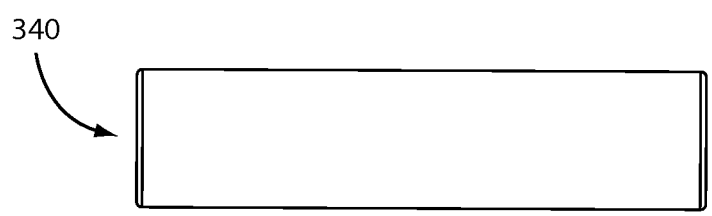
Figure 47:
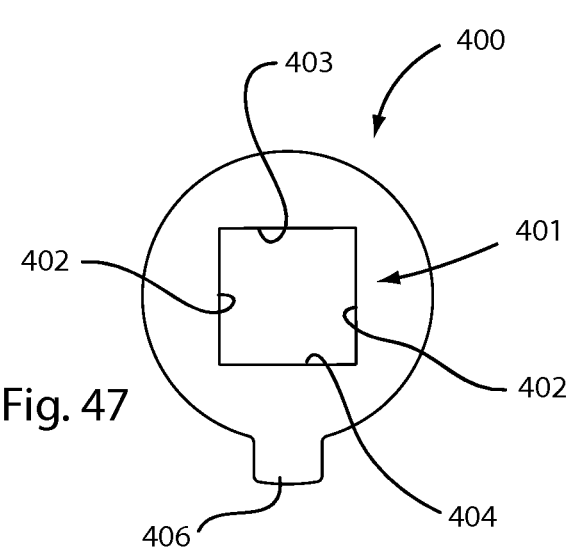
Figure 48:
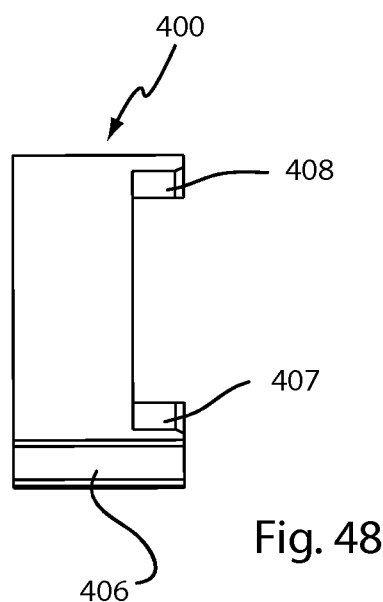
Figure 49:
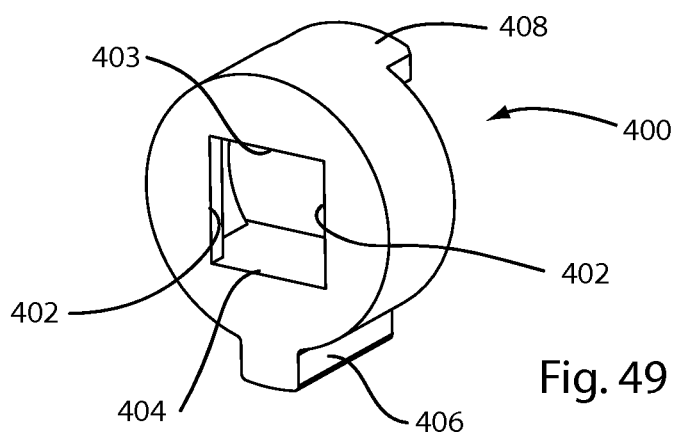
Figure 50:
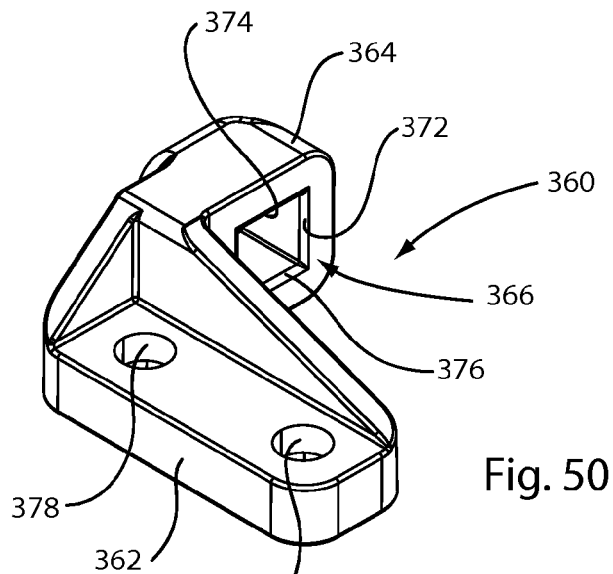
Figure 51:
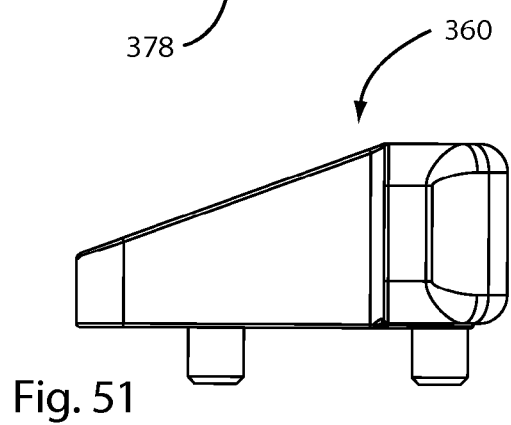
Figure 52:
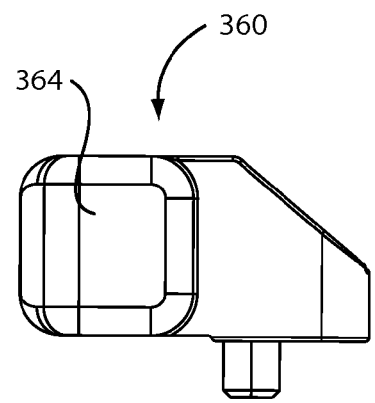
Figure 53:
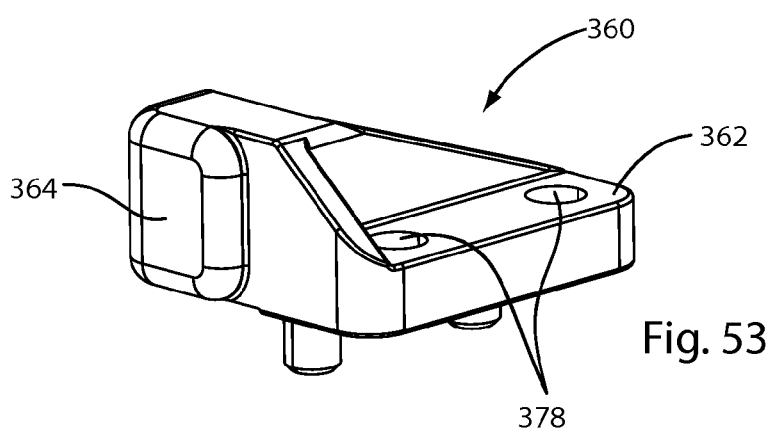
Figure 58:
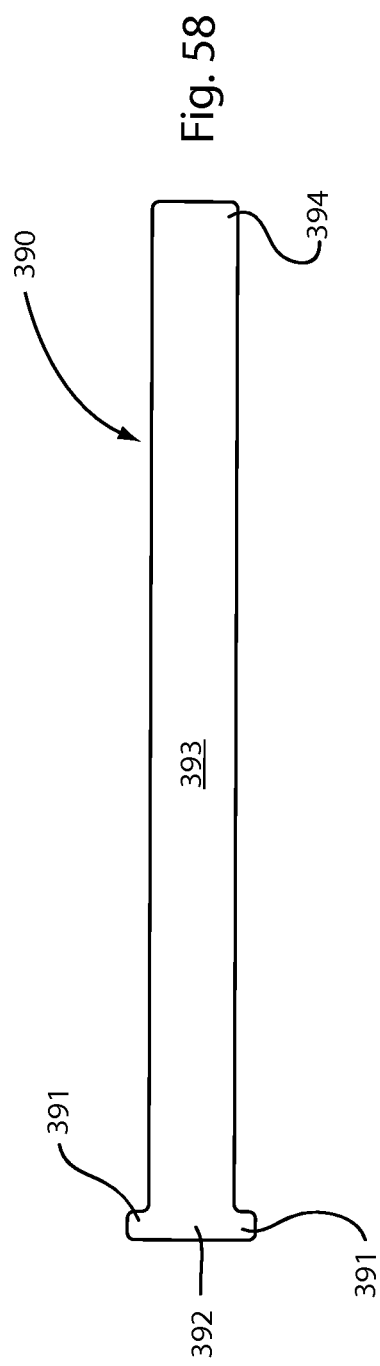
FIGS. 58-62 are views of one leaf of the multi-layer torsion bar spring of the hinge assembly of the present invention.
Figure 59:
Figure 60:
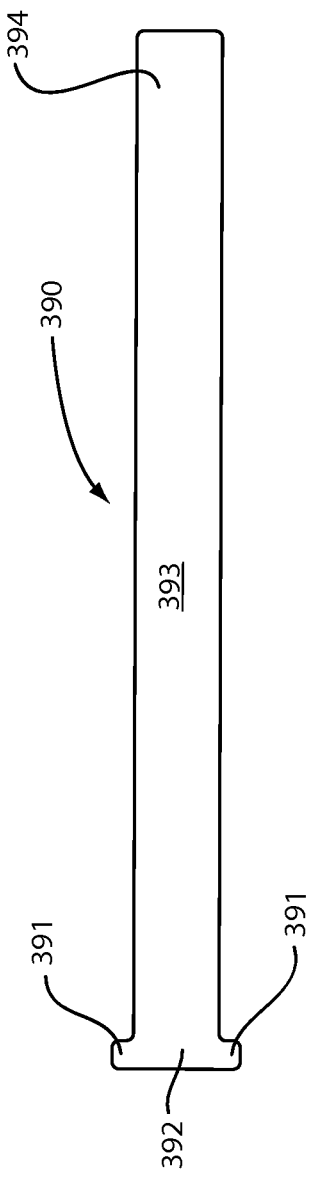
Figure 61:
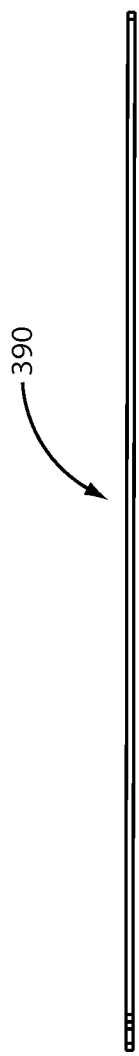
Figure 62:
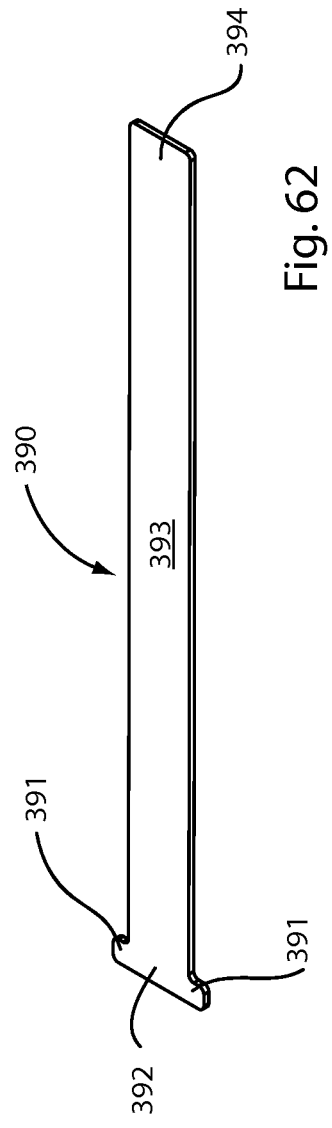
Figure 67:
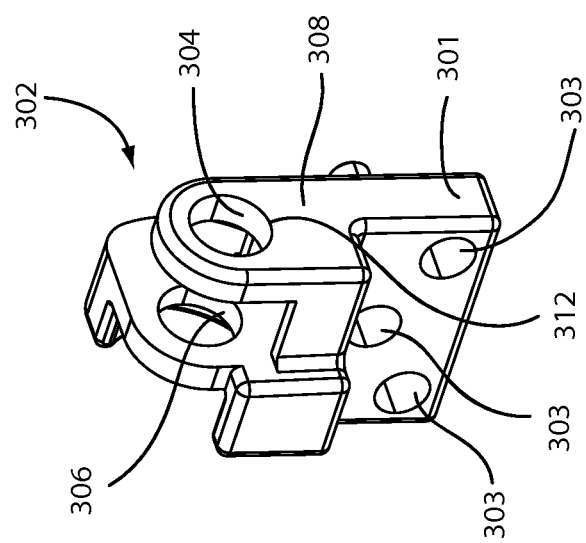
Figure 66:
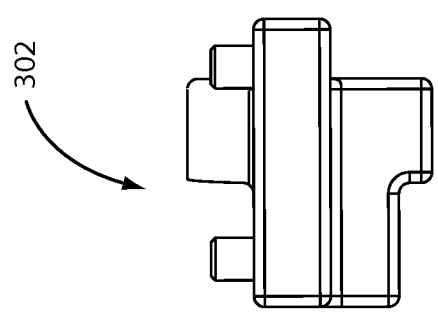
Figure 68:
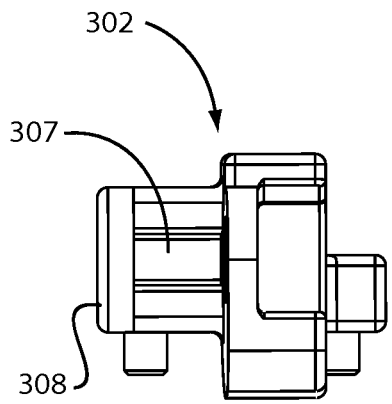
Figure 69:
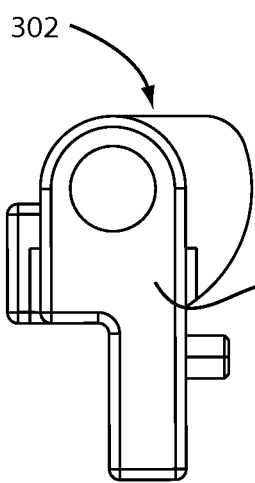
Figure 70:
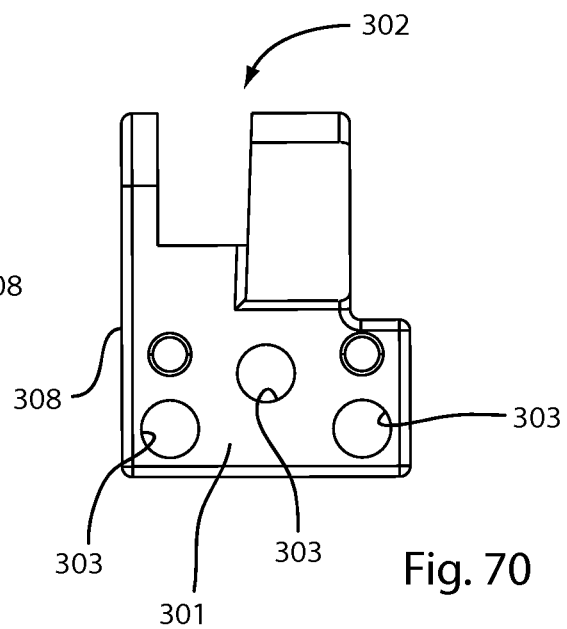
Figure 79:
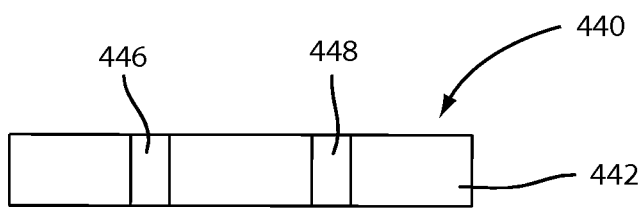
Figure 80:
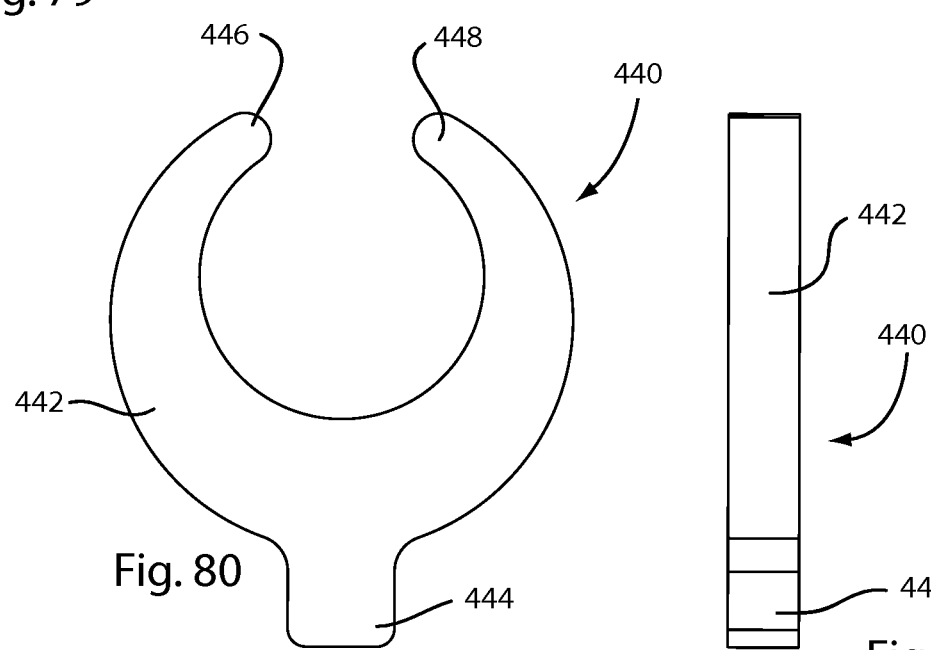
Figure 81:
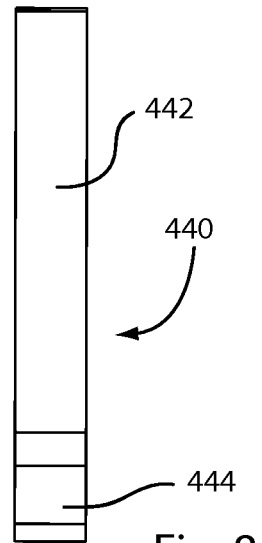
Figure 82:
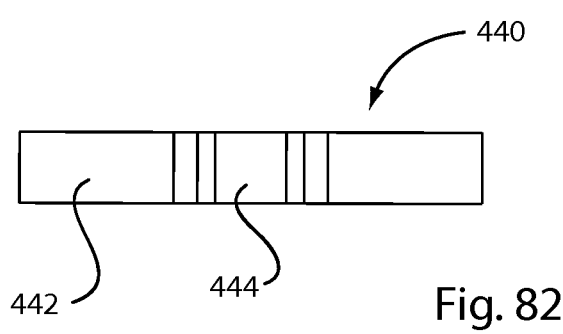
Figure 83:
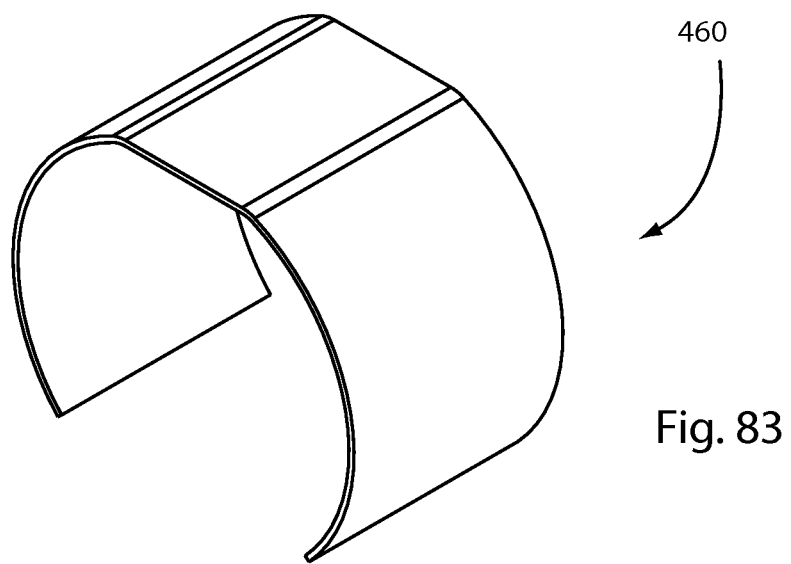
FIGS. 83-89 are views of the friction mechanism cover of the hinge assembly of the present invention.
Figure 84:
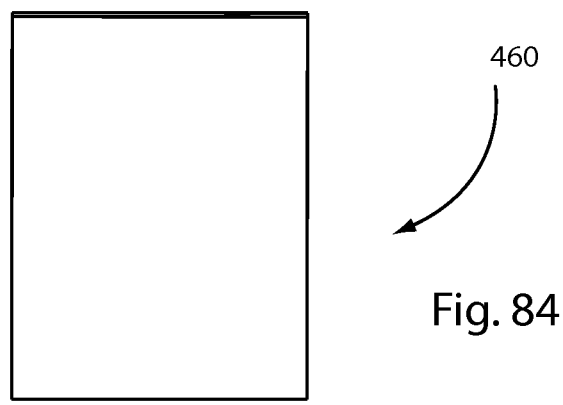
Figure 87:
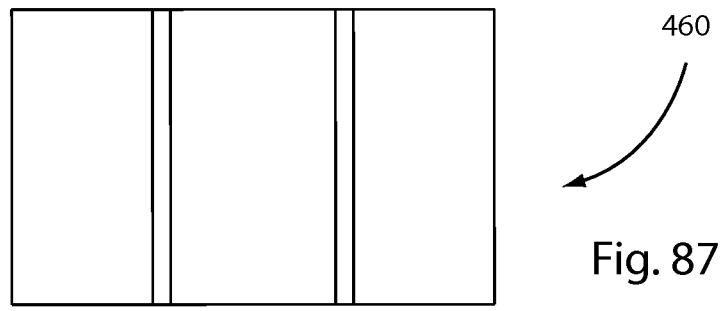
Figure 85:
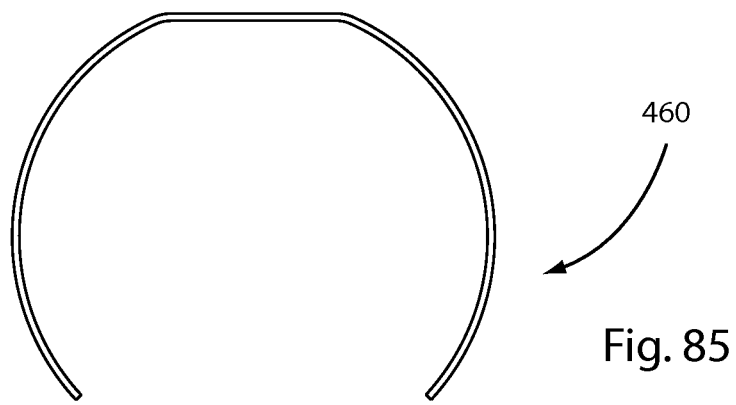
Figure 86:
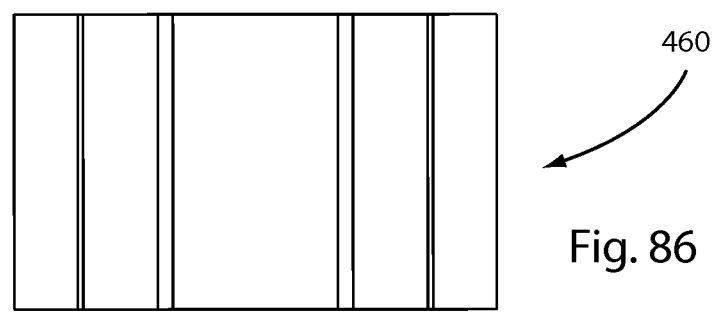
Figure 89:
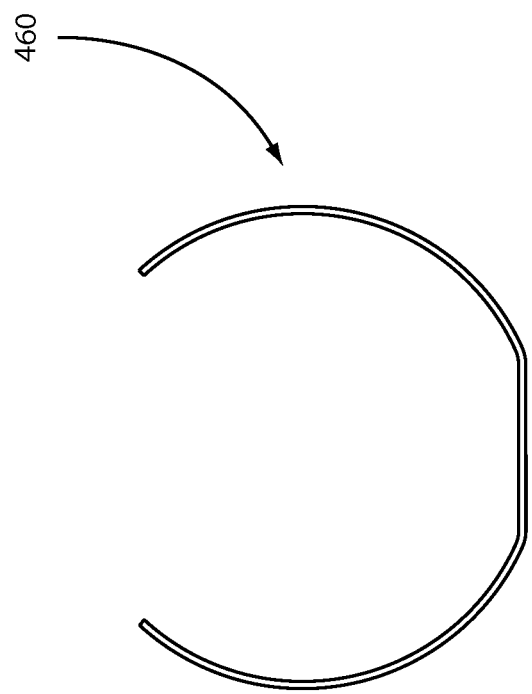
Figure 88:
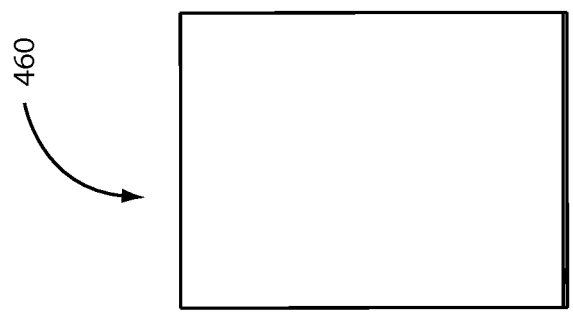
Figure 90:
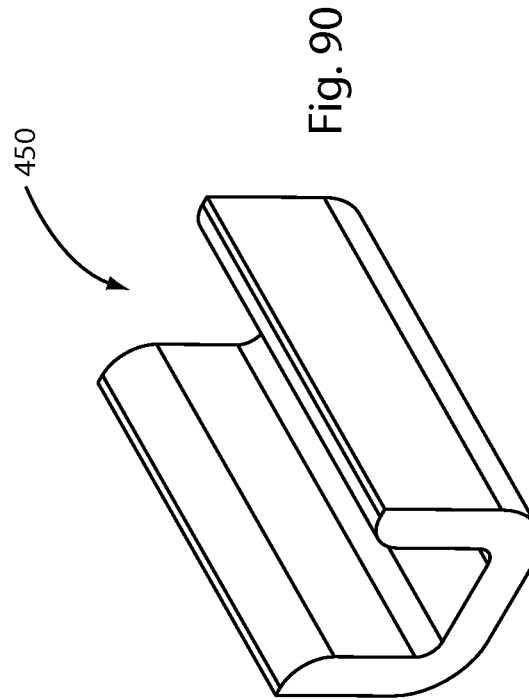
FIGS. 90-95 are views of the channel insert of the friction mechanism of the hinge assembly of the present invention.
Figure 92:
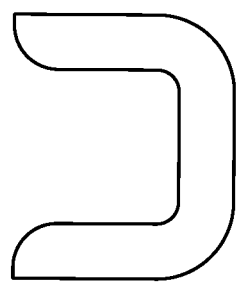
Figure 91:
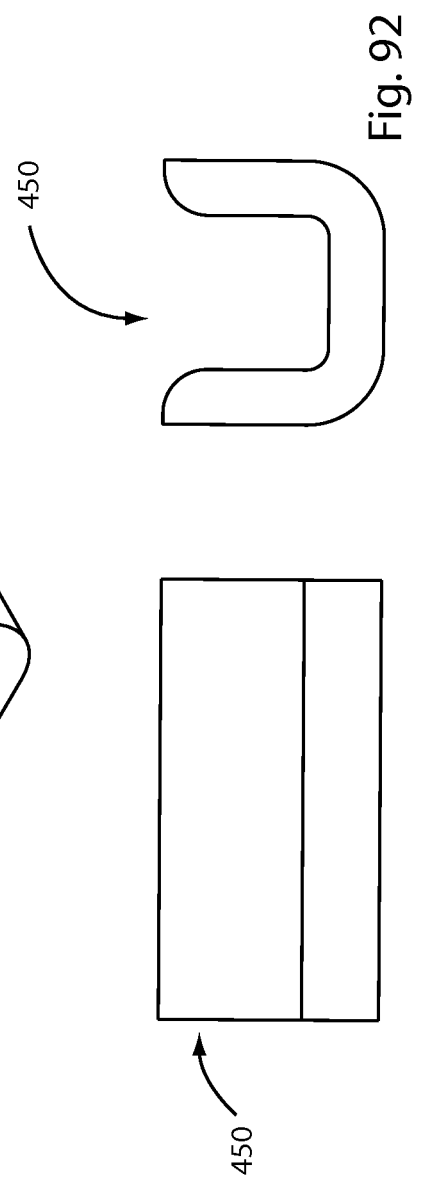
Figure 95:
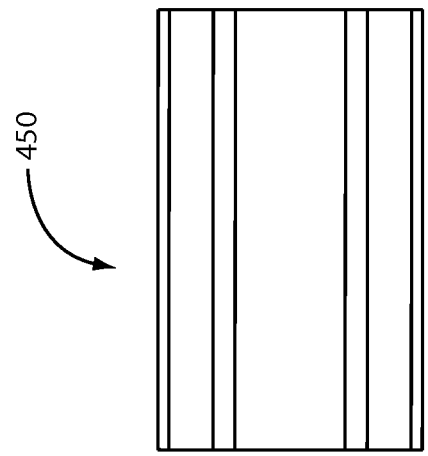
Figure 94:
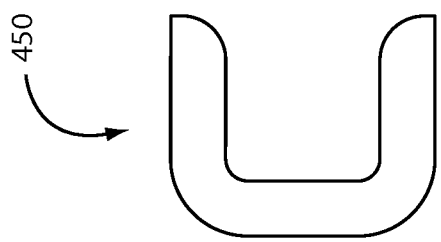
Figure 93:
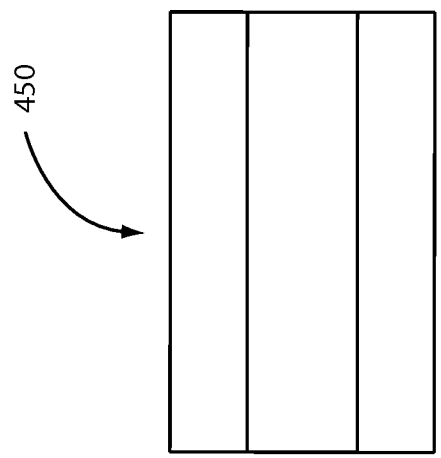
Figure 99:
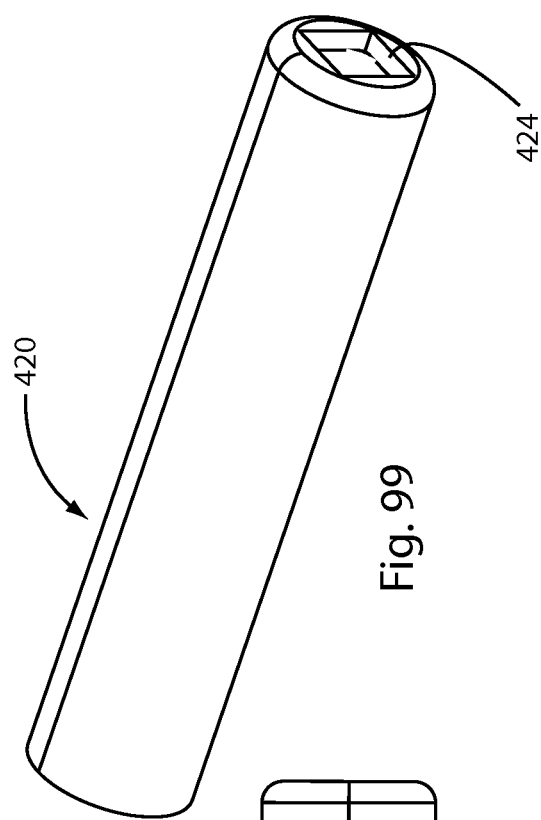
Figure 98:
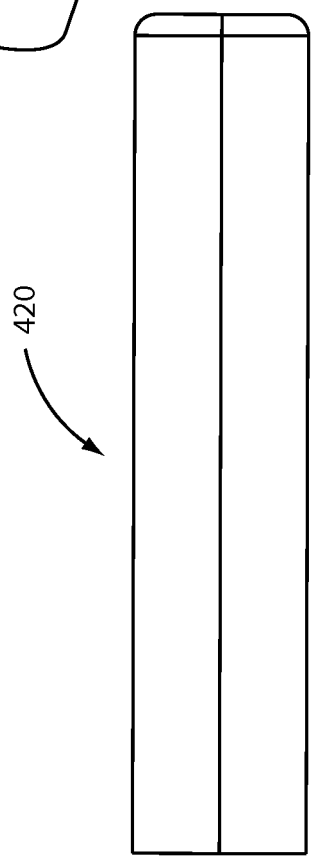

As the torsion bar spring 380 is twisted about its longitudinal axis to any given amount, the length per degree of twist of the helical path followed by the spring leaves 390 is longer for each leaf 390 the farther away it is from the center of the stack of leaves 390. Accordingly, the ends 394 of the hinge leaves 390 begin to pull away from the back wall 368 of the socket 364 such that the farther a hinge leaf 390 is from the middle of the stack of leaves the more its end 394 will be pulled away from the back wall 368. This result is illustrated in FIGS. 19 and 25. Constraining this axial movement of the ends 394 of the hinge leaves 390 would result in spring leaf breakage. Accordingly, at least one end of each of the plurality of leaves 390 must be free to move axially as the torsion bar spring 380 is twisted. The end 394 of each of the spring leaves 390 must be far enough into the socket opening 366 such that there is no possibility of it being pulled completely out of the socket opening 366 over the entire range of rotation of the shaft 320.

It is possible to provide a mirror image of the socket 364 in the shaft head portion 322 in place of the cap 400. In such an arrangement there would be no need for the spring leaves to have T-shaped heads; the spring leaves would simply be in the form of rectangular strips. No axial constraint would be applied to either end of the torsion bar spring, except that in the relaxed state all the spring leaves would be captive between the back walls of the socket in the end piece 360 and the socket in the shaft head portion 322.

As the torsion bar spring 380 is twisted, the leaf ends 394 on one side of the middle of the stack tend to move up or down toward either the top edge 374 or the bottom edge 376 depending upon and in the direction of rotation of the shaft 320, and the leaf ends 394 on the other side of the middle of the stack tend to move in the opposite direction but still in the same direction as the direction of rotation of the shaft 320. These movements must also be accommodated to avoid overstressing the spring leaves 390, which again could lead to spring leaf failure. Therefore, as was previously mentioned, the distance between the top edge 374 and the bottom edge 376 of the opening 366 of the socket 364 is such that the top edge 374 and the bottom edge 376 of the opening 366 will not interfere with the movements of the ends 394 of the leaves 390 within the socket 364.

The torsion bar cover 420 fits over the exposed portion of the torsion bar spring 380 between the end piece 360 and the hinge base 302. The torsion bar cover 420 is tubular with openings at both ends. The torsion bar cover 420 acts as a grease or lubricant container and does not restrict any of the movements and deflections of the spring leaves 390, but provides for lubrication of the individual spring leaves. The openings 422 and 424 at the ends of the torsion bar cover 420 seal against the hinge base 302 and the end piece 360, respectively. The torsion bar cover 420 provides continuous lubrication between the spring leaves 390 to ensure that the spring leaves can slide against one another as necessary to prevent overstressing and damage to the spring leaves. The torsion bar cover 420 has alignment feature on one side in the form of a rectangular or square opening 424 to assist in the assembly process of the torsion bar spring 380. It is possible for both openings 422 and 424 to be circular or any other shape large enough not to interfere with the twisting of the torsion bar spring 380.

With the hinge assembly 300 and its mirror image hinge assembly 500 installed in a laptop as shown, the neutral position of the adaptor 340 and of the laptop lid 204, which correspond to the relaxed state of the torsion bar spring 380, is between the fully open position of the laptop lid and the fully closed position of the laptop lid. In the illustrated example, the neutral position of the laptop lid is 32° from the fully open position and 85° from the closed position. The operation of the hinge assembly 300 will be described with the laptop lid initially in the neutral position. To close the laptop lid 204, enough force must initially be applied to overcome the friction torque due to the friction mechanism 430. As the laptop lid 204 rotates toward the closed position, the hinge shaft 320 is rotated causing the torsion bar spring 380 to be twisted. As the torsion bar spring 380 is twisted the force needed to continue the closing of the laptop lid 204 increases due to the resilience of the torsion bar spring 380, however, because it is mechanically advantageous for a user to push down than to pull up, due to the action of gravity on the lid and by bringing his or her body weight into play if necessary, this is not a disadvantage. Also, as the torsion bar spring 380 is twisted energy is stored in the deformation of the torsion bar spring 380. When the laptop lid 204 is in the closed position, a latch (not shown) releasably secures the laptop lid 204 in the closed position. To open the laptop lid a user operates the latch to release the laptop lid 204 for rotation to the open position. The laptop lid 204 automatically moves away from the closed position, without any effort from the user, as the torque exerted by the torsion bar spring 380 overcomes the frictional resistance or torque of the friction mechanism 430 until a point is reached, which is intermediate the neutral position and the closed position, where the torque exerted by the torsion bar spring 380 has dropped to equal the friction torque of the friction mechanism 430. At that point the laptop lid 204 stops moving, and the user can comfortably move the laptop lid 204 manually to any desired position between that point and the fully open position of the laptop lid 204 to suit his or her needs. Even though there will be some deformation of the torsion bar spring 380 at any position away from the neutral position, within the range of positions corresponding to the normal usage range of the laptop screen 206 the friction torque of the friction mechanism 430 will hold the laptop screen in the desired position.

The material used for the spring leaves 390 is steel such as stainless steel or spring steel or any steel with a spring steel temper. The shaft 320 is also made of steel. The end piece 360, the adapter 340, and the hinge base 302 can be made of a die cast metal such as aluminum or zinc or of a high impact plastic. For lower torque applications the spring leaves 390 can be made of a composite or a polymer material as long as it has the requisite elasticity.

Figure 103:
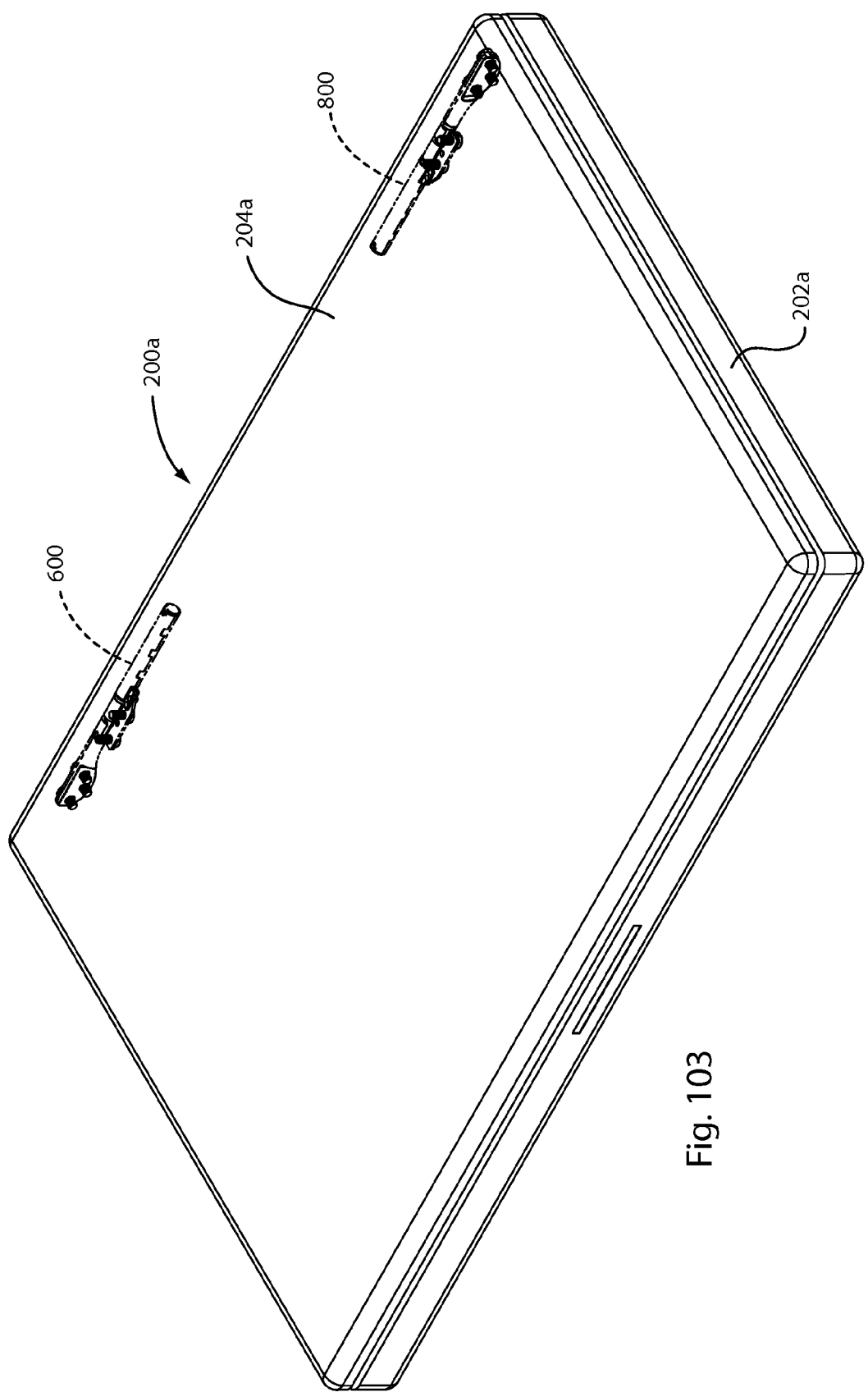
FIG. 103 is an environmental view of a second embodiment of the hinge assembly of the present invention showing the hinge assembly applied to a laptop computer with the lid of the laptop computer in the closed position.
Figure 104:
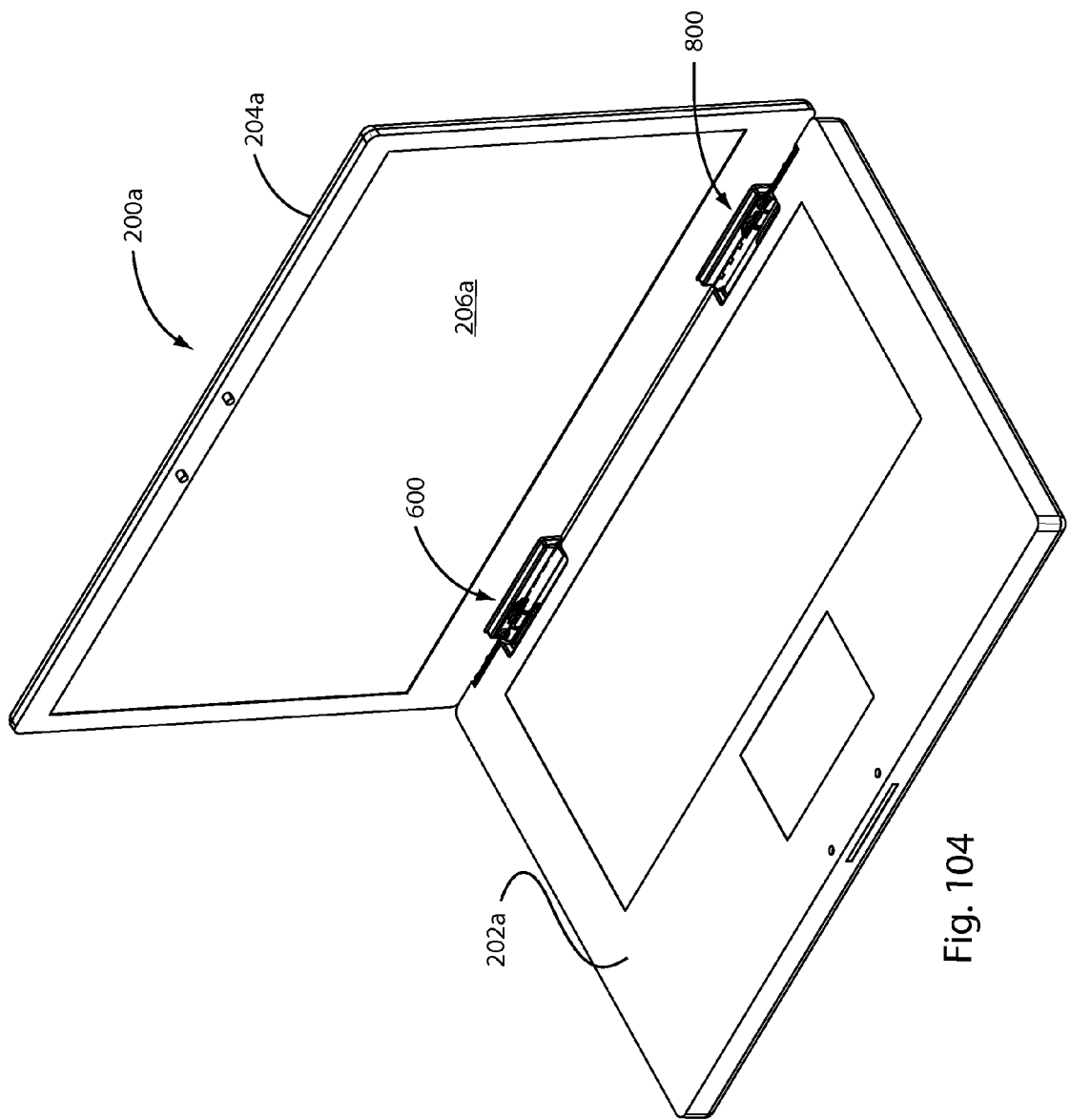
FIG. 104 is an environmental view of the second embodiment of the hinge assembly of the present invention showing the hinge assembly applied to a laptop computer with the lid of the laptop computer in an angular position relative to the base of the laptop computer that corresponds to the relaxed state of the hinge spring.
Figure 105:
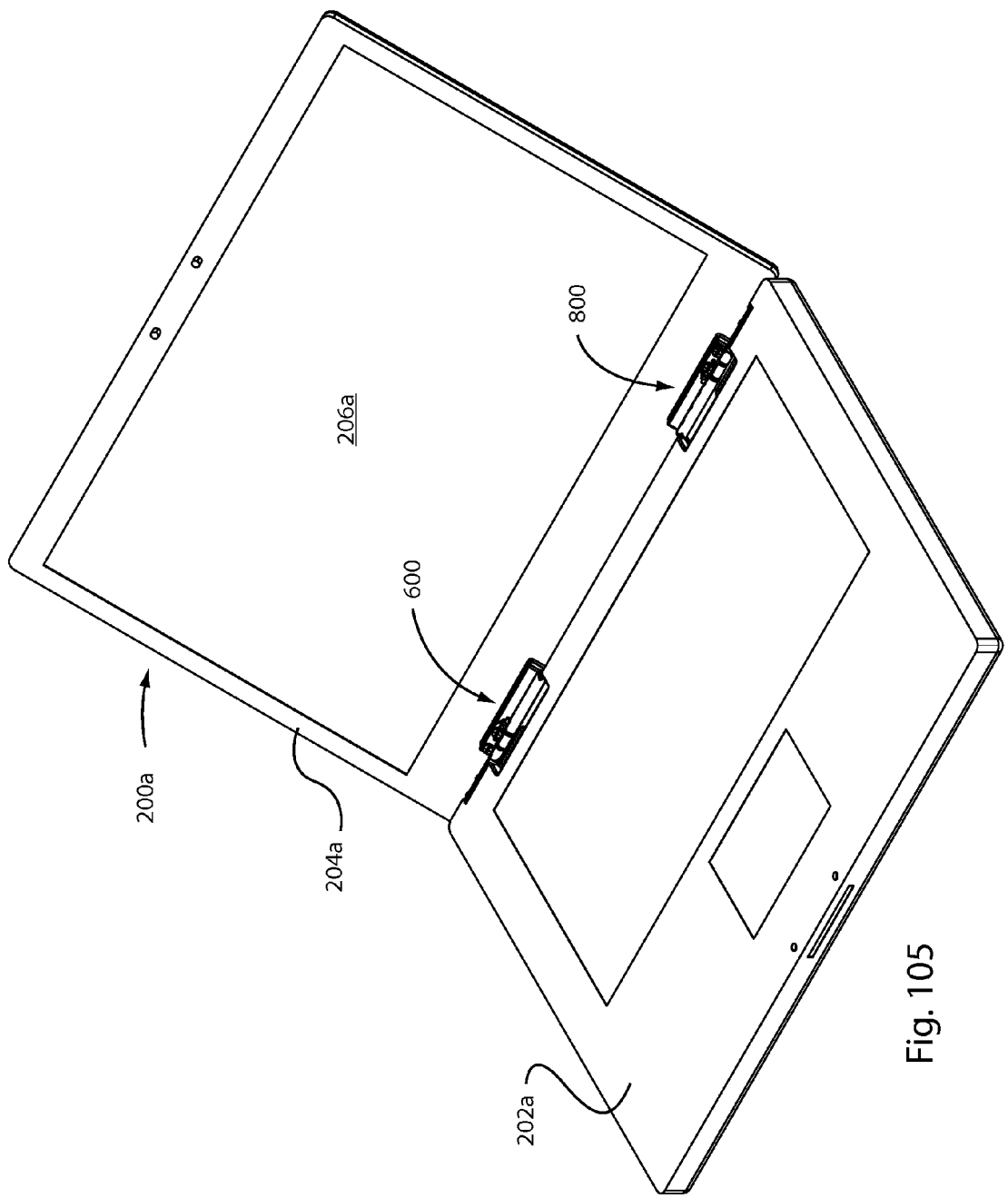
FIG. 105 is an environmental view of the second embodiment of the hinge assembly of the present invention showing the hinge assembly applied to a laptop computer with the lid of the laptop computer in an angular position relative to the base of the laptop computer that corresponds to the fully open state of the laptop computer lid.
Figure 106:
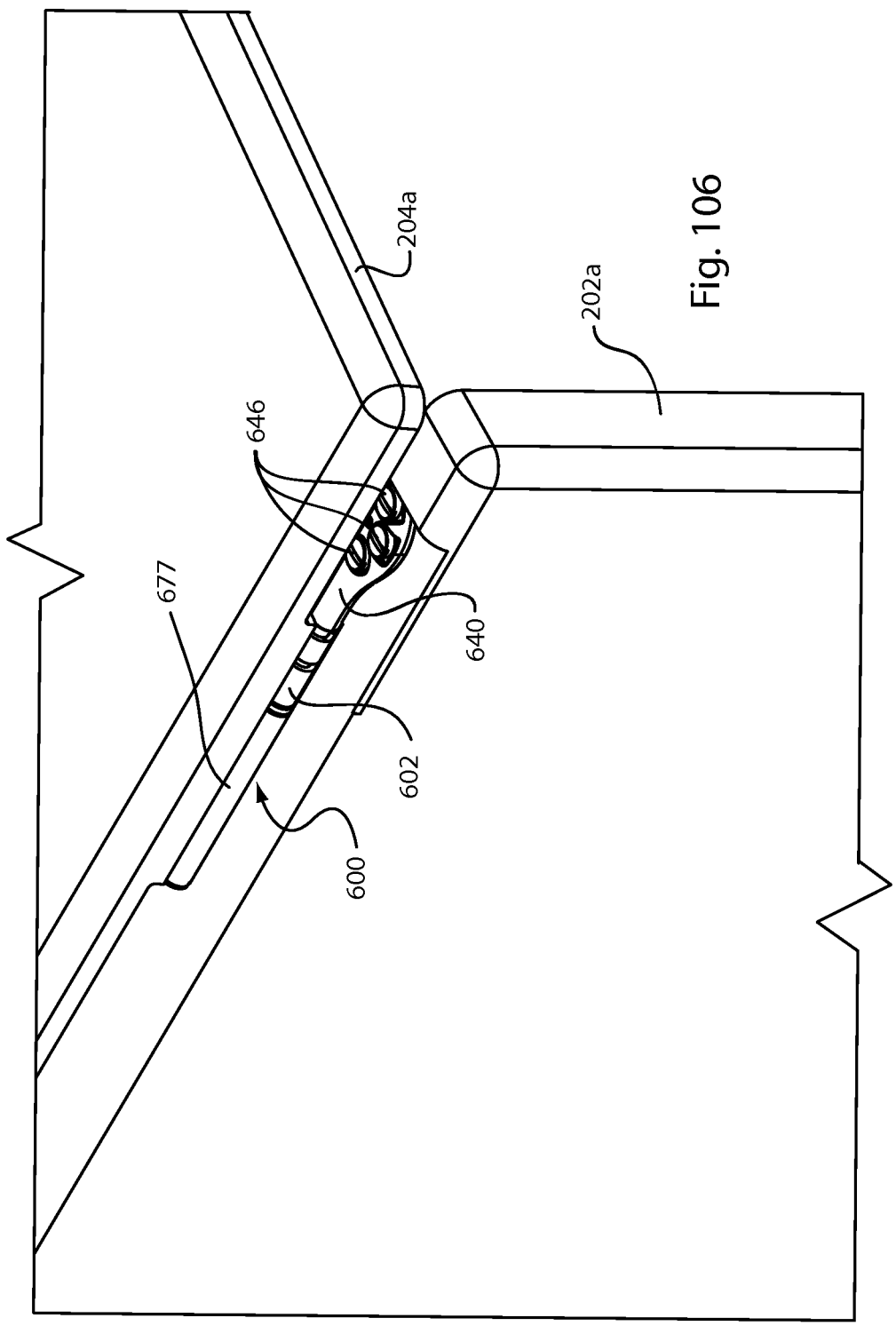
FIGS. 106-107 are fragmentary environmental views showing the installation of the second embodiment of the hinge assembly of the present invention to a laptop computer.
Figure 107:
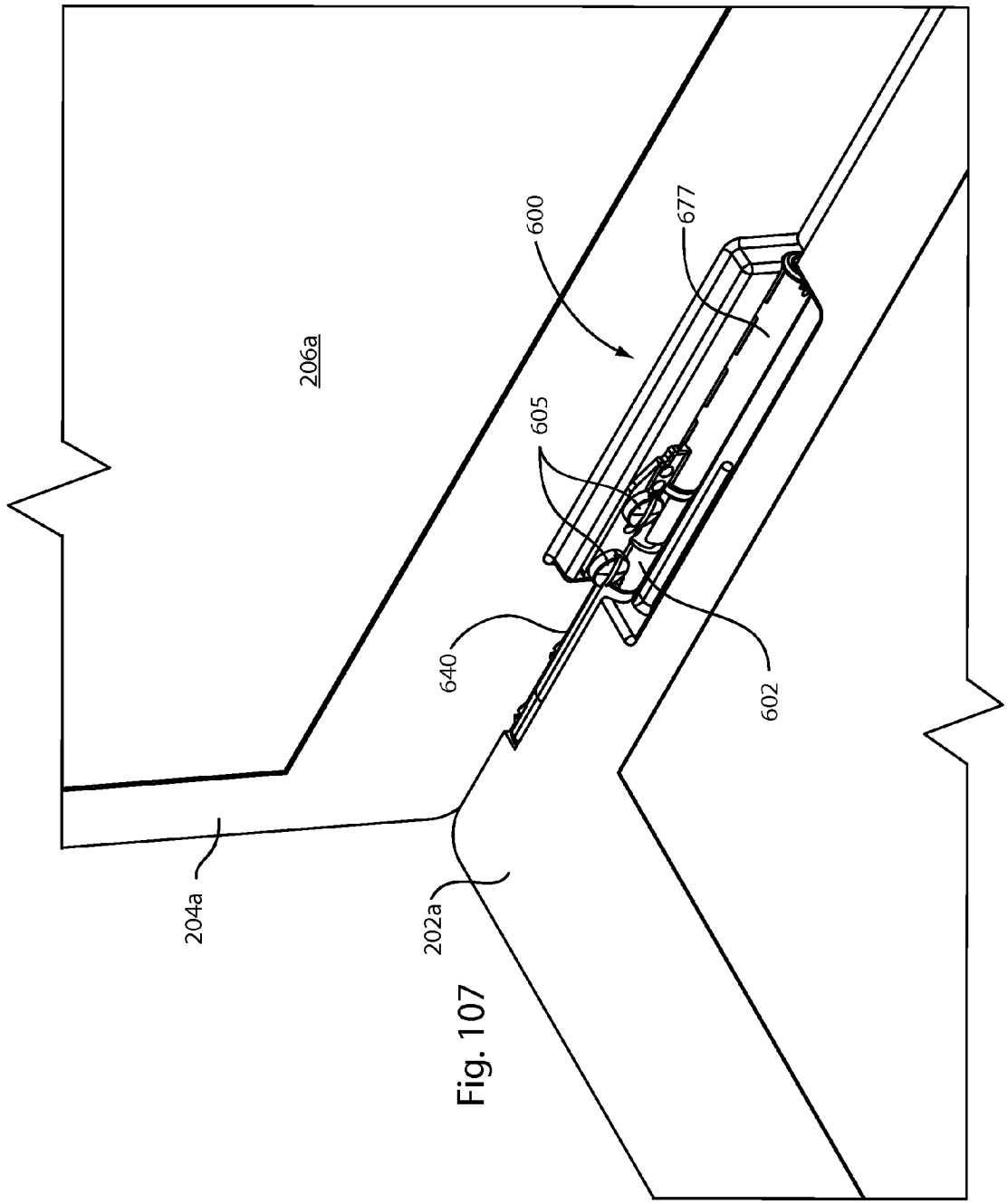
Figure 108:
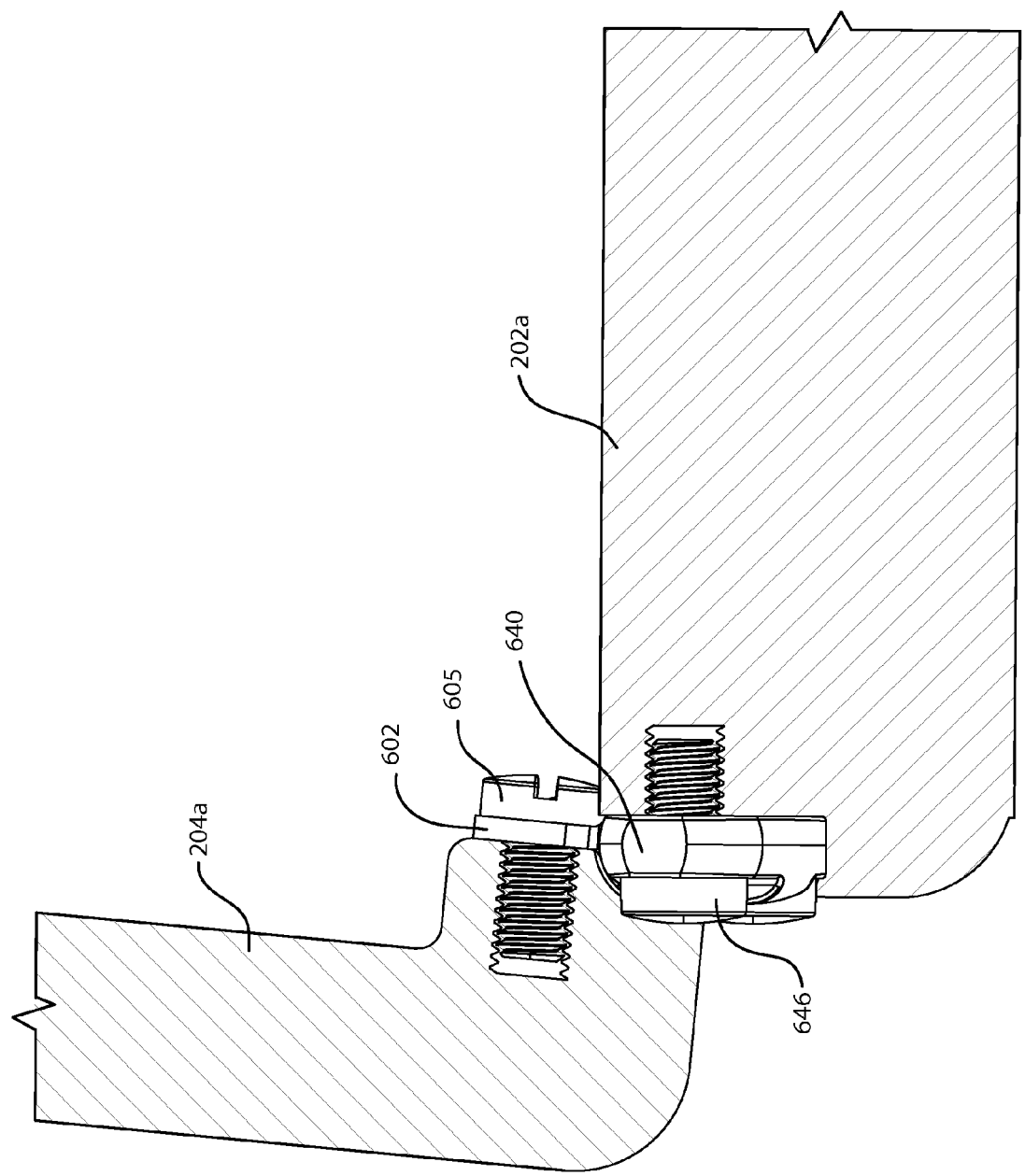
FIG. 108 is a fragmentary environmental view with a section taken through the laptop computer to show the installation of the second embodiment of the hinge assembly of the present invention to the laptop computer.
Figure 111:
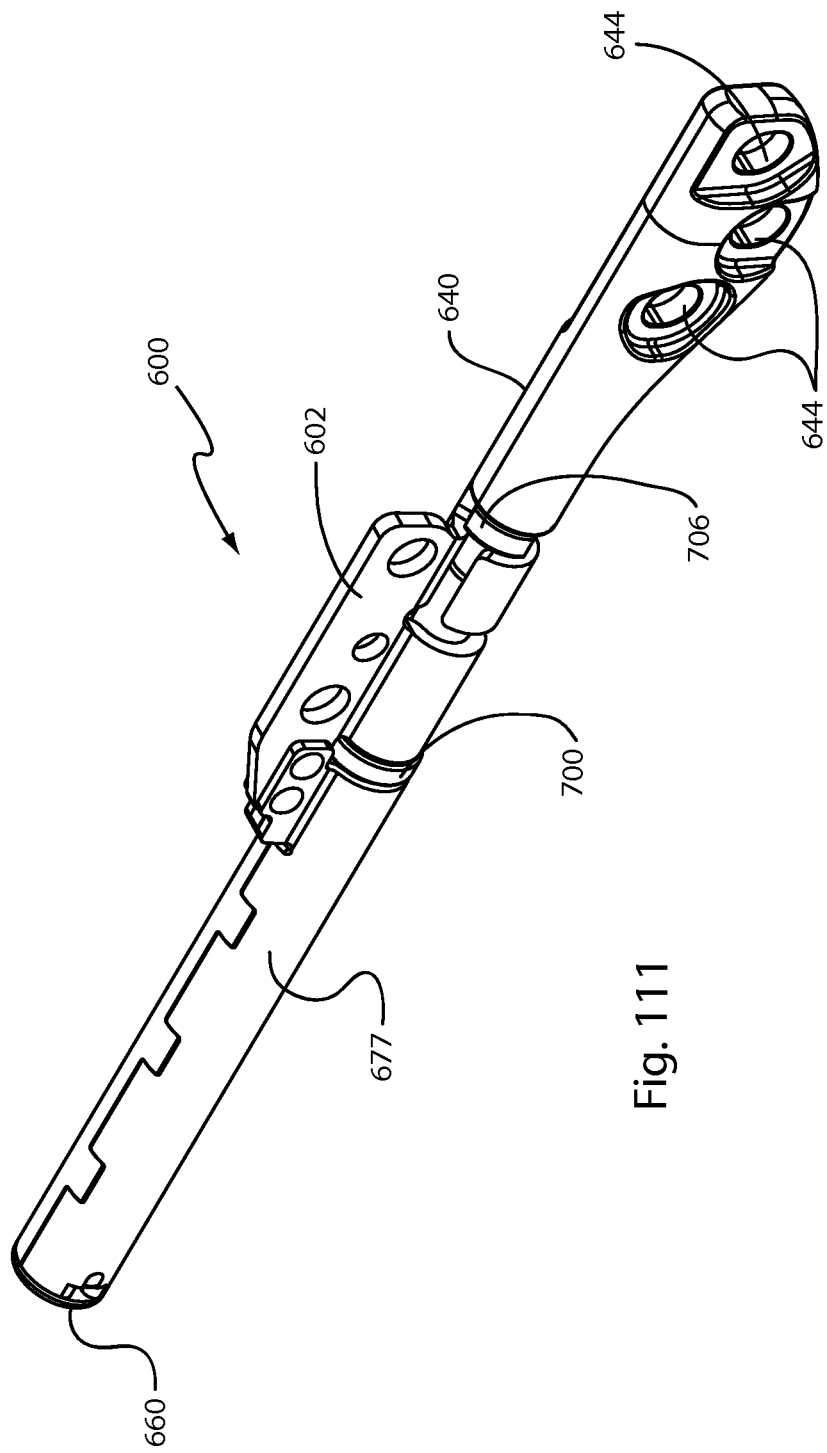
Figure 115:
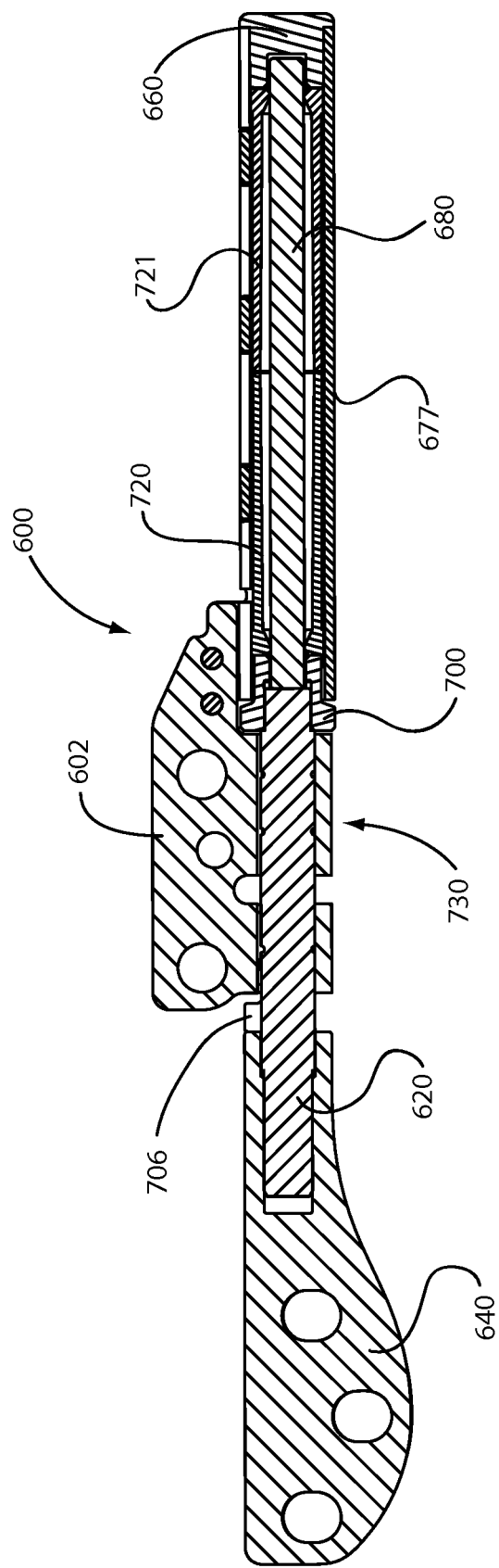
Figure 116:
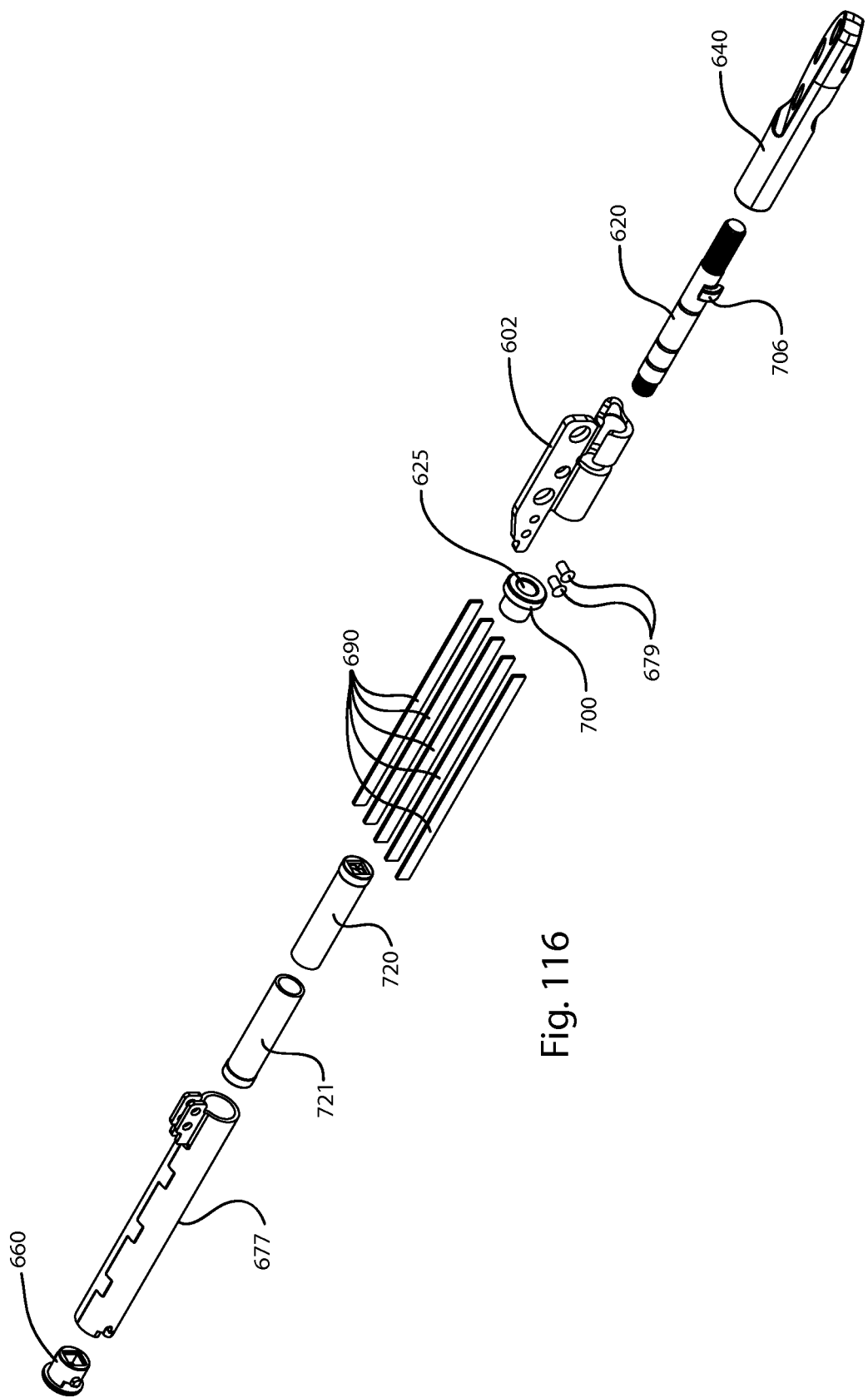
FIGS. 116-117 are exploded views of the second embodiment of the hinge assembly of the present invention.
Figure 117:
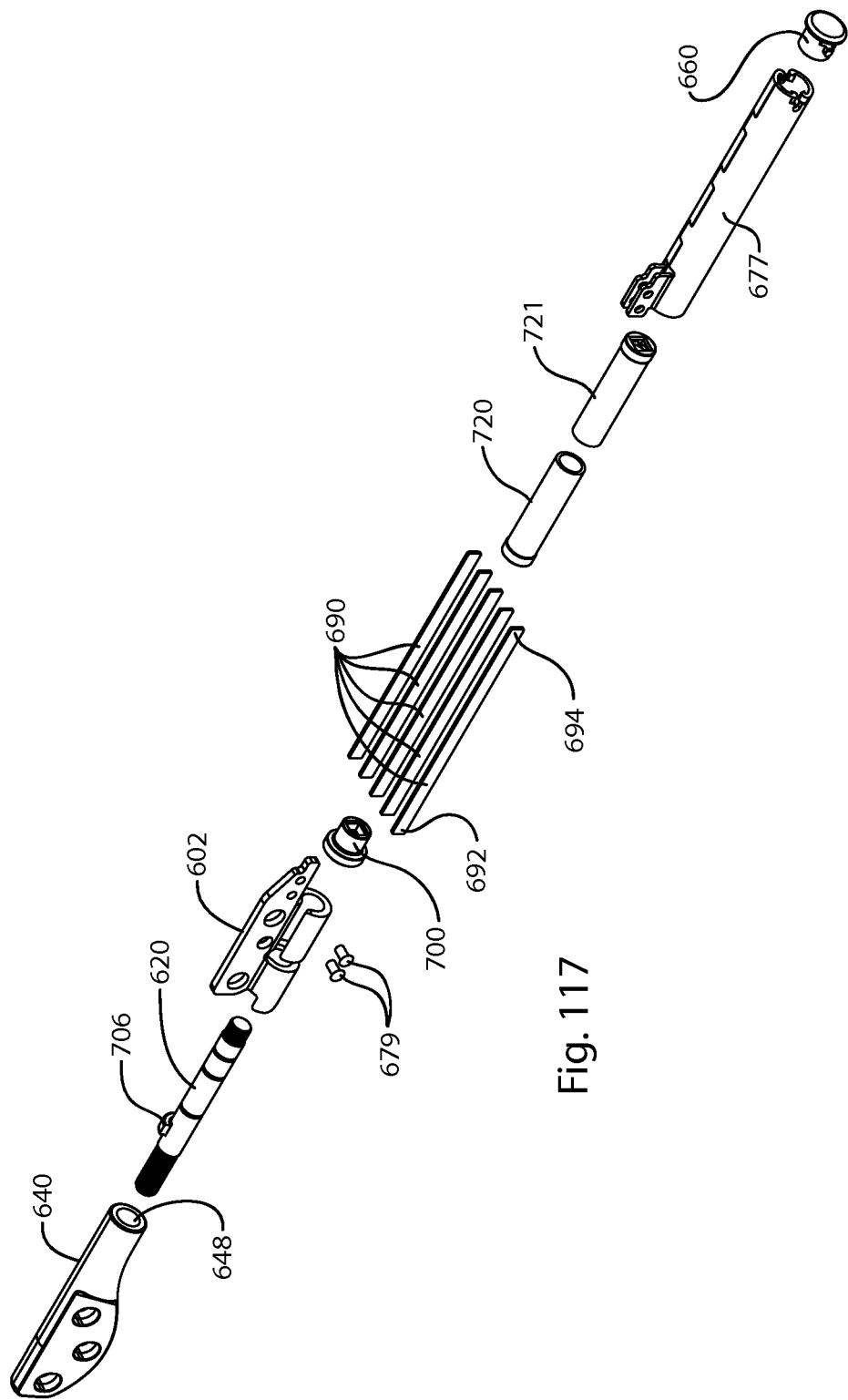
Figure 194:
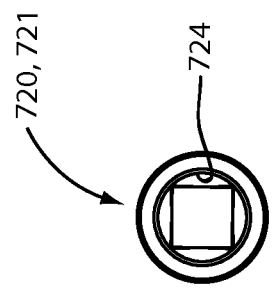
Figure 191:
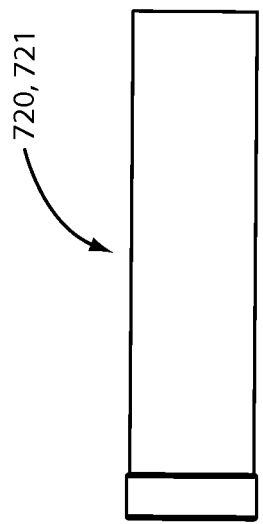
Figure 192:
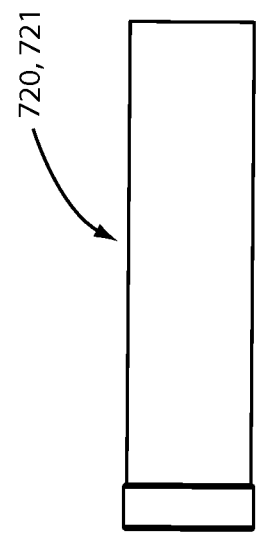
Figure 193:
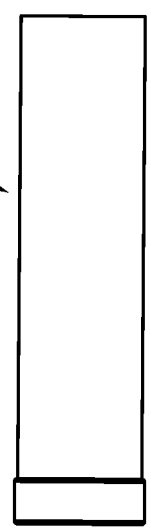

Referring to FIGS. 103-194, a second illustrative embodiment of the hinge assembly 600, 800 in accordance with the present invention can be seen. Each of the hinge assemblies 600, 800 provides for rotationally attaching a first member to a second member to allow rotational movement of the first member relative to the second member between a closed position and an open position. Referring to FIGS. 103-105, two hinge assemblies 600 and 800 made in accordance with the present invention are shown being used to rotationally attach the lid 204a of a laptop computer 200a to the base 202a of the laptop computer 200a. The laptop lid 204a typically houses the laptop screen 206a and its angular position relative to the laptop base 202a should be adjustable within a range of angular positions suitable for people of a variety of sizes to properly view the laptop screen 206a.

The hinge assembly 600 is a left hinge assembly and the hinge assembly 800 is a right hinge assembly. The right hinge assembly 800 is a mirror image of the hinge assembly 600 about a plane perpendicular to longitudinal axes of the shafts of each of the hinge assemblies and positioned halfway between the two hinge assemblies. Accordingly, only the hinge assembly 600 is described in detail. The laptop lid 204a typically is releasably secured in the closed position relative to the laptop base 202a by a latch (not shown) of some sort. The latch can be operated by a user to release or free the laptop lid 204a for rotational movement to the open position relative to the laptop base 202a.

The hinge assembly 600 can be used to rotationally attach a first member to a second member to allow rotational movement of the first member relative to the second member between a closed position and an open position. In the illustrated example, the first member is the laptop base 202a and the second member is the laptop lid 204a. The hinge assembly 600 includes an elongated shaft 620, an adaptor 640, a hinge base 602, a friction mechanism 730, an end piece 660, a torsion bar spring 680, a first cap 700, and a shell 677.

Referring to FIGS. 103-132 and 171-178, the elongated shaft 620 has at least a first end portion 626, a second or intermediate portion 624 and a second end portion 622. The first end portion 626 of the shaft 620 is provided with a plurality of elongated teeth 628 of triangular cross section evenly distributed about the circumference of the first end portion 626 of the shaft 620. Each of the plurality of elongated teeth 628 extends for at least the majority of the length of the first end portion 626 of the shaft 620. The teeth 628 are also known in the art as splines. In the illustrated example, the second or intermediate portion 624 of the shaft 620 is of larger diameter compared to the first end portion 626. The second end portion 622 of the shaft 620 is also provided with a plurality of teeth or splines 623 that are similar in configuration to the teeth 628. The intermediate portion 624 of the shaft 620 is of a larger diameter as compared to the second end portion 622. The second end portion 622 of the shaft 620 is inserted into a bore 625 of the first cap 700 to fix the first cap 700 to the second end portion 622 of the shaft 620 such that there can be no relative movement between the second end portion 622 of the shaft 620 and the first cap 700. The teeth 623 on the shaft's second end portion 622 assist in rotationally coupling the shaft 620 to the first cap 700 by providing a stronger grip between the internal surface of the bore 625 of the first cap 700 and the exterior surface of the second end portion 622 of the shaft 620. This is due to the teeth 623 providing a more positive grip between the internal surface of the bore 625 of the first cap 700 and the exterior surface of the second end portion 622 of the shaft 620 when the second end portion 622 of the shaft 620 is press fitted to the bore 625 of the first cap 700. Thus, the bore 625 of the first cap 700 and the toothed exterior surface of the second end portion 622 of the shaft 620 form the means for securely fastening the shaft 620 to the first cap 700 and rotationally coupling the shaft 620 and the first cap 700 together in the illustrated embodiment. (See also FIGS. 143-150)

The first cap 700 also has a front opening 630 that has side edges 632 and 634, top edge 633 and bottom edge 635. The front opening 630 is rectangular.

The adaptor 640 is attached to the shaft 620 at the first end portion 626 of the shaft 620. The adaptor 640 is attached to the first end portion 626 of the shaft 620 such that the adaptor 640 is constrained to rotate with the shaft 620 as a unit. The adaptor 640 is adapted for fixed attachment to the first member, the laptop base 202a in the illustrated example, so as to move with the first member as a unit. Referring to FIGS. 103-135 and 136-142, the adaptor 640 has a body portion 642 that is provided with a plurality of holes 644 to allow the adapter 640 to be securely fastened to the first member, for example the laptop base 202a, by screws 646.

The adaptor 640 has a bore 648 provided on one side of the body portion 642. The bore 648 of the adapter 640 is designed to receive the first end portion 626 of the shaft 620 in a press fit or interference fit such that the shaft 620 is securely fastened to the adaptor 640 and the shaft 620 and the adaptor 640 are rotationally coupled to rotate together as a unit. The teeth 628 on the shaft's first end portion 626 assist in rotationally coupling the shaft 620 to the adaptor 640 by providing a stronger grip between the internal surface of the bore 648 of the adapter 640 and the exterior surface of the first end portion 626 of the shaft 620. Thus, the bore 648 of the adapter 640 and the toothed exterior surface of the first end portion 626 of the shaft 620 form the means for securely fastening the shaft 620 to the adaptor 640 and rotationally coupling the shaft 620 and the adaptor 640 together in the illustrated embodiment.

Many other suitable means may also be employed for securely fastening the shaft 620 to the adaptor 640 and the first cap 700 and rotationally coupling the shaft 620 to the adaptor 640 and to the first cap 700. These include the same means enumerated for the attachment of the shaft 320 to the adaptor 340. Of course, means where the bores 648, 625, and 348 have teeth that mate with the teeth 628, 623, and 328, respectively, is part of this list.

The hinge base 602 is adapted for fixed attachment to the second member, the laptop lid 204a in this example, so as to move with the second member as a unit. The hinge base 602 has at least one bearing surface 604, 606 that rotationally supports the shaft 620 such that, when the adaptor 640 is attached to the first member and the hinge base 602 is attached to the second member, the first member is rotationally attached to the second member such that the first member can rotationally move relative to the second member between a closed position and an open position. In the illustrated example, the first and second members are the laptop base 202a and the laptop lid 204a, respectively. The bearing surface of the hinge base 602 supports a portion of the second or intermediate portion 624 of the shaft 620 to provide for rotational support of the shaft 620 by the hinge base 602.

Referring to FIGS. 103-135 and 163-170, in the illustrated example, the hinge base 602 has two bearing surfaces 604 and 606. The hinge base 602 has one side 608 that is closest to the adaptor 640 and one side 610 that is farthest from the adaptor 640. The side 608 has an opening 612 that allows the shaft 620 to extend outward from the hinge base 602 to the adapter 640. The side 610 has an opening 614 that allows the shaft 620 to extend outward from the hinge base 602 toward the torsion bar spring 680 where it can engage the first cap 700. A stop projection 616 is provided along a portion of the rim of the opening 612. The stop projection 616 has end walls 618 and 619. The hinge base 602 has a flange 601 that has a plurality of holes 603 to allow the hinge base 602 to be securely fastened to the second member, for example the laptop lid 204a, by screws 605.

Referring to FIGS. 103-135 and 163-170, the hinge assembly 600 is provided with a friction mechanism 730 for frictionally resisting rotational motion of the shaft 620 relative to the hinge base 602. In this example, the friction mechanism 730 is integrated into the material of the hinge base 602. The friction mechanism 730 is formed by at least one band 740, 742 that is attached at one end to the flange 601. The band 740, 742 wraps around at least part of the intermediate portion 624 of the shaft 620 and the band 740, 742 terminates in a free end that is spaced apart from the band's attachment to the flange 601 to define a C-shaped profile for the band 740, 742. In the illustrated example, two bands 740 and 742 are provided that wrap around the intermediate portion 624 of the shaft 620 in opposite directions. The bands 740 and 742 define the bearing surfaces 604 and 606, respectively. The bands 740 and 742 also define the friction elements of the friction mechanism 730 by frictionally gripping the intermediate portion 624 of the shaft 620 to provide a friction torque that acts as a resistance to relative rotation between the shaft 620 and the hinge base 602. The inner radius of the C-shaped bands 740 and 742 is originally smaller than the radius of the outer surface of the second portion 624 of the shaft 620 so that each of the C-shaped bands 740 and 742 expands when placed around the second portion 624 of the shaft 620. The resilience of the C-shaped bands 740 and 742 causes the C-shaped bands 740 and 742 to exert a gripping force on the second portion 624 of the shaft 620.

Because the friction elements 740, 742 are attached at one end to the flange 601, the friction elements 740, 742 are prevented from rotating relative to the hinge base 602. The gripping force exerted by the C-shaped bands or friction elements 740, 742 on the shaft 620 generates a friction torque that resists rotational motion of the shaft 620 relative to the hinge base 602. The friction torque generated by the friction elements 740, 742 can be matched to any specified value for a particular application by changing the geometry, number and material of the friction elements 740, 742.

The end piece 660, also referred to as the second cap, must be held in a fixed relationship relative to the second member, in this example the laptop lid 204a, in order for the torsion bar spring 680 to generate the spring torque for the proper operation of the hinge assembly 600. In hinge assembly 600 the end piece 660 is fixed relative to the second member by being fixed to the hinge base 602, which is then mounted to the second member, rather than being directly mounted to the second member as in the case of the end piece 360 of the hinge assembly 300. Accordingly, once the hinge base 602 is mounted to the second member, the end piece 660 becomes fixed relative to the second member such that the end piece 660 moves with the second member as a unit. The end piece 660 has two lateral projections 662 and a socket 664. The socket 664 has a front opening 667, a back wall 668, side edges 670 and 672, top edge 674 and bottom edge 676. The front opening 667 is rectangular. The projections 662 of the end piece 660 engage and fit into respective notches 675 provided in one of the outer shell 677 in order to prevent relative rotation between the end piece 660 and the shell 677. The shell 677 is in turn fixed to the hinge base 602 in order to rotationally fix the end piece 660 to the hinge base 602. The shell 677 is cylindrical and encases the torsion bar spring 680. The end piece 660 is axially held in place at the end of the shell 677 distal from the hinge base 602 by friction fit to the bore of the shell 677, by adhesives, by pins or other fasteners, or by any other suitable means. The shell 677 has one or more flanges 673 that register with a portion of the hinge base flange 601. Two flanges 673 are provided in the illustrated example that straddle a portion of the hinge base flange 601. Each flange 673 is provided with one or more holes 678 that register with one or more corresponding holes 681 in the hinge base flange 601 to allow the shell 677, and in turn the end piece 660, to be securely fastened to the hinge base 602 by, for example, the rivets 679.

Referring to FIGS. 103-135 and 159-162, the torsion bar spring 680 extends from the end piece 660 to the first end cap 700 on the shaft 620. The torsion bar spring 680 has a first end 682 and a second end 684. The torsion bar spring 680 is resilient and has a longitudinal axis. The first end 682 of the torsion bar spring 680 is constrained to rotate with the shaft 620 so there can be essentially no relative rotation between the shaft 620 and the first end 682 of the torsion bar spring 680 about the longitudinal axis of the torsion bar spring 680. The second end 684 of the torsion bar spring 680 is constrained by the end piece 660 so there can be essentially no relative rotation between the end piece 660 and the second end 684 of the torsion bar spring 680 about the longitudinal axis of the torsion bar spring 680 such that rotation of the shaft 620 relative to the end piece 660 causes the torsion bar spring 680 to be twisted about its longitudinal axis when the shaft 620 is initially in a neutral position. The neutral position refers to the position of any part of the hinge assembly 600 that corresponds to the relaxed state of the torsion bar spring 680. The torsion bar spring 680 stores energy as it is twisted and tends to exert a force to restore the shaft 620 and the adaptor 640 to their neutral positions due to the resilience of the torsion bar spring 680.

The torsion bar spring 680 is made of a plurality of leaves 690 that are stacked together in superimposed fashion. Each spring leaf 690 is in the form of an elongated rectangular strip.

The first end 682 of the torsion bar spring 680 is constrained against rotation relative to the second end portion 622 of the shaft 620 and the second end 684 of the torsion bar spring 680 is constrained against rotation relative to the end piece 660 such that rotation of the shaft 620 relative to the end piece 660 causes the torsion bar spring 680 to be twisted about its longitudinal axis when the shaft 620 is initially in a neutral position.

A lug 706 is provided on the shaft 620. When the hinge assembly 600 is fully assembled, the lug 706 is positioned to contact the stop projection 616 of the hinge base 602 to limit the rotation of the hinge shaft 620 relative to the hinge base 602. The lug 706 engages the end wall 619 of the stop projection 616 to stop the rotation of the hinge shaft 620 and adaptor 640 at a position corresponding to the fully open position of the laptop lid 204a. The lug 706 engages the end wall 618 of the stop projection 616 to stop the rotation of the hinge shaft 620 and adaptor 640 at a position slightly passed the closed position of the laptop lid 204a. The lug 706 and the stop projection 616 constitute a safety means for preventing the over stressing of the torsion bar spring 680 that can lead to breakage of the torsion bar spring 680.

The first ends 692 of the leaves 690 that are farthest from the end piece 660 are stacked together in superimposed fashion when the torsion bar spring 680 is in a relaxed state. The first ends 692 of the leaves 690 form the first end 682 of the torsion bar spring 680. The ends 694 of the leaves 690 that are farthest from the first cap 700 are stacked together in superimposed fashion when the torsion bar spring 680 is in a relaxed state, and the second ends 694 form the second end 684 of the torsion bar spring 680. The torsion bar spring 680 extends through the opening 667 of the socket 664 of the end piece 660. The lateral edges 670 and 672 of the socket opening 667 are rounded. The rounded lateral edges 370 and 372 of the socket opening 667 are in direct contact with the surfaces 693 of the outermost leaves 690 of the torsion bar spring 680. The distance between the rounded lateral edges 670 and 672 of the opening 667 of the socket of the end piece 660 is such that the fit of the torsion bar spring 680 between the rounded lateral edges 670 and 672 of the opening 667 is very tight or with minimal clearance. Thus, the rounded lateral edges 670 and 672 of the opening 667 are responsible for transferring torque between the end piece 660 and the torsion bar spring 680. Using the rounded lateral edges 670 and 672 of the opening 667 for torque transfer between the end piece 660 and the torsion bar spring 680, provides for uniform stress distribution over the width of the spring leaves 690 and prevents stress concentration at the edges of the outermost spring leaves 690. Both of these results enhance the life span of the spring leaves 690 and reduce the chance of failure of the spring leaves 690 and consequently of the torsion bar spring 680. The distance between the top edge 674 and the bottom edge 676 of the opening 667 of the socket of the end piece 660 is such that the top edge 674 and the bottom edge 676 of the opening 667 will not interfere with the movements of the ends 694 of the leaves 690 within the socket 664.

Figure 120:
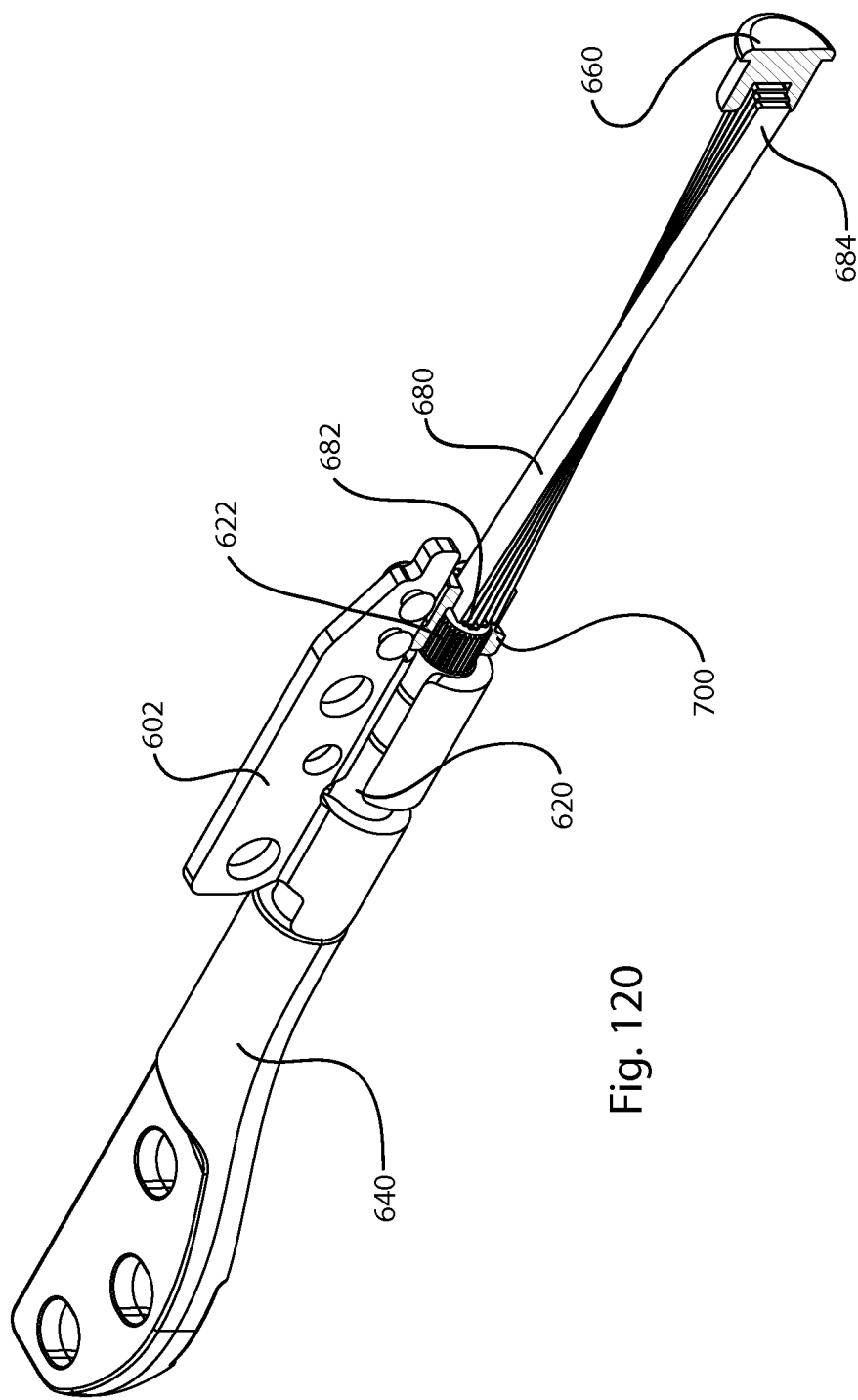
Figure 121:
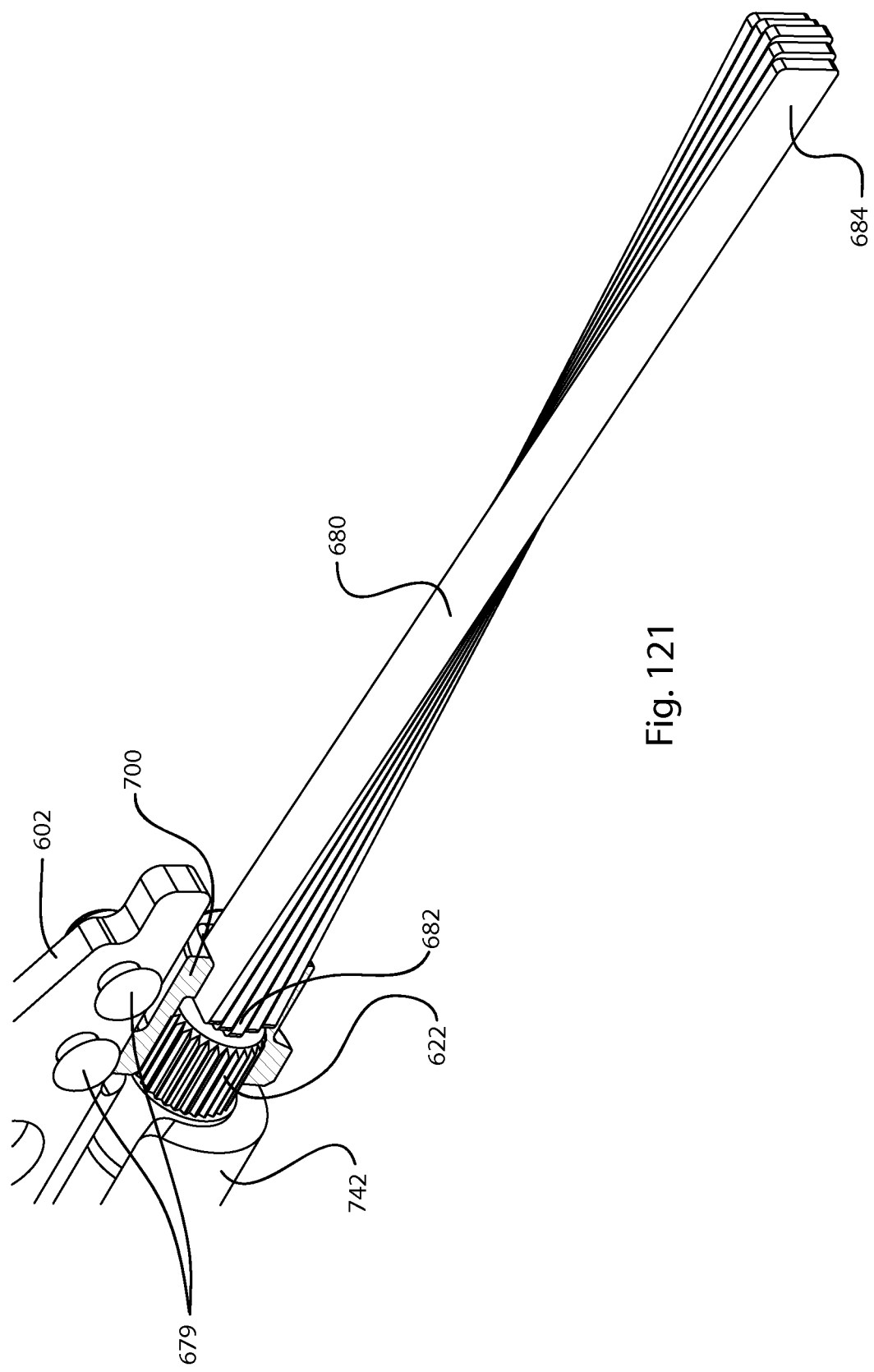
Figure 122:
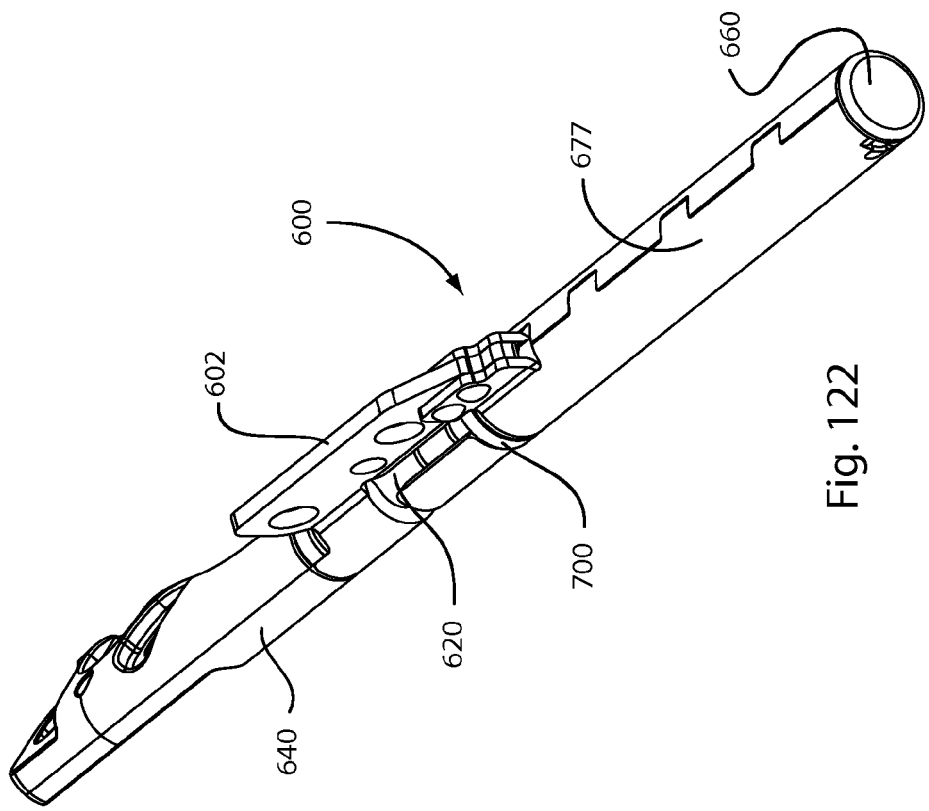
FIG. 122 is an isometric view of the second embodiment of the hinge assembly of the present invention showing the hinge adaptor in an angular position relative to the base of the hinge assembly that corresponds to the open position of the laptop computer lid.
Figure 123:
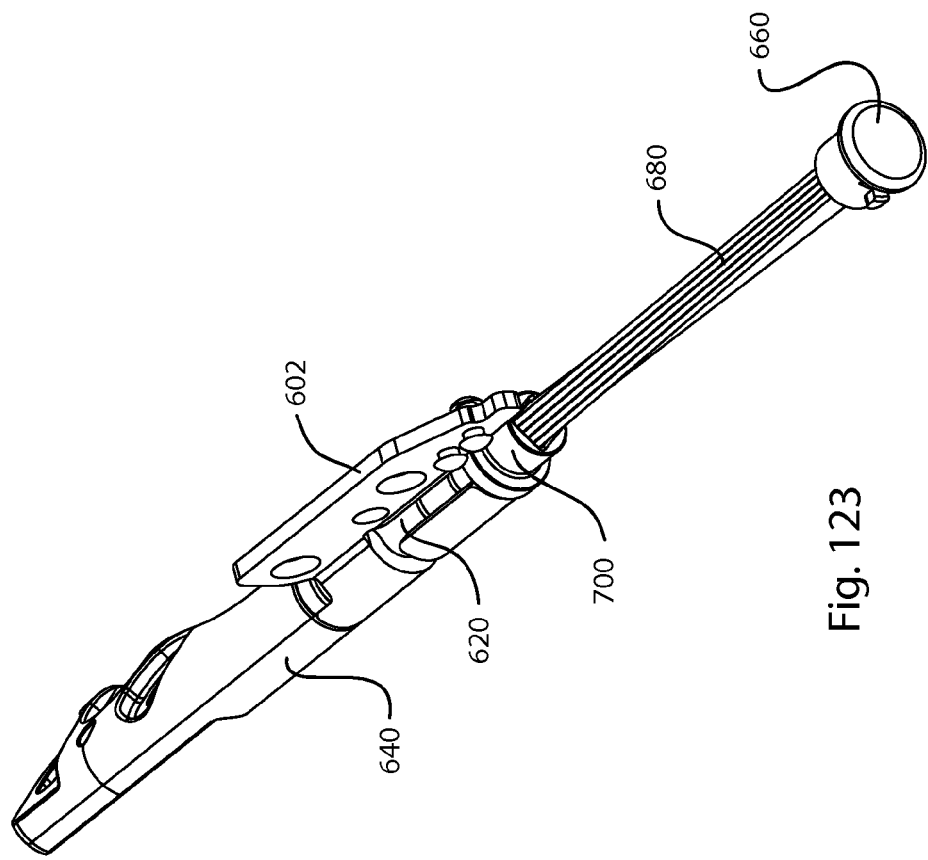
FIG. 123 is a view of the second embodiment of the hinge assembly of the present invention showing the hinge adaptor in an angular position relative to the base of the hinge assembly that corresponds to the fully open position of the laptop computer lid and that is partially broken away to reveal internal details.
Figure 132:
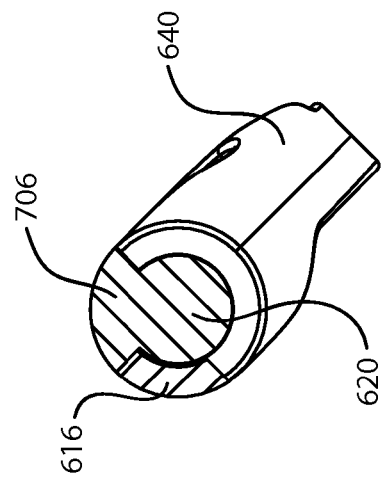
FIG. 132 is a cross-sectional view of the second embodiment of the hinge assembly of the present invention taken along the line D-D in FIG. 109 showing the hinge adaptor in an angular position relative to the base of the hinge assembly that corresponds to the fully open position of the laptop computer lid.
Figure 131:
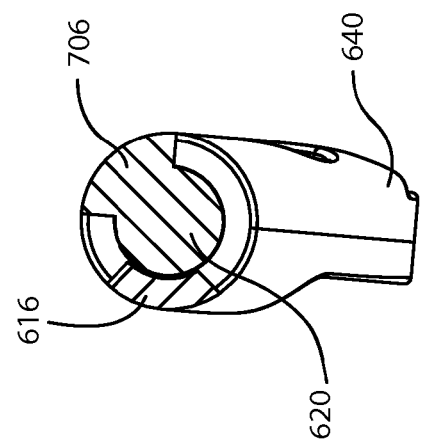
FIG. 131 is a cross-sectional view of the second embodiment of the hinge assembly of the present invention taken along the line D-D in FIG. 109 showing the hinge adaptor in an angular position relative to the base of the hinge assembly that corresponds to the relaxed state of the hinge assembly.
Figure 130:
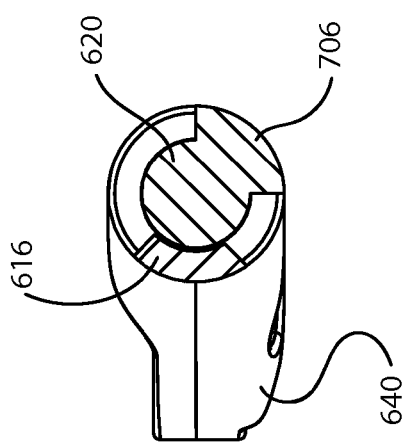
FIG. 130 is a cross-sectional view of the second embodiment of the hinge assembly of the present invention taken along the line D-D in FIG. 109 showing the hinge adaptor in an angular position relative to the base of the hinge assembly that corresponds to the fully closed position of the laptop computer lid.
Figure 135:
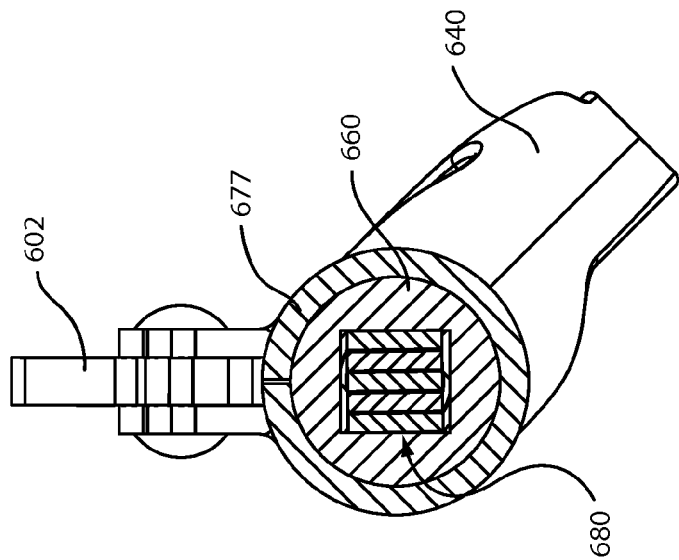
FIG. 135 is a cross-sectional view of the second embodiment of the hinge assembly of the present invention taken along the line E-E in FIG. 109 showing the hinge adaptor in an angular position relative to the base of the hinge assembly that corresponds to the fully open position of the laptop computer lid.
Figure 134:
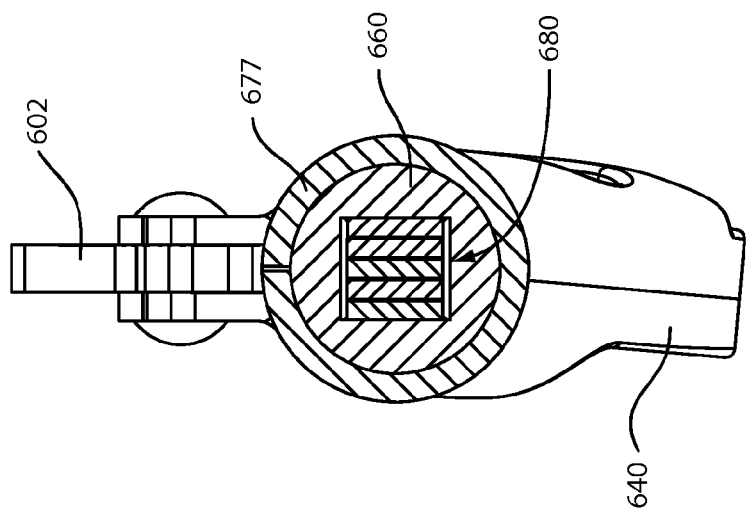
FIG. 134 is a cross-sectional view of the second embodiment of the hinge assembly of the present invention taken along the line E-E in FIG. 109 showing the hinge adaptor in an angular position relative to the base of the hinge assembly that corresponds to the relaxed state of the hinge assembly.
Figure 133:
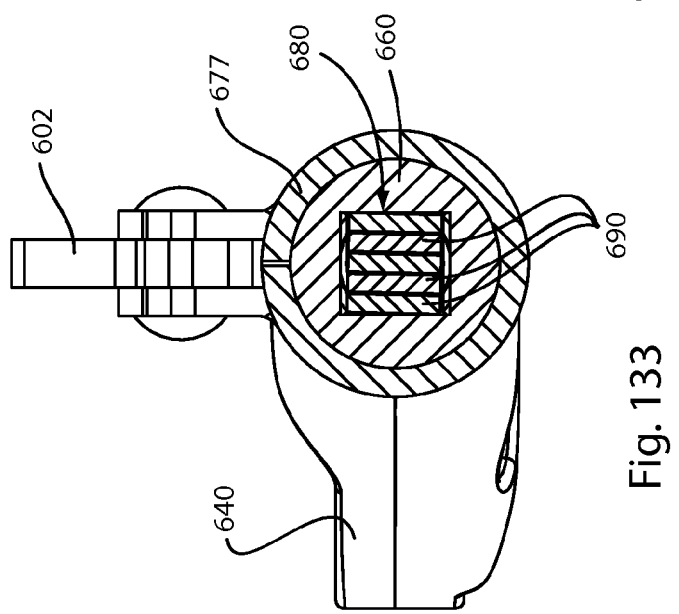
FIG. 133 is a cross-sectional view of the second embodiment of the hinge assembly of the present invention taken along the line E-E in FIG. 109 showing the hinge adaptor in an angular position relative to the base of the hinge assembly that corresponds to the fully closed position of the laptop computer lid.
Figure 149:
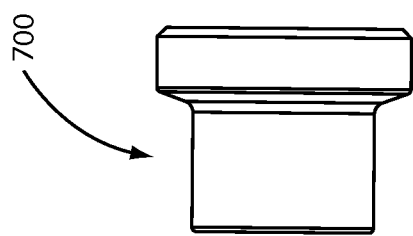
Figure 148:
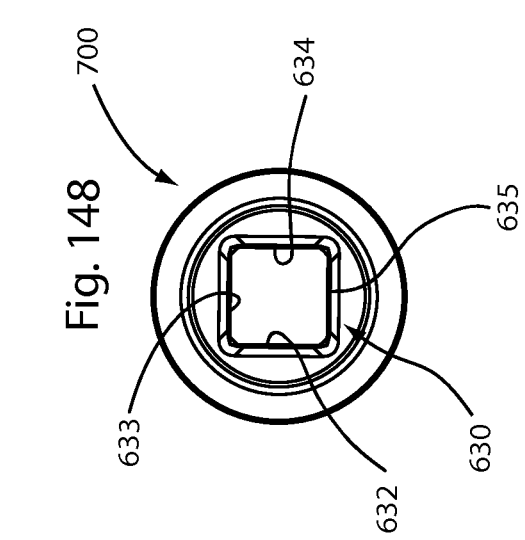
Figure 150:
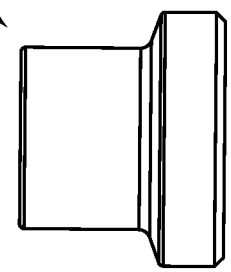
Figure 147:
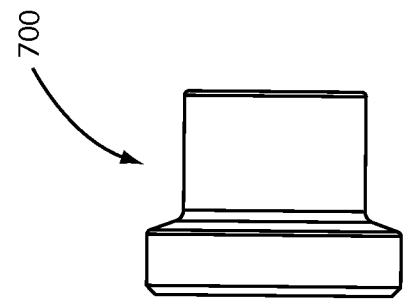
Figure 159:
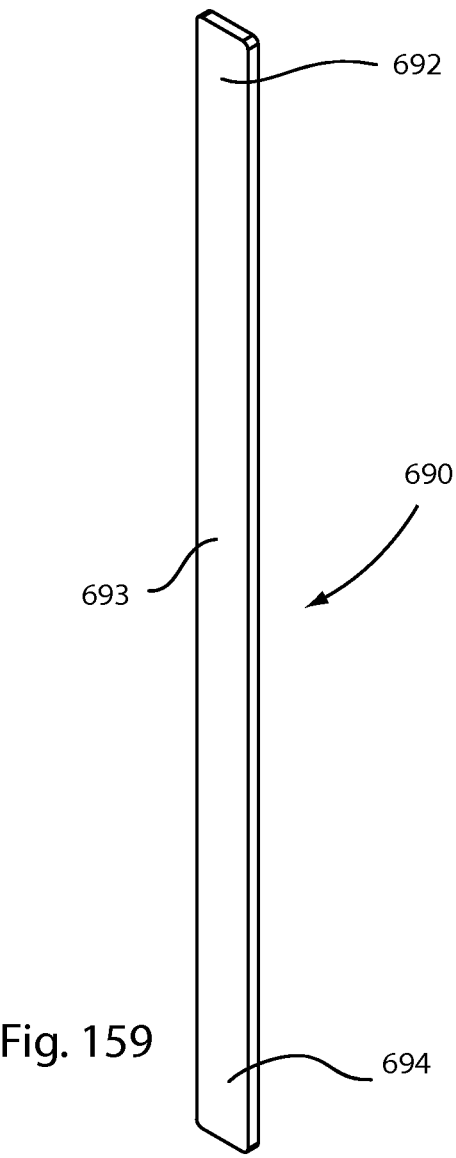

As the torsion bar spring 680 is twisted about its longitudinal axis to any given amount, the length per degree of twist of the helical path followed by the spring leaves 690 is longer for each leaf 690 the farther away it is from the center of the stack of leaves 690. Accordingly, the ends 694 of the hinge leaves 690 begin to pull away from the back wall 668 of the socket 664 such that the farther a hinge leaf 690 is from the middle of the stack of leaves the more its end 694 will be pulled away from the back wall 668. This result is illustrated in FIGS. 119-121. Constraining this axial movement of the ends 694 of the hinge leaves 690 would result in spring leaf breakage. Accordingly, at least one end of each of the plurality of leaves 690 must be free to move axially as the torsion bar spring 680 is twisted. The end 694 of each of the spring leaves 690 must be far enough into the socket opening 667 such that there is no possibility of it being pulled completely out of the socket opening 667 over the entire range of rotation of the shaft 620.

The opening 630 in the end cap 700 is a mirror image of the socket opening 667. The torsion bar spring 680 extends through the opening 630 of the first cap 700. The lateral edges 632 and 634 of the opening 630 are rounded. The rounded lateral edges 632 and 634 of the opening 630 are in direct contact with the surfaces 693 of the outermost leaves 690 of the torsion bar spring 680. The distance between the rounded lateral edges 632 and 634 of the opening 630 of the end cap 700 is such that the fit of the torsion bar spring 680 between the rounded lateral edges 632 and 634 of the opening 630 is very tight or with minimal clearance. Thus, the rounded lateral edges 632 and 634 of the opening 630 are responsible for transferring torque between the end cap 700 and the torsion bar spring 680. Using the rounded lateral edges 632 and 634 of the opening 630 for torque transfer between the end cap 700 and the torsion bar spring 680, provides for uniform stress distribution over the width of the spring leaves 690 and prevents stress concentration at the edges of the outermost spring leaves 690. Both of these results enhance the life span of the spring leaves 690 and reduce the chance of failure of the spring leaves 690 and consequently of the torsion bar spring 680. The distance between the top edge 633 and the bottom edge 635 of the opening 630 of the end cap 700 is such that the top edge 633 and the bottom edge 635 of the opening 630 will not interfere with the movements of the ends 692 of the leaves 690 within the socket formed by the first cap 700 and the shaft's second end portion 622.

As the torsion bar spring 680 is twisted about its longitudinal axis to any given amount, the length per degree of twist of the helical path followed by the spring leaves 690 is longer for each leaf 690 the farther away it is from the center of the stack of leaves 690. Accordingly, the ends 692 of the hinge leaves 690 begin to pull away from the shaft's second end portion 622 such that the farther a hinge leaf 690 is from the middle of the stack of leaves the more its end 692 will be pulled away from the shaft's second end portion 622. This result is illustrated in FIGS. 119-121. Thus, in the embodiment 600, both ends of each of the plurality of leaves 690 are free to move axially as the torsion bar spring 680 is twisted. The end 692 of each of the spring leaves 690 must be far enough into the opening 630 such that there is no possibility of it being pulled completely out of the opening 630 over the entire range of rotation of the shaft 620. All the spring leaves 690 are captivated between the back wall of the socket in the end piece 660 and the socket formed by the first cap 700 and the shaft's second end portion 622.

As the torsion bar spring 680 is twisted, the leaf ends 694 on one side of the middle of the stack tend to move up or down toward either the top edge 674 or the bottom edge 676 depending upon and in the direction of rotation of the shaft 620, and the leaf ends 694 on the other side of the middle of the stack tend to move in the opposite direction but still in the same direction as the direction of rotation of the shaft 620. These movements must also be accommodated to avoid overstressing the spring leaves 690, which again could lead to premature spring leaf failure. Therefore, as was previously mentioned, the distance between the top edge 674 and the bottom edge 676 of the opening 667 of the socket 664 is such that the top edge 674 and the bottom edge 676 of the opening 667 will not interfere with the movements of the ends 694 of the leaves 690 within the socket 664. The situation is the same for the ends 692 of the spring leaves 690.

The two inner sleeves 720, 721 fit over the portion of the torsion bar spring 680 between the end piece 660 and the first cap 700 inside the shell 677. The two inner sleeves 720, 721 are tubular with openings at both ends. The two inner sleeves 720, 721 act as grease or lubricant containers and do not restrict any of the movements and deflections of the spring leaves 690, but provide for lubrication of the individual spring leaves. The openings 722 at one end of each of the inner sleeves 720, 721 seal against the first cap 700 and the end piece 660, respectively. The openings 724 of the inner sleeves 720, 721 seal against one another. The inner sleeves 720, 721 provide continuous lubrication between the spring leaves 690 to ensure that the spring leaves can slide against one another as necessary to prevent overstressing and damage to the spring leaves. The openings 722 at one end of each of the inner sleeves 720, 721 are in the form of rectangular openings to serve as alignment feature on one side to assist in the assembly process of the torsion bar spring 680. The two inner sleeves 720 and 721 also provide bearing support to the outer shell 677.

With the hinge assembly 600 and its mirror image hinge assembly 800 installed in a laptop as shown, the neutral position of the hinge base 602 and of the laptop lid 204a, which correspond to the relaxed state of the torsion bar spring 680, is between the fully open position of the laptop lid and the fully closed position of the laptop lid. In the illustrated example, the neutral position of the laptop lid is 32° from the fully open position and 85° from the closed position. The operation of the hinge assembly 600 will be described with the laptop lid initially in the neutral position. To close the laptop lid 204a, enough force must initially be applied to overcome the friction torque due to the friction mechanism 730. As the laptop lid 204a rotates toward the closed position, the end piece 660 is rotated causing the torsion bar spring 680 to be twisted. As the torsion bar spring 680 is twisted the force needed to continue the closing of the laptop lid 204a increases due to the resilience of the torsion bar spring 680, however, because it is mechanically advantageous for a user to push down than to pull up, due to the action of gravity on the lid and by bringing his or her body weight into play if necessary, this is not a disadvantage. Also, as the torsion bar spring 680 is twisted energy is stored in the deformation of the torsion bar spring 680. When the laptop lid 204a is in the closed position, a latch (not shown) releasably secures the laptop lid 204a in the closed position. To open the laptop lid a user operates the latch to release the laptop lid 204a for rotation to the open position. The laptop lid 204a automatically moves away from the closed position, without any effort from the user, as the torque exerted by the torsion bar spring 680 overcomes the frictional resistance or torque of the friction mechanism 730 until a point is reached, which is intermediate the neutral position and the closed position, where the torque exerted by the torsion bar spring 680 has dropped to equal the friction torque of the friction mechanism 730. At that point the laptop lid 204a stops moving, and the user can comfortably move the laptop lid 204a manually to any desired position between that point and the fully open position of the laptop lid 204a to suit his or her needs. Even though there will be some deformation of the torsion bar spring 380 at any position away from the neutral position, within the range of positions corresponding to the normal usage range of the laptop screen 206a the friction torque of the friction mechanism 730 will hold the laptop screen in the desired position.

It is possible to interchange the friction mechanisms 730 and 430 and to interchange the structures for rotationally coupling the torsion bar springs 680, 380 to the hinge shafts 620, 320 between the two disclosed embodiments 300 and 600. Such permutations of the disclosed embodiments are within the scope of the invention.

The preferred material used for the spring leaves 690 is steel such as stainless steel or spring steel or any steel with a spring steel temper. The hinge base 602 is preferably also made of a resilient steel. The shaft 620 is also made of steel. The end piece or second cap 660 and the adapter 640 can be made of a die cast metal such as aluminum or zinc or of a high impact plastic. For lower torque applications the spring leaves 690 can be made of a composite or a polymer material as long as it has the requisite elasticity.

Although the hinge assemblies 300 and 600 have been illustrated in the context of a laptop computer, the counterbalancing function provided by the torsion bar springs 380, 680 can be used to allow friction hinges to be used in heavier applications, where friction torque alone would cause the operating efforts to be objectionably high, or beyond the limits of normal human factors. The laminated design of the torsion bar spring allows the counterbalancing function to be achieved in a compact space, and with relatively low cost. The hinge assemblies 300, 600 or a similar hinge assembly employing the laminated torsion bar design could be used in other applications where gas springs are typically used, such as toolbox lids, storage bins, baggage doors, deck hatches, and vehicle lift gates.

It is to be understood that the present invention is not limited to the embodiments described above, but encompasses any and all embodiments within the scope of the following claims.

The invention claimed is:

1. A hinge assembly for rotationally attaching a first member to a second member to allow rotational movement of the first member relative to the second member between a closed position and an open position, the hinge assembly comprising:

(a) a shaft having at least a first end portion and a second end portion;

(b) an adaptor attached to said shaft at said first end portion, said adaptor being attached to said first end portion of said shaft such that said adaptor is constrained to rotate with said shaft as a unit, said adaptor being adapted for fixed attachment to the first member so as to move with the first member as a unit;

(c) a hinge base adapted for fixed attachment to the second member so as to move with the second member as a unit, said hinge base having at least one bearing surface that rotationally supports said shaft such that, when said adaptor is attached to the first member and said hinge base is attached to the second member, the first member is rotationally attached to the second member such that the first member can rotationally move relative to the second member between a closed position and an open position;

(d) a friction mechanism for frictionally resisting rotational motion of said shaft relative to said hinge base, said friction mechanism frictionally engaging said shaft;

(e) an end piece adapted for being held in a fixed relationship relative to said hinge base;

(f) a torsion bar spring extending between said end piece and said second end portion of said shaft, said torsion bar spring having a first end, a second end, resilience, and a longitudinal axis, said first end of said torsion bar spring being constrained against rotation relative to said shaft, said second end of said torsion bar spring being constrained against rotation relative to said end piece about said longitudinal axis of said torsion bar spring such that rotation of said shaft relative to said end piece causes said torsion bar spring to be twisted about its longitudinal axis when said shaft is initially in a neutral position, such that said torsion bar spring tends to store energy and to exert a force to restore said shaft to said neutral position of said shaft due to said resilience of said torsion bar spring; and (g) a shell extending between said hinge base and said end piece, said shell having a bore through which said torsion bar spring extends, said shell having a first end and a second end, said bore of said shell extending between said first end of said shell and said second end of said shell, said shell being secured to said hinge base proximate said first end of said shell, and said end piece being secured in a positionally fixed relationship to said shell proximate said second end of said shell such that there can be no relative rotation between said shell and said end piece, said shell thereby holding said end piece in a fixed relationship relative to said hinge base, wherein said friction mechanism is located in closer proximity to said first end of said shell than it is to said second end of said shell.

2. The hinge assembly of claim 1, wherein said torsion bar spring is made of a plurality of leaves stacked together.

3. The hinge assembly of claim 2, wherein at least one end of each of said plurality of leaves is free to move axially as said torsion bar spring is twisted.

\* \* \* \* \*